(12) United States Patent
Ozcan et al.

(10) Patent No.: US 7,746,480 B2
(45) Date of Patent: *Jun. 29, 2010

(54) APPARATUS FOR CHARACTERIZING FIBER BRAGG GRATINGS

(75) Inventors: Aydogan Ozcan, Menlo Park, CA (US); Michel J. F. Digonnet, Palo Alto, CA (US); Gordon S. Kino, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/343,449

(22) Filed: Dec. 23, 2008

(65) Prior Publication Data

US 2009/0207401 A1 Aug. 20, 2009

Related U.S. Application Data

(60) Continuation of application No. 12/116,871, filed on May 7, 2008, now Pat. No. 7,480,034, which is a division of application No. 11/130,418, filed on May 16, 2005, now Pat. No. 7,385,683.

(60) Provisional application No. 60/571,660, filed on May 15, 2004, provisional application No. 60/599,427, filed on Aug. 6, 2004, provisional application No. 60/662,684, filed on Mar. 17, 2005.

(51) Int. Cl.
*G01B 9/02* (2006.01)

(52) U.S. Cl. .................................... 356/519; 356/73.1

(58) Field of Classification Search ............... 356/73.1, 356/519
See application file for complete search history.

(56) References Cited

U.S. PATENT DOCUMENTS 4,742,577 A * 5/1988 Valdmanis .................. 398/141

(Continued)

FOREIGN PATENT DOCUMENTS

EP 1 339 254 8/2003

(Continued)

OTHER PUBLICATIONS

Ozcan, A., et al., *A Simple Post-Processing Technique to Improve the Retrieval Accuracy of Second-Order Nonlinearity Profiles*, Conference on Lasers and Electro Optics (CLEO) 2004.

(Continued)

*Primary Examiner*—Tarifur Chowdhury
*Assistant Examiner*—Jonathon D Cook
(74) *Attorney, Agent, or Firm*—Knobbe, Martens, Olson & Bear, LLP

(57) ABSTRACT

An apparatus characterizes at least one fiber Bragg grating. The apparatus includes a laser pulse source, an optical spectrum analyzer, and multiple optical paths. A first optical path includes a pulse stretcher and an attenuator. A second optical path optically coupled to the first optical path includes a mirror. A third optical path optically coupled to the first optical path includes a first fiber Bragg grating. A fourth optical path is optically coupled to the second optical path, the third optical path, and the optical spectrum analyzer. A fifth optical path optically coupled to the laser pulse source and the optical spectrum analyzer includes a delay line.

15 Claims, 38 Drawing Sheets

U.S. PATENT DOCUMENTS

| | | | |
|---|---|---|---|
| 5,062,703 | A | 11/1991 | Wong et al. |
| 5,748,312 | A * | 5/1998 | Kersey et al. ............... 356/478 |
| 6,501,414 | B2 | 12/2002 | Arndt et al. |
| 6,654,516 | B2 | 11/2003 | So |
| 6,680,472 | B1 * | 1/2004 | Thingbø et al. ........ 250/227.12 |

FOREIGN PATENT DOCUMENTS

| | | |
|---|---|---|
| WO | PCT/US2005/017069 | 5/2005 |
| WO | WO 2005/054829 A2 | 6/2005 |
| WO | PCT/US2005/017069 | 12/2005 |

OTHER PUBLICATIONS

Ozcan, A., et al., *Post-Processing of the Second-Order Optical Nonlinearity Profile Retrieval Using an Inverse Fourier Transform Technique*, draft paper, 2003.

Ozcan, A., et al., *Simplified Inverse Fourier Transform Technique to Determine Second-Order Optical Nonlinearity Profiles Using a Reference Sample*, Proceedings of Optical Fiber Communication Conference (OFC'04), OSA Technical Digest, Optical Society of America, Washington, D.C., 2004, paper FC3.

Ozcan, A., et al., Inverse Fourier Transform Technique to Determine Second-Order Optical Nonlinearity Spatial Profiles, *Applied Physics Letters*, vol. 82, 2003, pp. 1362-1364.

Ozcan, A., et al., Improved Fourier Transform Technique to DetermineSecond-Order Optical Nonlinearity Profiles, Proceedings of Bragg Gratings, Photosensitivity and Poling in Glass Waveguies (BGPP'03), OSA Technical Digest, Optical Society of America, Washington, D.C., 2003, paper WB3, pp. 259-261.

Ozcan, A., et al., Cylinder-Assisted Maker-Fringe Technique, *Electronics Letters*, 2004.

Ozcan, A., et al., Erratum: Inverse Fourier Transform Technique to Determine Second-Order Optical Nonlinearity Spatial Profiles, *Applied Physics Letters*, vol. 83, 2003, p. 1679.

A. Ozcan, M. J. F. Digonnet, and G. S. Kino, "Group delay recovery using iterative processing of amplitude of transmission spectra of fibre Bragg gratings," Electron. Lett. 40, 1104-1106 (2004).

A. Ozcan, M. J. F. Digonnet, and G. S. Kino, "Iterative processing of second-order optical nonlinearity depth profiles," Opt. Express 12, 3367-3376 (2004), http://www.opticsexpress.org/abstract.cfm?URI=OPEX-12-15-3367.

A. Rosenthal and M. Horowitz, "Inverse scattering algorithm for reconstructing strongly reflecting fiber Bragg gratings", IEEE Journal of Quantum Electronics, vol. 39, pp. 1018-1026, Aug. 2003.

A. Rundquist, A.Efimov, and D. H. Reitze, "Pulse shaping with the Gerchberg-Saxton algorithm", J. Opt. Soc. Am. B 19, 2468-2478 (2002).

D. W. Huang and C. C. Yang, "Reconstruction of fiber grating refractive-index profiles from complex Bragg reflection spectra," Appl. Opt. 38, 4494-4499 (1999).

Huang et al., "Retrival of the refractive-index distribution of fiber gratings with complex Bragg relection measurements," Technical Digest, Conference on Lasers and Electro-Optics 1999, Baltimore, May 28, 1999, pp. 297-298.

E. I. Petermann, J. Skaar, B. E. Sahlgreen, R. A. H. Stubbe, A. T. Friberg, "Characterization of fiber Bragg gratings by use of optical coherence-domain reflectometry," J. of Lightwave Technol. 17, 2371-2378 (1999).

J. Skaar and H.E. Engan, "Phase Reconstruction From Reflectivity in Fiber Bragg Gratings," Optics Letters, 1999, vol. 24, pp. 136-138.

J. Skaar, "Measuring the group delay of fiber Bragg gratings by use of end-reflection interference," Opt. Lett. 24, 1020-1022 (1999).

J. Skaar, "Synthesis of fiber Bragg gratings for use in transmission," J. Opt. Soc. Am. A 18, 557-564 (2001).

J. R. Fienup, "Reconstruction of an object from the modulus of its Fourier transform," Opt. Lett. 3, 27-29 (1978).

K.B. Rochford and S.D. Dyer, "Reconstruction of Minimum-Phase Group Delay From Fibre Bragg Grating Transmittance/Reflectance Measurements," Electronics Letters, 1999, vol. 35, pp. 838-839.

L. Poladian, "Group-delay reconstruction for fiber Bragg gratings in reflection and transmission", Opt. Lett. 22, 1571-1573 (1997).

L. R. Chen, S. D. Benjamin, P. W. E. Smith and J. E. Sipe, "Ultrashort pulse reflection from fiber gratings: a numerical investigation," J. of Lightwave Technol. 15, 1503-1512 (1997).

Maker et al., Effects of Dispersion and Focusing on the Production of Optical Harmonics, Physical Review Letters, vol. 8, 1962, pp. 21-22.

M. Hayes, J. S. Lim, and A. V. Oppenheim, "Signal reconstruction from phase or magnitude," IEEE Trans. Acoust., Speech, Signal Processing 28, 672-680 (1980).

M. M. Wefers and K. A. Nelson, "Analysis of programmable ultrashort waveform generation using liquid-crystal spatial light modulators", J. Opt. Soc. Am. B 12, 1343-1362 (1995).

M.A. Muriel and A. Carballer, "Phase Reconstruction From Reflectivity in Uniform Fiber Bragg Gratings," Optics Letters 1997, vol. 22, pp. 93-95.

Myers et al., "Large Second-Order Nonlinearity in Poled Fused Silica," Optics Letters, vol. 16, 1991, pp. 1732-1734.

P. Lambelet, P. Y. Fonjallaz, H. G. Limberger, R. P. Salathe, C. H. Zimmer, and H. H. Gilgen, "Bragg grating characterization by optical low-coherence reflectometry," IEEE Photon. Technol. Lett. 5, 565-567 (1993).

R. W. Gerchberg and W. O. Saxton, "Practical algorithm for the determination of phase from image and diffraction plane pictures," Optik 35, 237-246 (1972).

S. D. Dyer, K. B. Rochford and A. H. Rose, "Fast and accurate low-coherence interferometric measurements of fiber Bragg grating dispersion and reflectance," Optics Express 5, 262-266 (1999).

S. Keren and M. Horowitz, "Interrogation of fiber gratings by use of low-coherence spectral interferometry of noiselike pulses," Opt. Lett. 26, 328-330 (2001).

S. Keren, A. Rosenthal, and M. Horowitz, "Measuring the structure of highly reflecting fiber Bragg gratings," IEEE Photon. Tech. Lett. 15, 575-577 (2003).

T. Erdogan, "Fiber grating spectra," J. Lightwave Technol. 15, 1277-1294 (1997).

T. F. Jr. Quatieri and A. V. Oppenheim, "Iterative techniques for minimum phase signal reconstruction from phase or magnitude," IEEE Transactions on Acoustics, Speech, and Signal Processing 29, 1187-1193 (1981).

U. Wiedmann, P. Gallion, G. Duan, "A Generalized approach to optical low-coherence reflectometry inducing spectral filtering effects," J. of Lightwave Technol. 16, 1343-1347 (1998).

V. Oppenheim and R. W. Schafer, Digital Signal Processing, (Prentice Hall, 2002), Chap. 7.

* cited by examiner

APPARATUS FOR CHARACTERIZING FIBER BRAGG GRATINGS

CLAIM OF PRIORITY

This application is a continuation of U.S. patent Ser. No. 12/116,871, filed May 7, 2008, incorporated in its entirety by reference herein, which is a divisional application of U.S. patent application Ser. No. 11/130,418, filed May 16, 2005, and incorporated in its entirety by reference herein, which claims the benefit of U.S. Provisional Application Nos. 60/571,660, filed May 15, 2004, 60/599,427, filed Aug. 6, 2004, and 60/662,684, filed Mar. 17, 2005, each of which is incorporated in its entirety by reference herein.

BACKGROUND OF THE INVENTION

1. Field of the Invention

This invention relates generally to apparatus and methods of characterizing the optical response of fiber Bragg gratings.

2. Description of the Related Art

Fiber Bragg gratings (FBGs) have many applications in optical communications and optical fiber sensing. The effective refractive index profile $\Delta n(z)$ of the fiber core mode (e.g., the $LP_{01}$ mode, or a higher-order mode) as a function of the position z along the FBG generally varies roughly periodically with z, with an envelope that may vary along z. The effective refractive index $\Delta n(z)$ determines most of the optical properties of the FBG, including but not limited to, the dispersion properties, the complex reflection impulse response $h_R(t)$, the complex transmission impulse response $h_T(t)$, the amplitudes $|r(\omega)|$, $|t(\omega)|$ and the phases $\phi_r(\omega)$, $\phi_t(\omega)$ of the complex reflection spectrum $r(\omega)$ and the complex transmission spectrum $t(\omega)$, respectively, and the group delay in reflection $$\frac{d\phi_r(\omega)}{d\omega}$$

and transmission $$\frac{d\phi_t(\omega)}{d\omega},$$

where $\omega$ is the angular frequency. These functions can also be expressed as functions of the optical wavenumber k, which has a simple relationship to the optical angular frequency $\omega$, so it is a simple matter to switch between $\omega$ and k.

A first general method to determine $\Delta n(z)$ of an FBG is to measure the complex reflection impulse response $h_R(t)$, which is the temporal dependence of the amplitude and phase of the signal reflected by the FBG when an extremely short optical signal is launched into the FBG. The complex reflection impulse response $h_R(t)$ can be measured directly by launching an ultra-short pulse (e.g., approximately 1 picosecond to approximately 30 picoseconds, depending on the grating length and period) into the FBG and measuring the temporal evolution of the reflected signal. This general method has the drawback of requiring that the width of the input laser pulse be much narrower than the impulse response of the FBG. In addition, interferometric techniques are used to measure both the phase and the amplitude of the complex reflection impulse response, and these techniques are complicated and inherently sensitive to noise or other fluctuations.

A second general technique to measure the complex reflection impulse response $h_R(t)$ is to use an interferometer to measure the wavelength dependence of both the amplitude and the phase of the optical signal reflected by the FBG (i.e., the complex reflection spectrum $r(\omega)$ or $r(k)$). The complex reflection spectrum $r(\omega)$ is the Fourier transform (FT) of the complex reflection impulse response $h_R(t)$, as described by A. Rosenthal and M. Horowitz, "*Inverse scattering algorithm for reconstructing strongly reflecting fiber Bragg gratings,*" IEEE Journal of Quantum Electronics, Vol. 39, pp. 1018-1026, August 2003. The complex reflection impulse response $h_R(t)$ is then recovered from the complex reflection spectrum $r(\omega)$ by taking the inverse Fourier transform (IFT) of $r(\omega)$. As discussed below, the main difficulty of this general technique is that the measurement of the complex reflection spectrum is in general tedious, sensitive to noise, applicable to only special types of FBGs, and/or time-consuming.

The complex reflection spectrum $r(\omega)=|r(\omega)|\cdot\exp(j\phi_r(\omega))$ of an FBG is measurable using various interferometric measurement systems which are generally more complex and have stronger noise sensitivities than do measurement techniques which merely provide the amplitude of the reflection or transmission spectra. For example, in Michelson interferometry (e.g., as described by D.-W. Huang and C.-C. Yang, "*Reconstruction of Fiber Grating Refractive-Index Profiles From Complex Bragg Reflection Spectra,*" Applied Optics, 1999, Vol. 38, pp. 4494-4499), a tunable laser and an optical spectrum analyzer (OSA) are used to recover the phase of the complex reflection spectrum from three independent measurements.

In end-reflection interferometry (e.g., as described by J. Skaar, "*Measuring the Group Delay of Fiber Bragg Gratings by Use of End-Reflection Interference,*" Optics Letters, 1999, Vol. 24, pp. 1020-1022), the FBG is characterized using a tunable laser together with an OSA by measuring the spectral reflectivity that is caused by the interference between the FBG itself and the bare fiber end. This technique, however, is generally a destructive technique, since the bare fiber end must typically be only a few centimeters away from the FBG.

In low-coherence time reflectometry (e.g., as described by P. Lambelet et al., "*Bragg Grating Characterization by Optical Low-Coherence Reflectometry,*" IEEE Photonics Technology Letters, 1993, Vol. 5, pp. 565-567; U. Wiedmann et al, "*A Generalized Approach to Optical Low-Coherence Reflectometry Inducing Spectral Filtering Effects,*" J. of Lightwave Technol., 1998, Vol. 16, pp. 1343-1347; E. I. Petermann et al., "*Characterization of Fiber Bragg Gratings by Use of Optical Coherence-Domain Reflectometry,*" J. of Lightwave Technol., 1999, vol. 17, pp. 2371-2378; and S. D. Dyer et al., "*Fast and Accurate Low-Coherence Interferometric Measurements of Fiber Bragg Grating Dispersion and Reflectance,*" Optics Express, 1999, Vol. 5, pp. 262-266), a Michelson interferometer is illuminated with a broadband light source, and light reflected from the FBG, placed on one arm of the interferometer, and light reflected from a moveable mirror, placed on the reference arm of the interferometer, are coupled together and directed to a detector. This technique utilizes a slow mechanical scan to retrieve the impulse response of the FBG as a function of time, which makes this type of measurement time-consuming.

In low-coherence spectral interferometry (e.g., as described by S. Keren and M. Horowitz, "*Interrogation of Fiber Gratings by Use of Low-Coherence Spectral Interferometry of Noiselike Pulses,*" Optics Letters, 2001, Vol. 26, pp. 328-330; and S. Keren et al., "*Measuring the Structure of*

Highly Reflecting Fiber Bragg Gratings," IEEE Photon. Tech. Letters, 2003, Vol. 15, pp. 575-577), the slow scanning process is avoided by reflecting broadband laser pulses from the FBG and temporally combining these reflected pulses with their delayed replicas. This pulse sequence is then sent to an OSA, which records the power spectrum. The pulsed laser source of this technique has an autocorrelation function which is temporally much narrower (e.g., approaching a delta function) than the impulse response of the FBG. In other words, the recovery of the impulse response of a given FBG is limited in resolution to the autocorrelation trace of the pulsed laser source. Furthermore, the delay between the reflected pulse from the FBG and the input laser pulse has to be carefully adjusted to avoid overlap in the inverse Fourier transform domain, which makes the recovery impossible due to aliasing.

Typically, measurement systems which measure the amplitude of the reflection spectrum or of the transmission spectrum do not provide the missing phase information (i.e., $\phi_r(\omega)$ and/or $\phi_t(\omega)$). The amplitude measurement, which is relatively simpler than the phase measurement, involves a tunable laser and an optical spectrum analyzer (OSA). Previously, various methods have been proposed to reconstruct the missing phase spectrum or group delay spectrum from only the amplitude measurement of $|r(\omega)|$ or $|t(\omega)|$. The phase reconstruction technique presented by Muriel et al., "*Phase Reconstruction From Reflectivity in Uniform Fiber Bragg Gratings,*" Optics Letters, 1997, Vol. 22, pp. 93-95, only works for uniform gratings and has been independently shown to be unsuited for gratings with imperfections (J. Skaar and H. E. Engan, "*Phase Reconstruction From Reflectivity in Fiber Bragg Gratings,*" Optics Letters, 1999, Vol. 24, pp. 136-138). A similar technique has been suggested to improve the noise performance of the initial technique of Muriel et al., however this technique is still limited to only uniform gratings and the processing algorithm involves adjusting of filtering parameters, which depend on the FBG being characterized (K. B. Rochford and S. D. Dyer, "*Reconstruction of Minimum-Phase Group Delay From Fibre Bragg Grating Transmittance/Reflectance Measurements,*" Electronics Letters, 1999, Vol. 35, pp. 838-839).

One method of recovering the phase information from the amplitude data of FBGs was previously described by L. Poladian, "*Group-Delay Reconstruction for Fiber Bragg Gratings in Reflection and Transmission,*" Optics Letters, 1997, Vol. 22, pp. 1571-1573. The technique of Poladian utilized the fact that the transmission spectra of all FBGs belong to the family of minimum-phase functions (MPF) which have their phase and amplitude related by the complex Hilbert transform. In the technique of Poladian, using the Hilbert transformation, the phase or group delay of FBGs is recovered from only the measurement of the amplitude of the transmission spectrum $|t(\omega)|$. This technique works very well but the numerical evaluation of the principle-value Cauchy integral in the Hilbert transform is not trivial and is rather noise-sensitive, as described by Muriel et al.

SUMMARY OF THE INVENTION

In certain embodiments, a method determines a complex reflection impulse response of a fiber Bragg grating. The method comprises providing a measured amplitude of a complex reflection spectrum of the fiber Bragg grating. The method further comprises providing an estimated phase term of the complex reflection spectrum. The method further comprises multiplying the measured amplitude and the estimated phase term to generate an estimated complex reflection spectrum. The method further comprises calculating an inverse Fourier transform of the estimated complex reflection spectrum, wherein the inverse Fourier transform is a function of time. The method further comprises calculating an estimated complex reflection impulse response by applying at least one constraint to the inverse Fourier transform of the estimated complex reflection spectrum.

In certain embodiments, a computer system comprises means for estimating an estimated phase term of a complex reflection spectrum of a fiber Bragg grating. The computer system further comprises means for multiplying a measured amplitude of the complex reflection spectrum of the fiber Bragg grating and the estimated phase term to generate an estimated complex reflection spectrum. The computer system further comprises means for calculating an inverse Fourier transform of the estimated complex reflection spectrum, wherein the inverse Fourier transform is a function of time. The computer system further comprises means for calculating an estimated complex reflection impulse response by applying at least one constraint to the inverse Fourier transform of the estimated complex reflection spectrum.

In certain embodiments, a method determines a complex transmission impulse response of a fiber Bragg grating. The method comprises providing a measured amplitude of a complex transmission spectrum of the fiber Bragg grating. The method further comprises providing an estimated phase term of the complex transmission spectrum. The method further comprises multiplying the measured amplitude and the estimated phase term to generate an estimated complex transmission spectrum. The method further comprises calculating an inverse Fourier transform of the estimated complex transmission spectrum, wherein the inverse Fourier transform is a function of time. The method further comprises calculating an estimated complex transmission impulse response by applying at least one constraint to the inverse Fourier transform of the estimated complex transmission spectrum.

In certain embodiments, a computer system comprises means for estimating an estimated phase term of a complex transmission spectrum of a fiber Bragg grating. The computer system further comprises means for multiplying a measured amplitude of the complex transmission spectrum of the fiber Bragg grating and the estimated phase term to generate an estimated complex transmission spectrum. The computer system further comprises means for calculating an inverse Fourier transform of the estimated complex transmission spectrum, wherein the inverse Fourier transform is a function of time. The computer system further comprises means for calculating an estimated complex transmission impulse response by applying at least one constraint to the inverse Fourier transform of the estimated complex transmission spectrum.

In certain embodiments, a method characterizes a fiber Bragg grating. The method comprises providing a measured amplitude of a Fourier transform of a complex electric field envelope of an impulse response of the fiber Bragg grating. The method further comprises providing an estimated phase term of the Fourier transform of the complex electric field envelope. The method further comprises multiplying the measured amplitude and the estimated phase term to generate an estimated Fourier transform of the complex electric field envelope. The method further comprises calculating an inverse Fourier transform of the estimated Fourier transform of the complex electric field envelope, wherein the inverse Fourier transform is a function of time. The method further comprises calculating an estimated electric field envelope of the impulse response by applying at least one constraint to the inverse Fourier transform of the estimated Fourier transform of the complex electric field envelope.

In certain embodiments, a computer system comprises means for estimating an estimated phase term of a Fourier transform of the complex electric field envelope of an impulse response of a fiber Bragg grating. The computer system further comprises means for multiplying a measured amplitude of the Fourier transform of the complex electric field envelope and the estimated phase term to generate an estimated Fourier transform of the complex electric field envelope. The computer system further comprises means for calculating an inverse Fourier transform of the estimated Fourier transform, wherein the inverse Fourier transform is a function of time. The computer system further comprises means for calculating an estimated electric field envelope of the impulse response by applying at least one constraint to the inverse Fourier transform of the estimated Fourier transform of the complex electric field envelope.

In certain embodiments, an apparatus characterizes at least one fiber Bragg grating. The apparatus comprises a laser pulse source which generates at least one input laser pulse. The apparatus further comprises an optical spectrum analyzer. The apparatus further comprises a first optical path optically coupled to the laser pulse source. The first optical path comprises a pulse stretcher and an attenuator. A first portion of the input laser pulse propagates from the laser pulse source and is stretched by the pulse stretcher and is attenuated by the attenuator. The apparatus further comprises a second optical path optically coupled to the first optical path and comprising a mirror. A first portion of the stretched and attenuated laser pulse from the first optical path is reflected from the mirror. The apparatus further comprises a third optical path optically coupled to the first optical path and comprising a first fiber Bragg grating. A second portion of the stretched and attenuated laser pulse from the first optical path is reflected from the first fiber Bragg grating. The apparatus further comprises a fourth optical path optically coupled to the second optical path, the third optical path, and the optical spectrum analyzer. The reflected pulse from the mirror and the reflected pulse from the first fiber Bragg grating propagate to the optical spectrum analyzer. The apparatus further comprises a fifth optical path optically coupled to the laser pulse source and the optical spectrum analyzer. The fifth optical path comprises a delay line. A second portion of the input laser pulse propagates from the laser pulse source along the fifth optical path to the optical spectrum analyzer.

DETAILED DESCRIPTION OF THE PREFERRED EMBODIMENT

Figure 1:
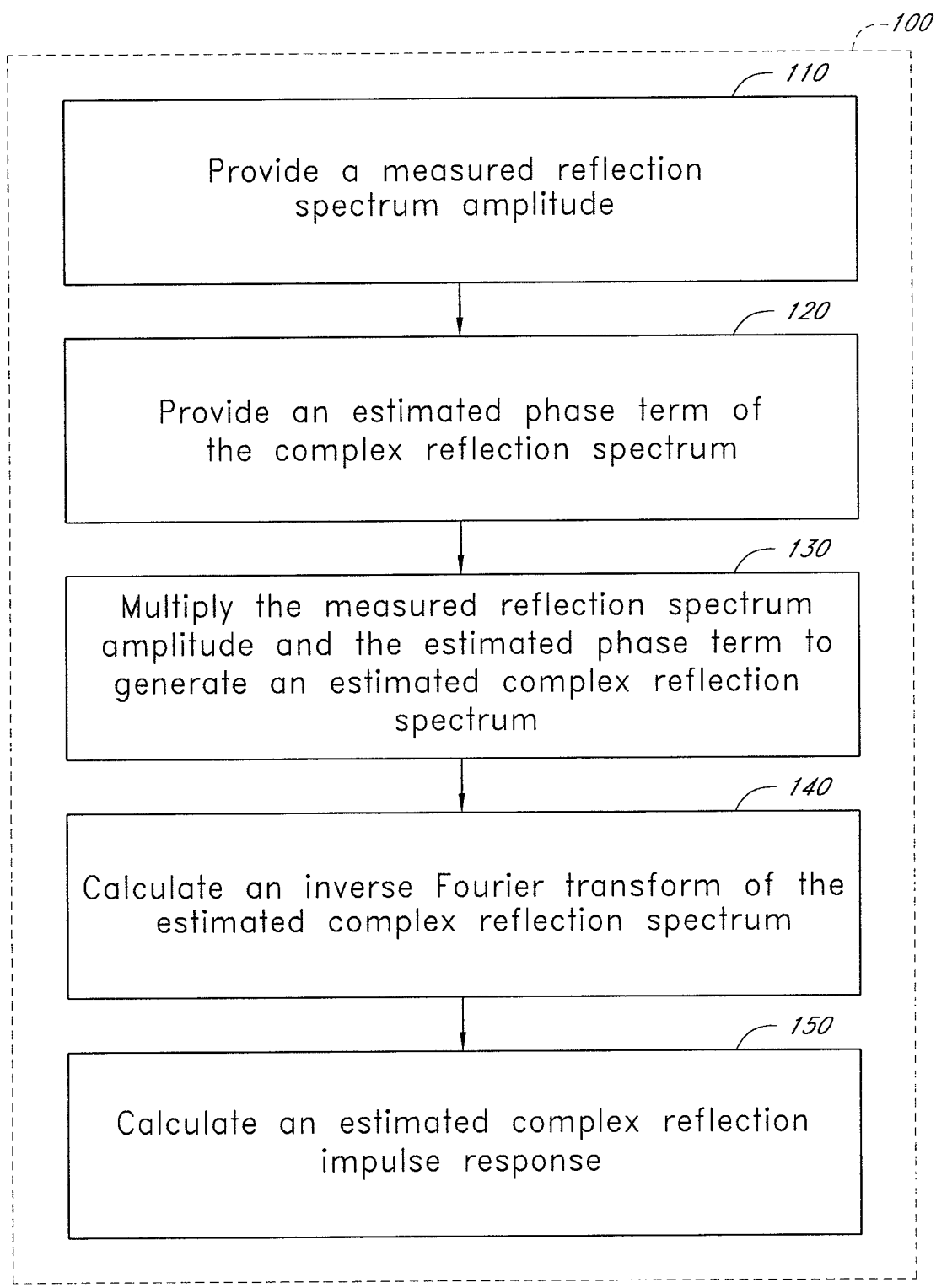
FIG. 1 is a flowchart of an exemplary embodiment of a method of determining the complex reflection impulse response $h_R(t)$ of a FBG.

Certain embodiments described herein provide a simpler and less noise-sensitive technique based on an iterative process to recover the reflection phase, the reflection group delay, the transmission phase, or the transmission group delay of an FBG (e.g., chirped, asymmetric, symmetric, or uniform) from only the measurement of the reflection spectrum amplitude $|r(\omega)|$ or the transmission spectrum amplitude $|t(\omega)|$. The measurements involved in certain embodiments are also substantially faster than existing techniques. Furthermore, in certain embodiments in which the FBG is known to be symmetric, both the reflection group delay and the transmission group delay of the FBG are uniquely determined. As described herein, numerical simulations of certain embodiments illustrate a noise sensitivity which is quite low.

Certain embodiments described herein are useful in computer-implemented analyses of the optical characteristics of FBGs. The general-purpose computers used for such analyses can take a wide variety of forms, including network servers, workstations, personal computers, mainframe computers and the like. The code which configures the computer to perform such analyses is typically provided to the user on a computer-readable medium, such as a CD-ROM. The code may also be downloaded by a user from a network server which is part of a local-area network (LAN) or a wide-area network (WAN), such as the Internet.

The general-purpose computer running the software will typically include one or more input devices, such as a mouse, trackball, touchpad, and/or keyboard, a display, and computer-readable memory media, such as random-access memory (RAM) integrated circuits and a hard-disk drive. It will be appreciated that one or more portions, or all of the code may be remote from the user and, for example, resident on a network resource, such as a LAN server, Internet server, network storage device, etc. In typical embodiments, the software receives as an input a variety of information concerning the material (e.g., structural information, dimensions, previously-measured amplitudes of reflection or transmission spectra).

Iterative Processing Utilizing the Reflection Spectrum Amplitude

Measurements of the reflection spectrum amplitude $|r(\omega)|$ can be made without using an interferometric instrument. In certain embodiments, broadband light (e.g., white light) or laser light is launched into the FBG and an optical spectrum analyzer (OSA) or a monochromator is used to record the reflected power $R(\omega)=|r(\omega)|^2$ or the transmitted power $T(\omega)= 1-R(\omega)$ as a function of the optical angular frequency $\omega$. In certain other embodiments, other techniques known in the art are used to measure either $R(\omega)$ or $T(\omega)$. By taking the square root of $R(\omega)$, the reflection spectrum amplitude $|r(\omega)|$ is directly obtained. However, the reflection spectrum phase $\phi_r(\omega)$ is still unknown. Certain embodiments described herein retrieve this missing phase information from only either the measured reflection power $R(\omega)$ or the measured transmission power $T(\omega)$, without carrying out additional measurements.

Certain embodiments described herein utilize an algorithm described by J. R. Fienup in "*Reconstruction of an Object from the Modulus of its Fourier Transform*," Optics Letters, 1978, Vol. 3, pp. 27-29. This algorithm (referred to as "the Fienup algorithm" herein) is an error-reduction algorithm that involves using a known (e.g., measured) Fourier transform amplitude spectrum of an unknown function g(t), together with known properties of this function (e.g., that it is a real function or a causal function), to correct an initial guess of g(t). In certain embodiments, this correction is done iteratively.

FIG. 1 is a flowchart of an exemplary embodiment of a method 100 of determining the complex reflection impulse response $h_R(t)$ of an FBG. The method 100 comprises providing a measured reflection spectrum amplitude $|r_M(k)|$ of the complex reflection spectrum $r(k)$ of an FBG in an operational block 110. The method 100 further comprises providing an estimated phase term $\exp[j\phi_0(k)]$ of the complex reflection spectrum $r(k)$ in an operational block 120. The method 100 further comprises multiplying the measured reflection spectrum amplitude $|r_M(k)|$ and the estimated phase term $\exp[j\phi_0(k)]$ to generate an estimated complex reflection spectrum $r'(k)$ in an operational block 130. The method 100 further comprises calculating an intermediate function $h'(t)$, which is the inverse Fourier transform (IFT) of the estimated complex reflection spectrum $r'(k)$, in an operational block 140. The method 100 further comprises calculating an estimated complex reflection impulse response $h_R^e(t)$ by applying at least one constraint to the intermediate function $h'(t)$ in an operational block 150.

In certain embodiments, providing the measured reflection spectrum amplitude $|r_M(k)|$ in the operational block 110 comprises measuring the reflection power spectrum $|r_M(k)|^2$ and taking the square root to yield the measured reflection spectrum amplitude $|r_M(k)|$. In other embodiments, a previously-measured reflection spectrum amplitude $|r_M(k)|$ is provided.

In certain embodiments, the measurement of the measured reflection spectrum amplitude $|r_M(k)|$ does not provide the phase term $\exp[j\phi(k)]$ of the complex reflection spectrum $r(k)$. In certain embodiments in which the method 100 is used iteratively, the choice of the initial estimated phase term $\exp[j\phi_0(k)]$ provided in the operational block 120 does not strongly impact the convergence of the method. Therefore, in certain such embodiments, the initial estimated phase term is selected to be equal to a real or complex constant (e.g., $\exp[j\phi_0(k)]=1$). In certain other embodiments that utilize an IFT technique to provide a measured phase term $\exp[j\phi_M(k)]$, the estimated phase term $\exp[j\phi_0(k)]$ is selected to be the measured phase term $\exp[j\phi_M(k)]$. In certain other embodiments that utilize an IFT technique to provide a measured phase term $\exp[j\phi_M(k)]$, the estimated phase term $\exp[j\phi_0(k)]$ is selected to be the phase term measured from another FBG which is similar to the FBG from which the reflection spectrum amplitude $|r_M(k)|$ is measured (e.g., the FBG being characterized). By providing an estimated phase term which is closer to the actual phase term, certain embodiments advantageously reduce the convergence time of the calculations.

In the operational block 130, the measured reflection spectrum amplitude $|r_M(k)|$ and the estimated phase term $\exp[j\phi_0(k)]$ are multiplied together to generate an estimated complex reflection spectrum $r'(k)$. In certain embodiments, the estimated complex reflection spectrum $r'(k)=|r_M(k)|\cdot\exp[j\phi_0(k)]$ is a complex quantity that is calculated numerically.

In the operational block 140, the IFT of the estimated complex reflection spectrum $r'(k)=|r_M(k)|\cdot\exp[j\phi_0(k)]$ is calculated numerically. In certain embodiments, in the operational block 150, the estimated complex reflection impulse response $h_R^e(t)$ is calculated by applying at least one constraint to the IFT of the estimated complex reflection spectrum $r'(k)$. Various characteristics of the complex reflection impulse response $h_R^e(t)$ may be used as sources for the applied constraint. For example, in certain embodiments in which the complex reflection impulse response $h_R^e(t)$ is causal, the $t\geq 0$ portion of the IFT of the estimated complex reflection spectrum $r'(k)$ is retained while the $t<0$ portion is set equal to zero, thereby generating an estimated complex reflection impulse response $h_R^e(t)$ which is causal. In certain other embodiments, an anti-causal (or maximum-phase) constraint is applied to the IFT of the estimated complex reflection spectrum $r'(k)$ (e.g., the $t<0$ portion is set equal to zero and is time-reversed). In certain embodiments in which the complex reflection impulse response $h_R^e(t)$ has a known temporal duration (e.g., 300 picoseconds), the portion of the IFT of the estimated complex reflection spectrum $r'(k)$ for times greater than the temporal duration is set equal to zero. In certain embodiments in which the FBG has a known bandwidth (e.g., 50 nanometers at wavelengths around 1550 nanometers), then the IFT of the estimated complex reflection spectrum $r'(k)$ is adjusted to provide this known bandwidth. In other certain embodiments in which the FBG is generally uniform, that is, the FBG has an effective refractive index profile which is a periodic function with a constant (e.g., rectangular) envelope, the complex reflection spectrum $r(k)$ is a symmetric function, which implies that the reflection impulse response $h_R(t)$ is a real function. In certain such embodiments, the applied constraint comprises using only the real portion of the reflection impulse response $h_R^e(t)$. As described more fully below, in certain embodiments in which the calculation is iterated, the application of such constraints advantageously reduces the number of iterations which achieve convergence.

Figure 2:
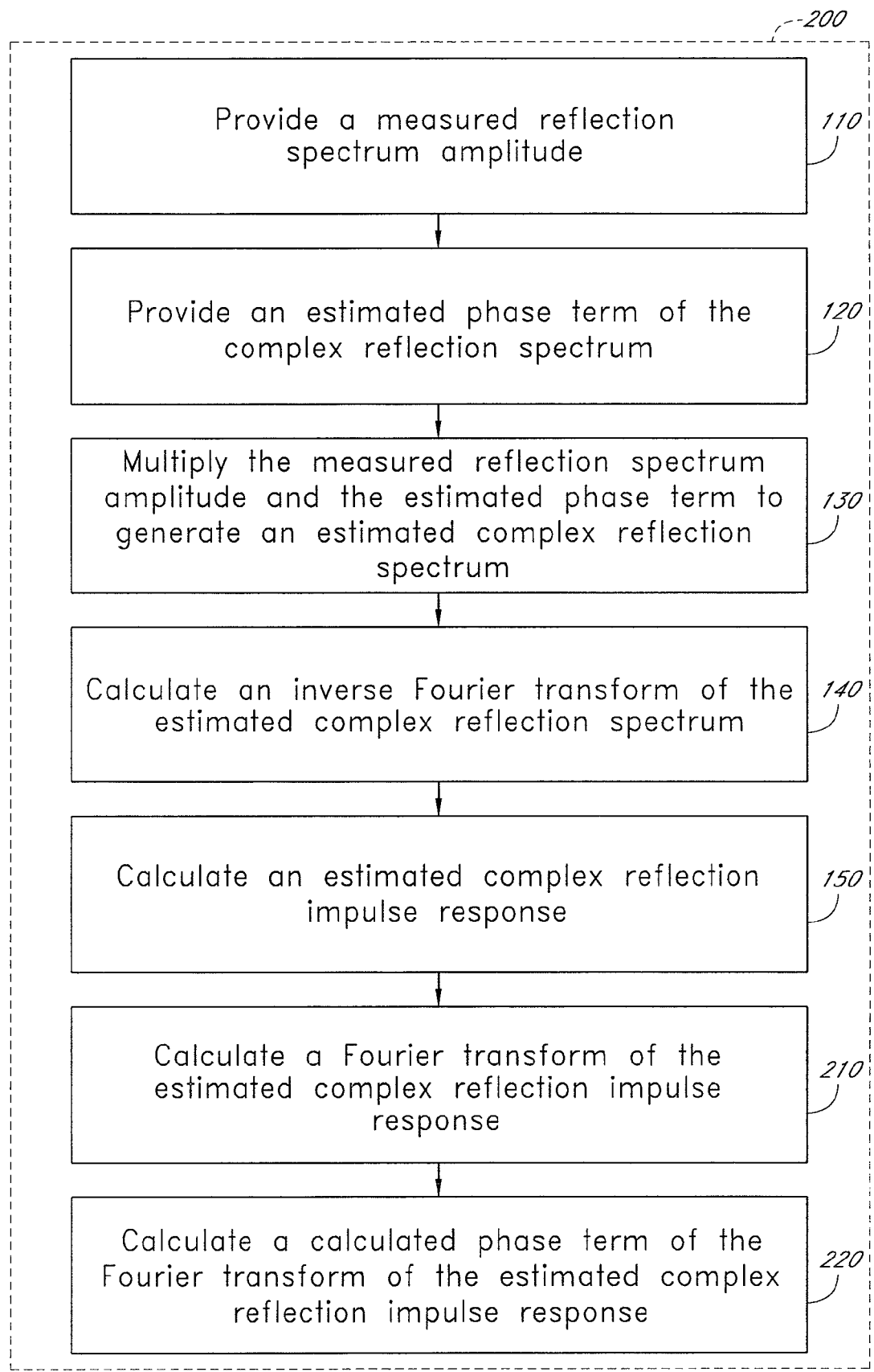
FIG. 2 is a flowchart of another exemplary embodiment of a method of determining the complex reflection impulse response $h_R(t)$ of a FBG.

FIG. 2 is a flowchart of another exemplary embodiment of a method 200 of determining the complex reflection impulse response $h_R(t)$ of a FBG in accordance with embodiments described herein. The method 200 comprises the operational blocks 110, 120, 130, 140, and 150, as described herein. The method 200 further comprises calculating a Fourier transform $r_n(k)$ of the estimated complex reflection impulse response $h_R^e(t)$ in an operational block 210. The method 200 further comprises calculating a phase term $\exp[j\phi_n(k)]$ of the Fourier transform $r_n(k)$ of the estimated complex reflection impulse response $h_R^e(t)$ in an operational block 220.

In certain embodiments, the Fourier transform $r_n(k)$ is calculated numerically in the operational block 210. In certain embodiments, the calculated phase term $\exp[j\phi_n(k)]$ of this Fourier transform $r_n(k)$ is calculated numerically in the operational block 220. In certain other embodiments in which the complex reflection spectrum is a minimum-phase function, as described more fully below, the calculated phase term $\exp[j\phi_n(k)]$ of this Fourier transform $r_n(k)$ is calculated analytically in the operational block by using a Hilbert transformation of the Fourier transform of the estimated complex reflection spectrum amplitude.

Figure 3:
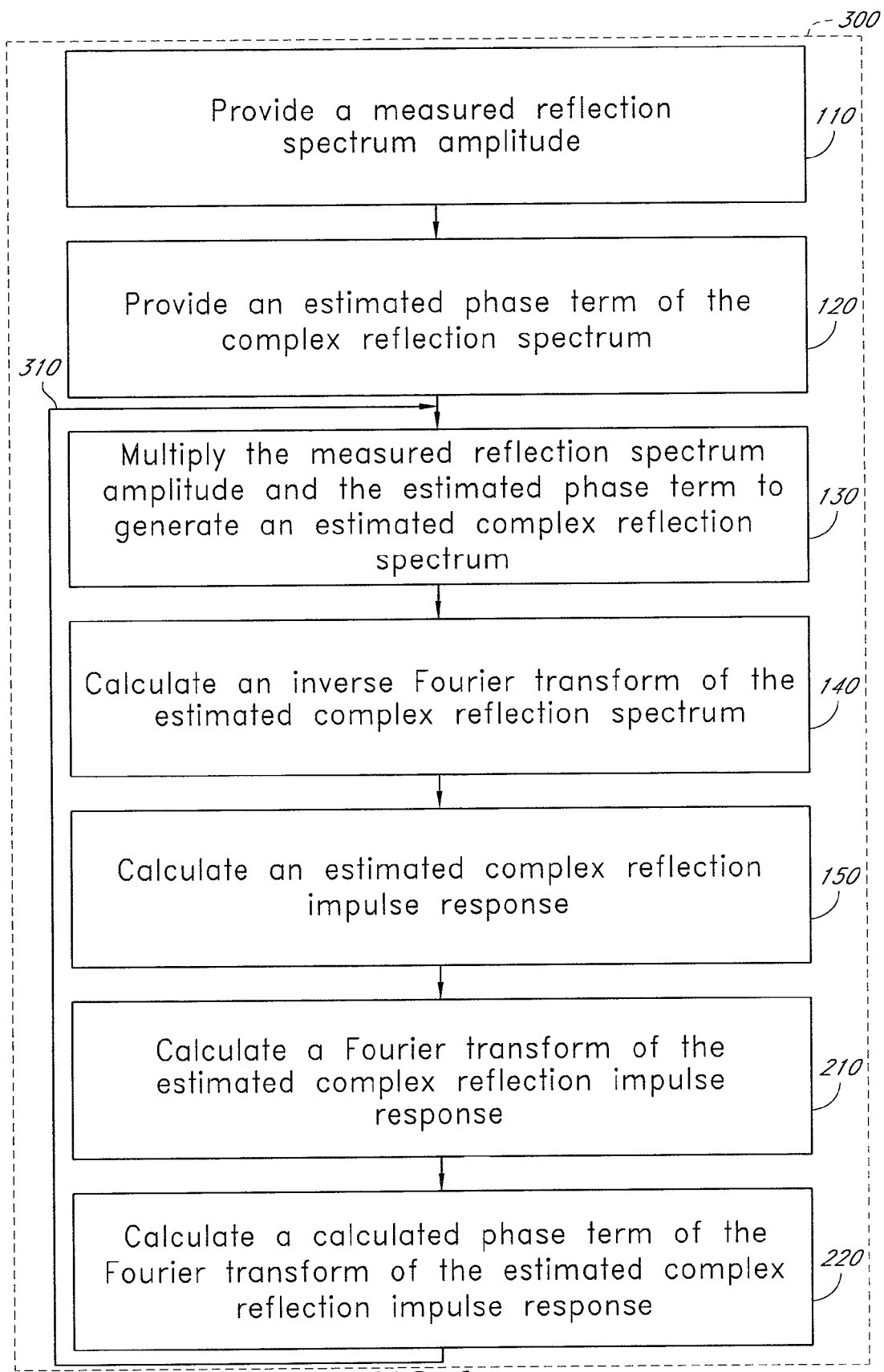
FIG. 3 is a flowchart of another exemplary embodiment of a method of determining the complex reflection impulse response $h_R(t)$ of a FBG.

FIG. 3 is a flowchart of another exemplary embodiment of a method 300 of determining the complex reflection impulse response $h_R(t)$ of a FBG in accordance with embodiments described herein. The method 300 comprises the operational blocks 110, 120, 130, 140, 150, 210, and 220, as described herein. The method 300 further comprises using the calculated phase term $\exp[j\phi_n(k)]$ as the estimated phase term in the operational block 130 and repeating the operational blocks 130, 140, 150, 210, and 220. This repeat operation is denoted in FIG. 3 by the arrow 310. In certain such embodiments, the calculated phase term $\exp[j\phi_n(k)]$ provides a new estimate for the missing phase term of the complex reflection spectrum. The resulting estimated Fourier transform of the operational block 130 is the product of a measured reflection spectrum amplitude $|r_M(k)|$ and a calculated estimated phase term $\exp[j\phi_n(k)]$. By repeating the operational blocks 130, 140, 150, 210, and 220, a second estimated complex reflection impulse response and a second estimated phase term are generated.

In certain embodiments, the operational blocks 130, 140, 150, 210, 220 as shown in FIG. 3 are iteratively repeated a number of times. In certain such embodiments, the iterations are performed until the resulting estimated complex reflection impulse response converges. Convergence is reached in certain embodiments when the average difference between the estimated complex reflection impulse response spectra obtained after two consecutive iterations is less than a predetermined value (e.g., 0.1% of the estimated complex reflection impulse response of the iteration). For example, convergence is reached when the difference between two consecutive estimates of the function $\int |r_n(k)-r_{n-1}(k)|^2 dt / \int |r_n(k)|^2 dt$ is less than the predetermined value. In other embodiments, the iterations are performed a predetermined number of times (e.g., 100 times) rather than determining the differences between successive iterations.

In certain embodiments, the predetermined number is selected to be sufficiently large such that convergence is essentially always achieved after this number of iterations. In certain such embodiments, the predetermined number is determined by evaluating the rate of convergence for a number of FBGs. After a number of iterations, certain embodiments yield an estimated phase term which is a more accurate estimate of the actual phase term than is the initial estimated phase term.

In certain embodiments, the number of iterations can be reduced by using an initial estimated phase term of the complex reflection spectrum which more closely approximates the actual phase term of the complex reflection spectrum. For example, in certain embodiments in which the complex reflection spectrum is a minimum-phase function, a Hilbert transformation of the Fourier transform of the complex reflection spectrum amplitude is used as the initial estimated phase term $\exp[j\phi_0(k)]$. In certain embodiments, only a single iteration is used to calculate the complex reflection impulse response of the FBG. In certain embodiments, the method further comprises calculating the effective refractive index profile $\Delta n(z)$ as a function of the position z along the FBG using the complex reflection spectrum r(k) resulting from the calculation. Typically for non-symmetric FBGs, determining the effective refractive index profile $\Delta n(z)$ utilizes both the complex reflection spectrum r(k) and the complex transmission spectrum t(k). However, in certain embodiments in which the FBG is symmetric, either the complex reflection spectrum r(k) or the complex transmission spectrum t(k) is obtained using the other. Exemplary methods of calculating the effective refractive index profile in accordance with embodiments described herein are described by A. Othonos and K. Kalli, "*Fiber Bragg gratings: fundamentals and applications in telecommunications and sensing,*" 1999, Artech House, Boston; and R. Kashyap, "*Fiber Bragg gratings,*" 1999, Academic Press, San Diego.

Iterative Processing Utilizing the Transmission Spectrum Amplitude

Figure 4A:
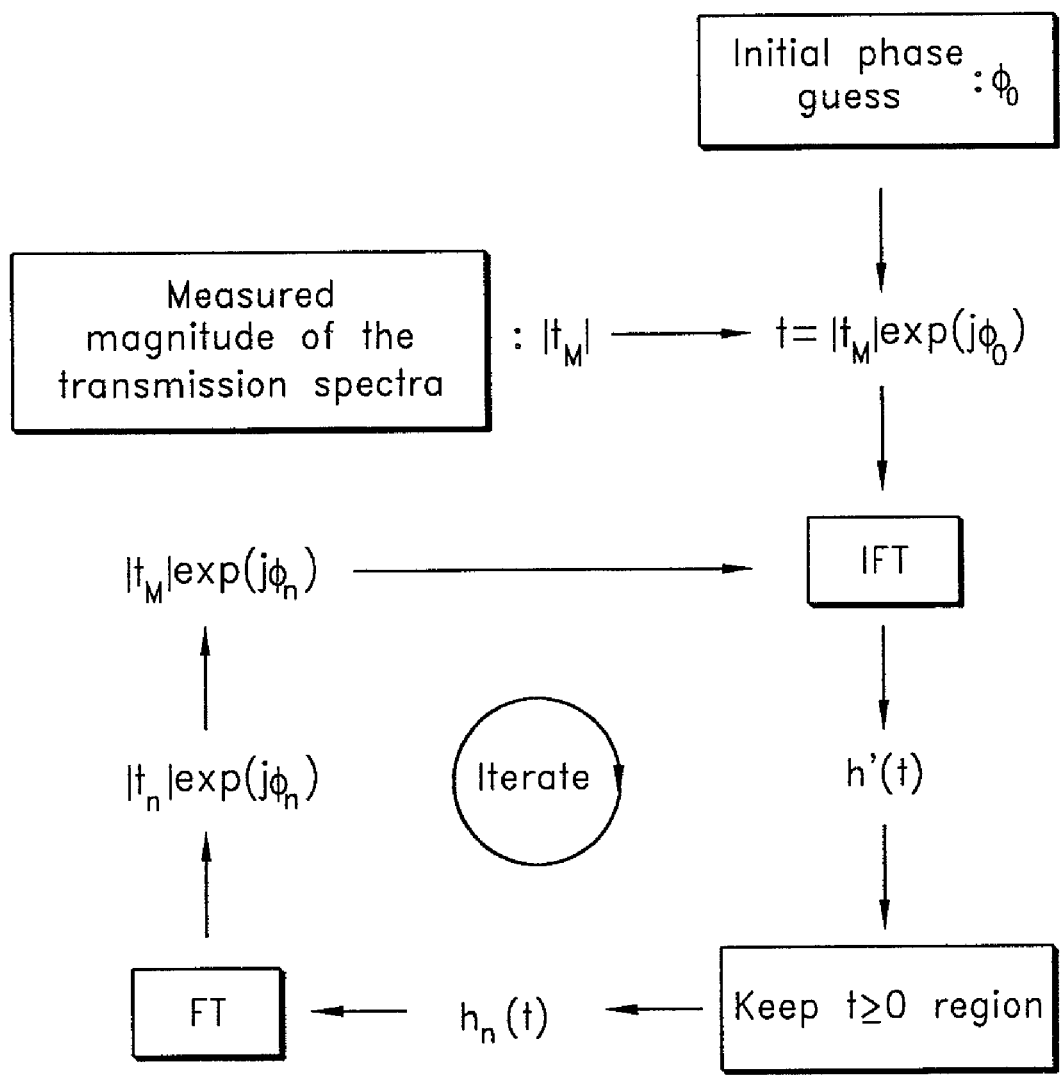
FIG. 4A schematically illustrates an exemplary embodiment of a method of determining the complex transmission impulse response $h_T(t)$ of a FBG.
Figure 4B:
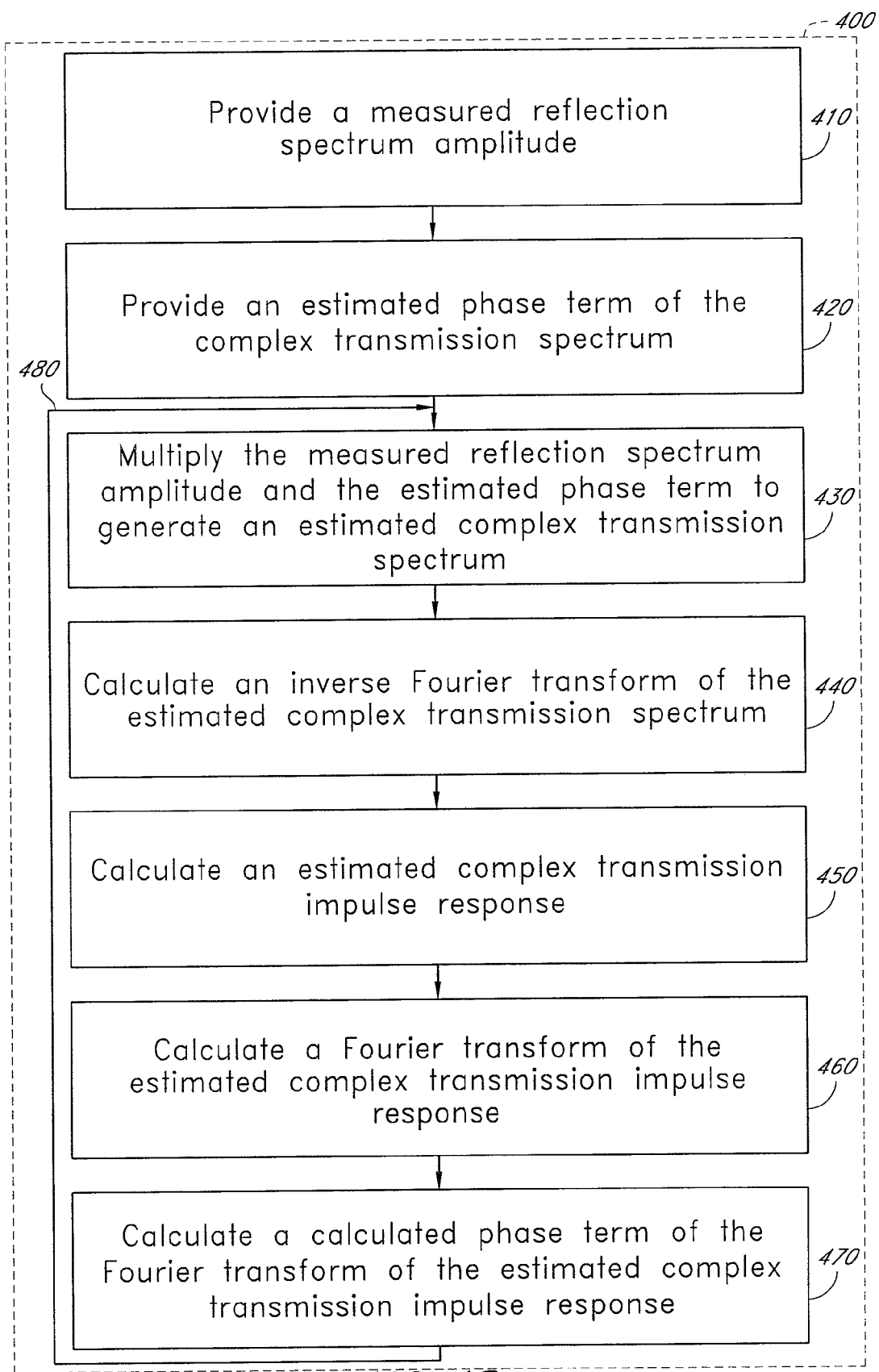
FIG. 4B is a flowchart of the exemplary embodiment of the method of FIG. 4A.

FIG. 4A schematically illustrates an exemplary embodiment of a method 400 of determining the complex transmission impulse response $h_T(t)$ of a FBG in accordance with embodiments described herein. FIG. 4B is a flow diagram of the method 400. The method 400 comprises providing a measured transmission spectrum amplitude $|t_M(\omega)|$ of the complex transmission spectrum $t(\omega)$ of an FBG in an operational block 410. In certain embodiments in which the FBG is substantially lossless, the measured transmission spectrum amplitude $|t_M(\omega)|$ is derived from a measurement of the measured reflection spectrum amplitude $|r_M(\omega)|$ using the relation $|t_M(\omega)|^2 + |r_M(\omega)|^2 = 1$.

The method 400 further comprises providing an estimated phase term $\exp[j\phi_0(\omega)]$ of the complex transmission spectrum $t(\omega)$ in an operational block 420. In certain embodiments, the phase term $\exp[j\phi_0(\omega)]$ of the complex transmission spectrum $t(\omega)$ is unknown to start with, so an arbitrary initial phase is assumed. The choice of the initial phase $\phi_0(\omega)$ does not significantly affect the convergence of the method 400. Therefore, in certain embodiments, the initial phase $\phi_0(\omega)$ is conveniently chosen to be equal to zero.

The method 400 further comprises multiplying the measured transmission spectrum amplitude $|t_M(\omega)|$ and the estimated phase term $\exp[j\phi_0(\omega)]$ to generate an estimated complex transmission spectrum $t'(\omega)$ in an operational block 430. The method 400 further comprises calculating an intermediate function h'(t), which is the inverse Fourier transform (IFT) of the estimated complex transmission spectrum $t'(\omega)$, in an operational block 440. The method 400 further comprises calculating a new estimated complex transmission impulse response of the first iteration $h_1(t)$ by applying at least one constraint to the IFT of the estimated complex transmission spectrum, in the operational block 450. For example, in certain embodiments, since the IFT of $t(\omega)$ is known to be causal, only the $t \geq 0$ portion of h'(t) is retained and zeros are used for t<0, thereby providing a new estimated complex transmission impulse response of the first iteration $h_1(t)$. As described above, various other characteristics of the complex transmission spectrum $t'(\omega)$ may be used as sources for the applied constraint, which include but are not limited to, finite temporal duration, finite bandwidth of the FBG, uniformity of the FBG, and using only the real portion of the complex transmission spectrum $t'(\omega)$.

The method 400 further comprises calculating a Fourier transform $t_1(\omega)$ of the estimated complex transmission impulse response $h_1(t)$ in an operational block 460. The method 400 further comprises calculating a phase term $\exp[j\phi_1(\omega)]$ of the Fourier transform $t_1(\omega)$ of the estimated complex transmission impulse response $h_1(t)$ in an operational block 470. The method 400 further comprises using the calculated phase term $\exp[j\phi_1(\omega)]$ as the estimated phase term in the operational block 430 and repeating the operational blocks 430, 440, 450, 460, and 470, as denoted by the arrow 480. In certain such embodiments, the calculated phase term $\exp[j\phi_n(\omega)]$ of an interation n provides a new estimate for the missing phase term of the complex transmission spectrum. The resulting estimated Fourier transform of the operational block 430 is the product of a measured transmission spectrum amplitude $|t_M(\omega)|$ and a calculated estimated phase term $\exp[j\phi_n(\omega)]$. By repeating the operational blocks 430, 440, 450, 460, and 470, a second estimated complex transmission impulse response and a second estimated phase term are generated.

In certain embodiments, the operational blocks 430, 440, 450, 460, 470 are iteratively repeated a number of times, as shown in FIGS. 4A and 4B. In certain such embodiments, the iterations are performed until the resulting estimated complex transmission impulse response $h_n(t)$ converges. Convergence is reached in certain embodiments when the average difference between the estimated complex transmission impulse responses obtained after two consecutive iterations (e.g., $|h_n(t)-h_{n-1}(t)|^2/|h_n(t)|^2$) is less than a predetermined value (e.g., 0.1% of the estimated complex transmission impulse response of the iteration). In other embodiments, the iterations are performed a predetermined number of times (e.g., 100 times) rather than determining the differences between successive iterations. In certain embodiments, the predetermined number is selected to be sufficiently large such that convergence is essentially always achieved after this number of iterations. In certain such embodiments, the predetermined number is determined by evaluating the rate of convergence for a number of FBGs. At the end of the $n^{th}$ iteration, the phase of the Fourier transform of $h_n(t)$ is the recovered phase $\phi_n(\omega)$ of the FBG complex transmission spectrum t(ω). In certain embodiments, the transmission group delay $$\frac{d\phi_n(\omega)}{d\omega}$$

is then calculated.

In certain embodiments, the phase $\phi_n(\omega)$ obtained by the method 400 converges to the minimum-phase function (MPF) corresponding to a given Fourier transform amplitude. MPFs have the property that the FT phase and the logarith of the FT amplitude of an MPF are the Hilbert transform of one another. Consequently, the FT phase of an MPF can always be recovered from its FT amplitude, and an MPF can always be reconstructed from its FT amplitude alone. (See, e.g., V. Oppenheim and R. W. Schafer, "*Digital Signal Processing,*" 2000, Prentice Hall, Chapter 7.) The fact that the complex transmission spectrum of any FBG is an MPF, as described more fully below, ensures the convergence of the method 400 to the unique phase $\phi_t(\omega)$ of the complex transmission spectrum, i.e., $\phi_n(\omega)=\phi_t(\omega)$.

Since the IFT of the complex reflection spectrum r(ω) is not generally a minimum-phase function, the method 400 is not generally applicable to recover $\phi_r(\omega)$ from only the measured reflection spectrum amplitude $|r_M(\omega)|$. However, for certain embodiments in which the complex reflection spectrum r(ω) is also a minimum-phase function (e.g., for uniform FBGs), the method 400 can be used to derive the reflection group delay, as well as the transmission group delay, of the FBG.

In certain embodiments in which the FBG is known to be symmetric, the reflection group delay of the FBG is equal to the transmission group delay. In certain such embodiments, both the reflection group delay and the transmission group delay are recovered using the method 400.

Figure 5A:
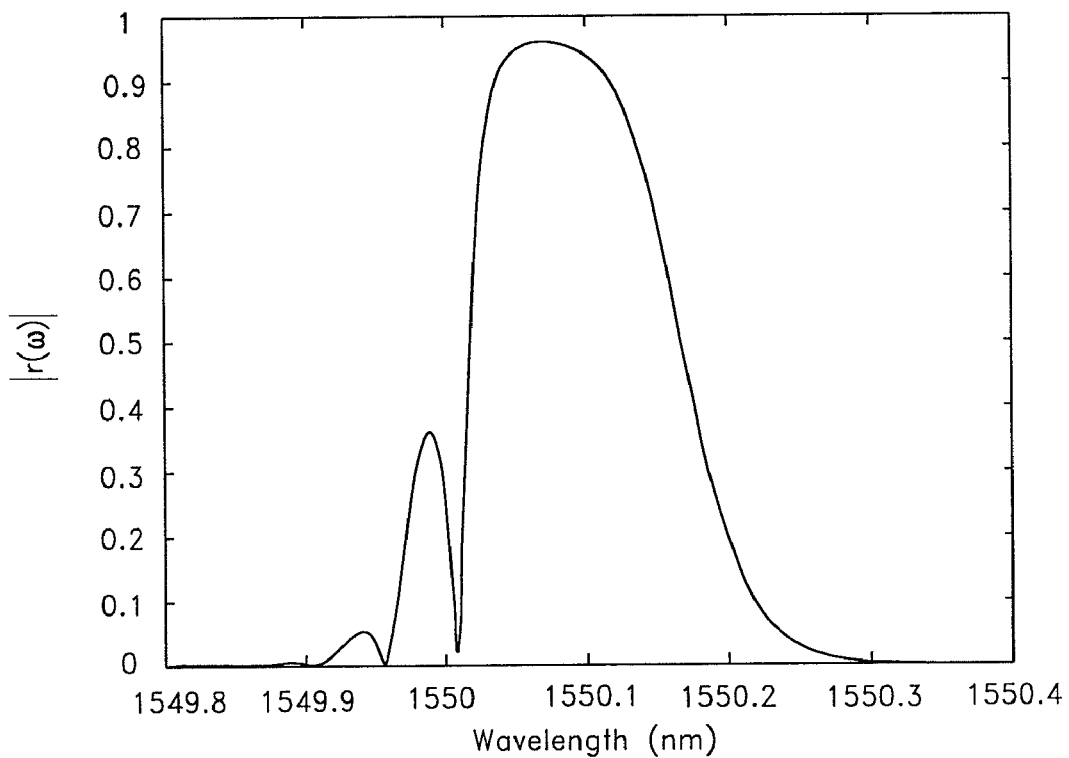
FIG. 5A is a plot of the reflection spectrum amplitude of a Gaussian-apodized symmetric FBG as a function of wavelength.
Figure 5B:
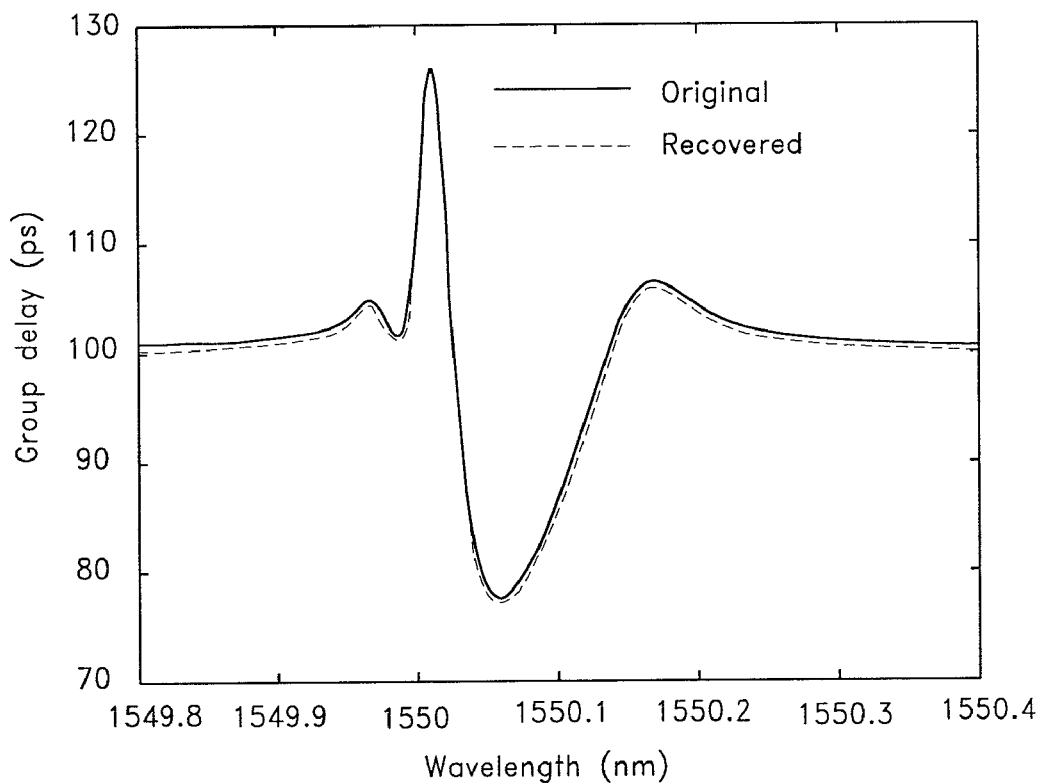
FIG. 5B is a plot of the theoretical transmission group delay spectrum (solid curve) of the FBG of FIG. 5A as a function of wavelength and the recovered transmission group delay spectrum (dashed curve) without any noise present.
Figure 5C:
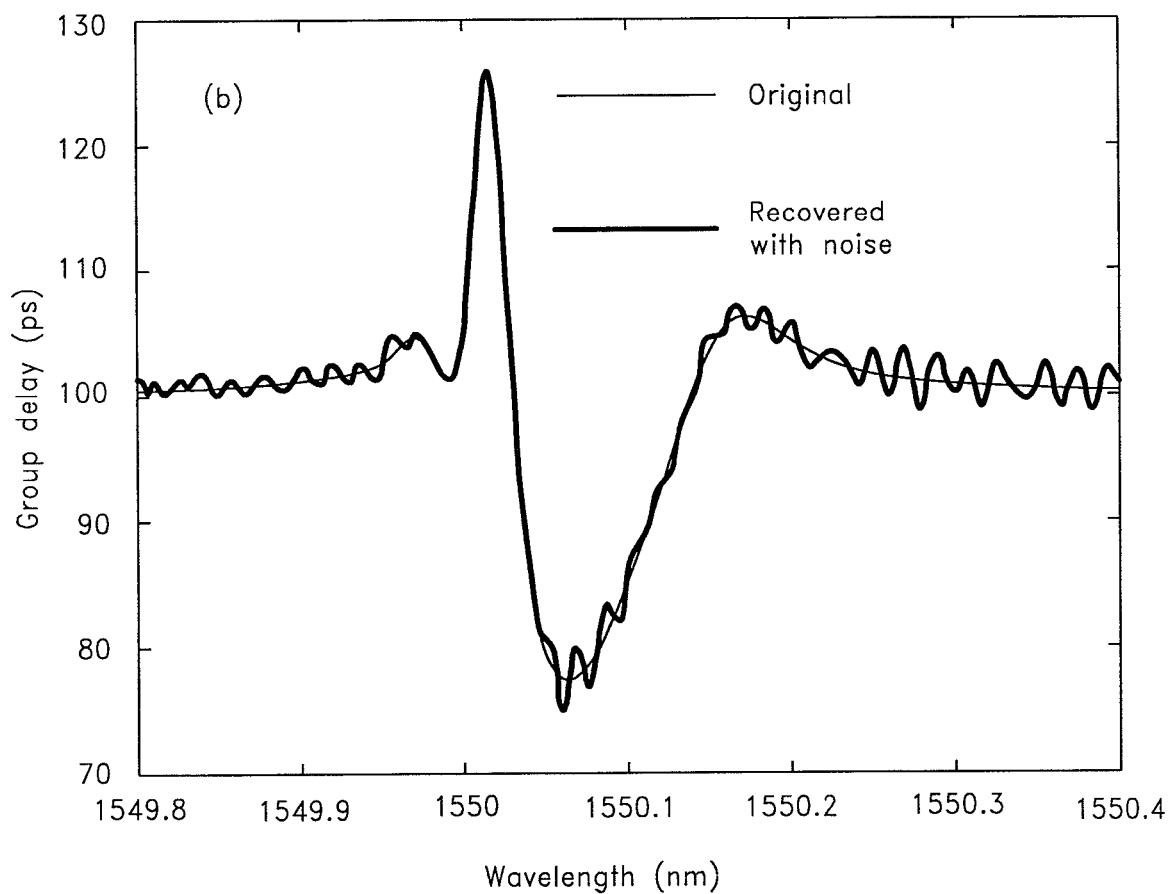
FIG. 5C is a plot of the theoretical transmission group delay spectrum (solid curve) of the FBG of FIG. 5A as a function of wavelength and the recovered transmission group delay spectrum (dotted curve) with 5% uniform noise with a mean of 1.
Figure 6A:
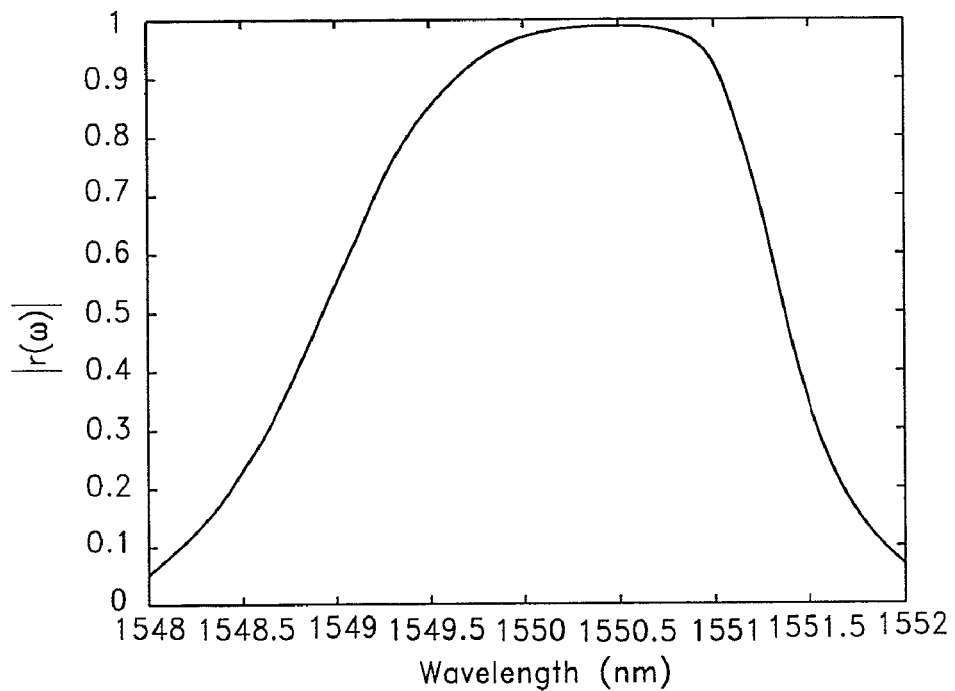
FIG. 6A is a plot of the reflection spectrum amplitude of an asymmetric chirped FBG as a function of wavelength.
Figure 6B:
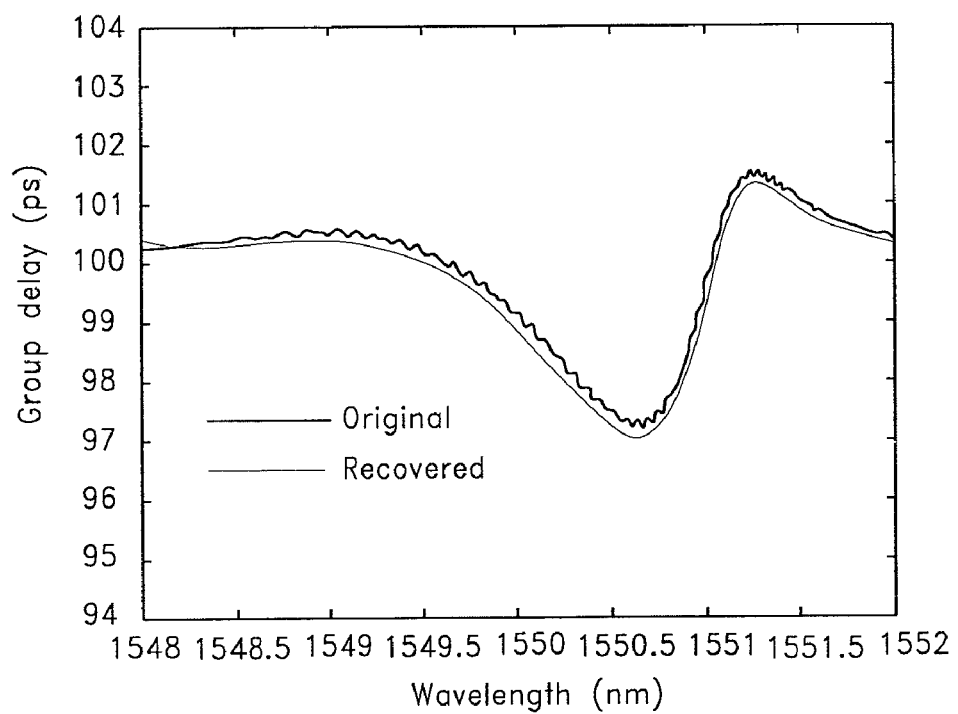
FIG. 6B is a plot of the theoretical transmission group delay spectrum (solid curve) of the FBG of FIG. 6A as a function of wavelength and the recovered transmission group delay spectrum (dashed curve) without any noise present.
Figure 6C:
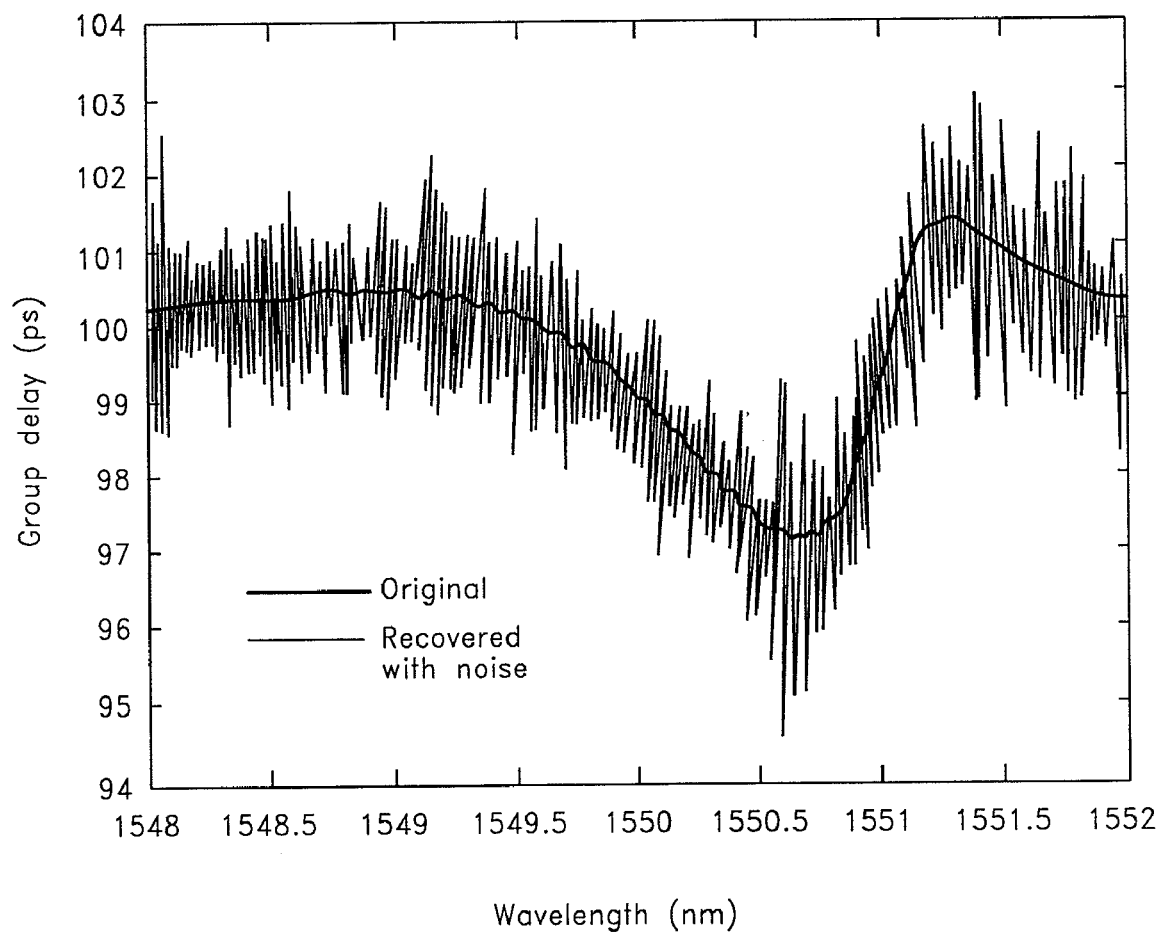
FIG. 6C is a plot of the theoretical transmission group delay spectrum (solid curve) of the FBG of FIG. 6A as a function of wavelength and the recovered transmission group delay spectrum (dotted curve) with 5% uniform noise with a mean of 1.

The method 400 has been used to recover the transmission group delay spectra of various exemplary FBGs to illustrate the usefulness of the method 400. FIGS. 5A-5C and 6A-6C schematically display two such examples. FIGS. 5A-5C schematically illustrate the results for a symmetric Gaussian-apodized FBG. FIGS. 6A-6C schematically illustrate the results for a non-symmetric chirped FBG. The amplitudes of the reflection spectra of both FBGs are shown in FIG. 5A and FIG. 6A, respectively. In FIG. 5B and FIG. 6B, the theoretical transmission group delays are shown with the solid curves, whereas the recovered group delays (without any noise present) recovered using the method 400 (with n=100 iterations) are shown with the dashed curves. These computations each took less then a few seconds with a 500-MHz computer. The recovery for each FBG is so good for each example that it is difficult to distinguish the theoretical group delay curve (solid line) from the recovered group delay curve (dashed line).

To demonstrate the noise performance of the method 400, the theoretical $|t(\omega)|^2$ spectrum was multiplied by 5% uniform noise with a mean of 1, and the method 400 was then applied to this noisy transmission spectrum. The results of the group delay recovery, with again n=100 iterations, are shown in FIG. 5C and FIG. 6C by dotted curves. Once again the recovery is very good, showing that the method 400 can even be quite useful under severe noise.

The vertical scale in FIG. 6B is enlarged so that the small dc offset (on the order of approximately 0.1 to 0.2 picoseconds) between the theoretical and the recovered group delay curves is more visible. With other techniques (e.g., the technique of Poladian referenced above), much stronger dc offsets, on the order of approximately 20 to 30 picoseconds, are observed. The main cause of this small dc offset for the method 400 is the usage of limited bandwidth in the simulations. For example, if a wider wavelength window (greater than 4 nanometers) were used for FIG. 6A, the recovery results would have been much more improved.

Iterative Processing Utilizing Spectral Interferometry

Certain embodiments described herein use a pulsed input laser and an OSA to retrieve both the amplitude and the phase of the reflection or transmission spectrum of an FBG using a single power spectrum measurement. Certain embodiments are referred to herein as spectral interferometry using minimum-phase based algorithms (SIMBA).

Figure 7:
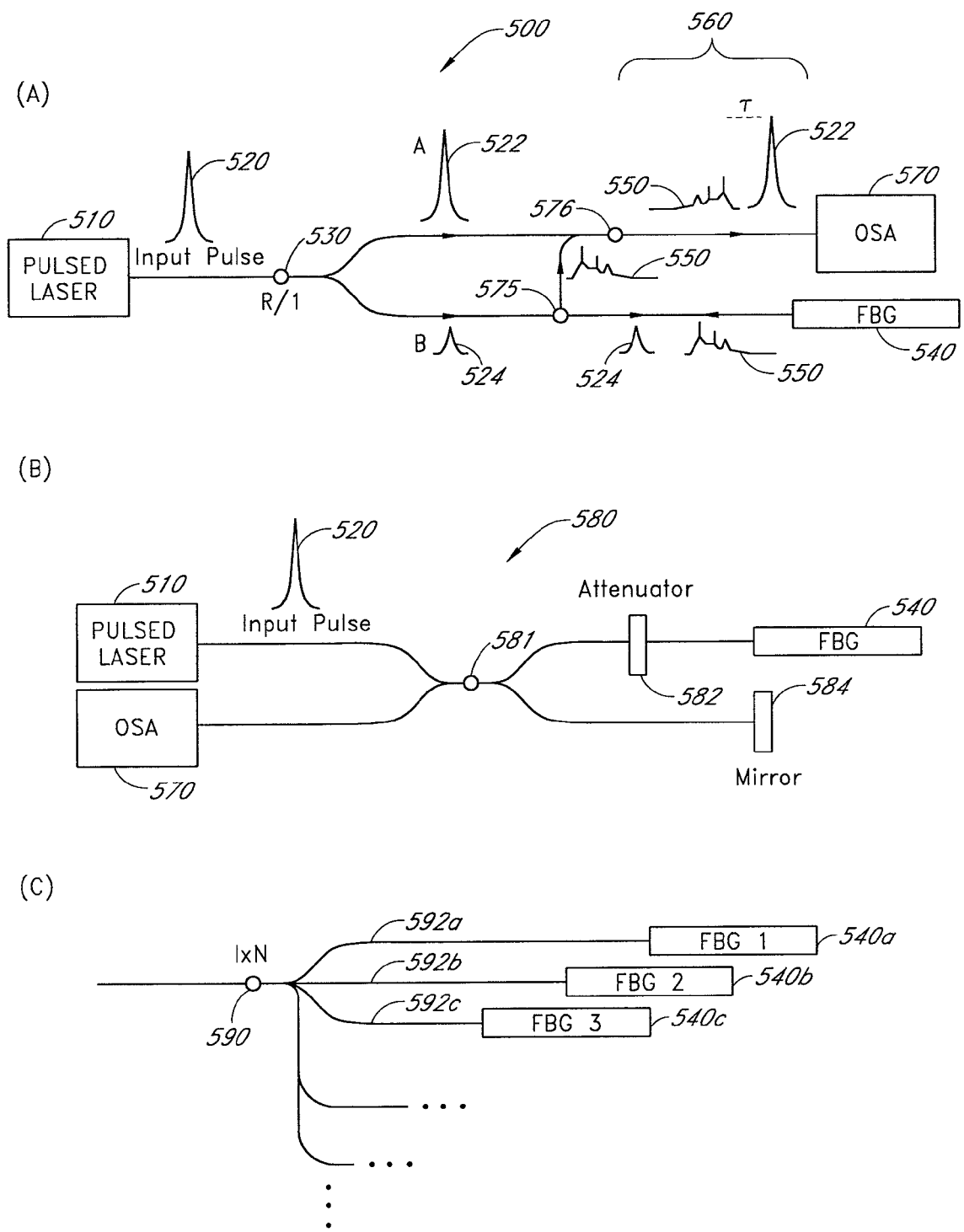
FIGS. 7A and 7B schematically illustrate two exemplary measurement configurations compatible with embodiments described herein.
FIG. 7C schematically illustrates an exemplary configuration of multiple FBGs compatible with certain embodiments described herein.

FIGS. 7A and 7B schematically illustrate two exemplary measurement configurations compatible with embodiments described herein. While these measurement configurations are slightly different, the processing of the measured quantities for the characterization of the FBG, together with the principle of operation, is identical.

In certain embodiments, the measurement configuration 500 of FIG. 7A has a pulsed laser source 510 which generates a laser pulse 520 which is split by a beam splitter 530 with a preferably uneven splitting ratio R, where R>1, into a first laser pulse 522 and a second laser pulse 524. The second laser pulse 524 is then sent to the FBG 540 being characterized. In certain embodiments, the pulsed laser source 510 comprises a mode-locked laser with a temporal width of a few picoseconds (e.g., approximately 2 picoseconds to approximately 4 picoseconds). In certain embodiments, the splitting ratio of the beam splitter 530 is between approximately 1 and approximately 200, while other embodiments have even higher splitting ratios.

In certain embodiments, the reflected pulse 550 from the FBG 540 is collected using circulators 575, 576 and temporally combined with the delayed first laser pulse 522, thereby forming a pulse sequence 560. The pulse sequence 560 has a sharp peak at the leading edge, due to the first laser pulse 522, followed by a broader and much weaker pulse which is due to the reflected pulse 550 from the FBG 540. The pulse sequence 560 is then sent to an OSA 570, which yields the power spectrum or the square of the Fourier transform (FT) amplitude of the electric field envelope of the pulse sequence 560. As is described more fully below, the pulse sequence 560 inputted into the OSA 570, which has a sharp peak at its leading edge, is close to a minimum-phase function (MPF), which makes recovery of its FT phase possible from only the measurement of its FT amplitude, or vice versa. This recovery is performed by processing the measured power spectrum either analytically or iteratively, which yields both the phase and the amplitude of the reflection or transmission spectrum of the FBG 540.

In certain embodiments, the optical path length between the beam splitter 530 and the FBG 540, the optical pathlength between the beam splitter 530 and the OSA 570, and the optical pathlength between the FBG 540 and the OSA 570 are selected to provide a predetermined time delay τ between the portions of the pulse sequence 560 received by the OSA 570 (e.g., the first laser pulse 522 and the reflected pulse 550 from the FBG 540). In certain embodiments, at least one of the optical paths between the beam splitter 530, the FBG 540, and the OSA 570 includes a delay line which can be adjusted to provide a desired time delay τ in the pulse sequence 560.

In certain other embodiments, the beam splitter 530 has a splitting ratio of approximately one, and an attenuator is placed between the beam splitter 530 and the circulator 575. In certain other embodiments, a beam splitter 530 having a splitting ratio greater than one and an attenuator between the beam splitter 530 and the circulator 575 are used. In certain embodiments, the splitting ratio of the beam splitter 530 is adjustable. In certain embodiments, the attenuation of the attenuator is adjustable.

In certain other embodiments, a measurement configuration 580, such as that schematically illustrated by FIG. 7B, utilizes a coupler 581, an attenuator 582, and a mirror 584. In certain embodiments, the splitting ratio of the coupler 581 is approximately equal to one, the mirror 584 is a high reflector, and the attenuator 582 is adjusted such that the amplitude of the reflected spectrum from the FBG 540 is much smaller than the amplitude of the reflected laser pulse from the mirror 584. In certain such embodiments, the reflected laser pulse from the mirror 584 and the reflected spectrum from the FBG 540 are combined by the coupler 581 to form a function which approximates a minimum-phase function.

In certain embodiments, the optical path length between the laser source 510 and the FBG 540, the optical pathlength between the laser source 510 and the mirror 584, the optical pathlength between the FBG 540 and the OSA 570, and the optical pathlength between the mirror 584 and the OSA 570 are selected to provide a predetermined time delay τ between the portions of the pulse sequence 560 received by the OSA 5.70. In certain embodiments, at least one of the optical paths between the laser source 510, the FBG 540, the mirror 584, and the OSA 570 includes a delay line which can be adjusted to provide a desired time delay τ in the pulse sequence 560.

In certain other embodiments, the coupler 581 has a splitting ratio greater than one, and the attenuator 582 between the coupler 581 and the FBG 540 is removed. In certain other embodiments, both a coupler 581 having a splitting ratio greater than one and an attenuator 582 between the coupler 581 and the FBG 540 are used. In certain embodiments, the splitting ratio of the coupler 581 is adjustable. In certain embodiments, the attenuation of the attenuator 582 is adjustable.

Certain embodiments provide advantages over previously-existing techniques, particularly over low-coherence spectral interferometry. In certain embodiments, the time delay τ between the reflected pulse 550 and the first laser pulse 522 can be chosen arbitrarily small as long as the two pulses temporally do not overlap. In certain embodiments, this is especially important if the OSA 570 used for the power spectrum measurement does not have enough resolution to resolve the spectral interference fringes, since the larger the time delay τ between the two pulses, the higher the maximum frequency of oscillations in the power spectrum recorded by the OSA 570. Certain embodiments advantageously allow characterization of more than one FBG at the same time by using a single OSA measurement. Certain embodiments advantageously utilize a laser pulse 520 with a temporal profile width significantly narrower than the impulse response of the FBG 540 being characterized. In contrast, for low-coherence spectral interferometry, the autocorrelation function of the pulsed laser source is required to be much narrower than the impulse response of the FBG. In other words, for the same FBG, certain embodiments described herein give roughly two times better resolution than does low-coherence spectral interferometry.

Figure 8:
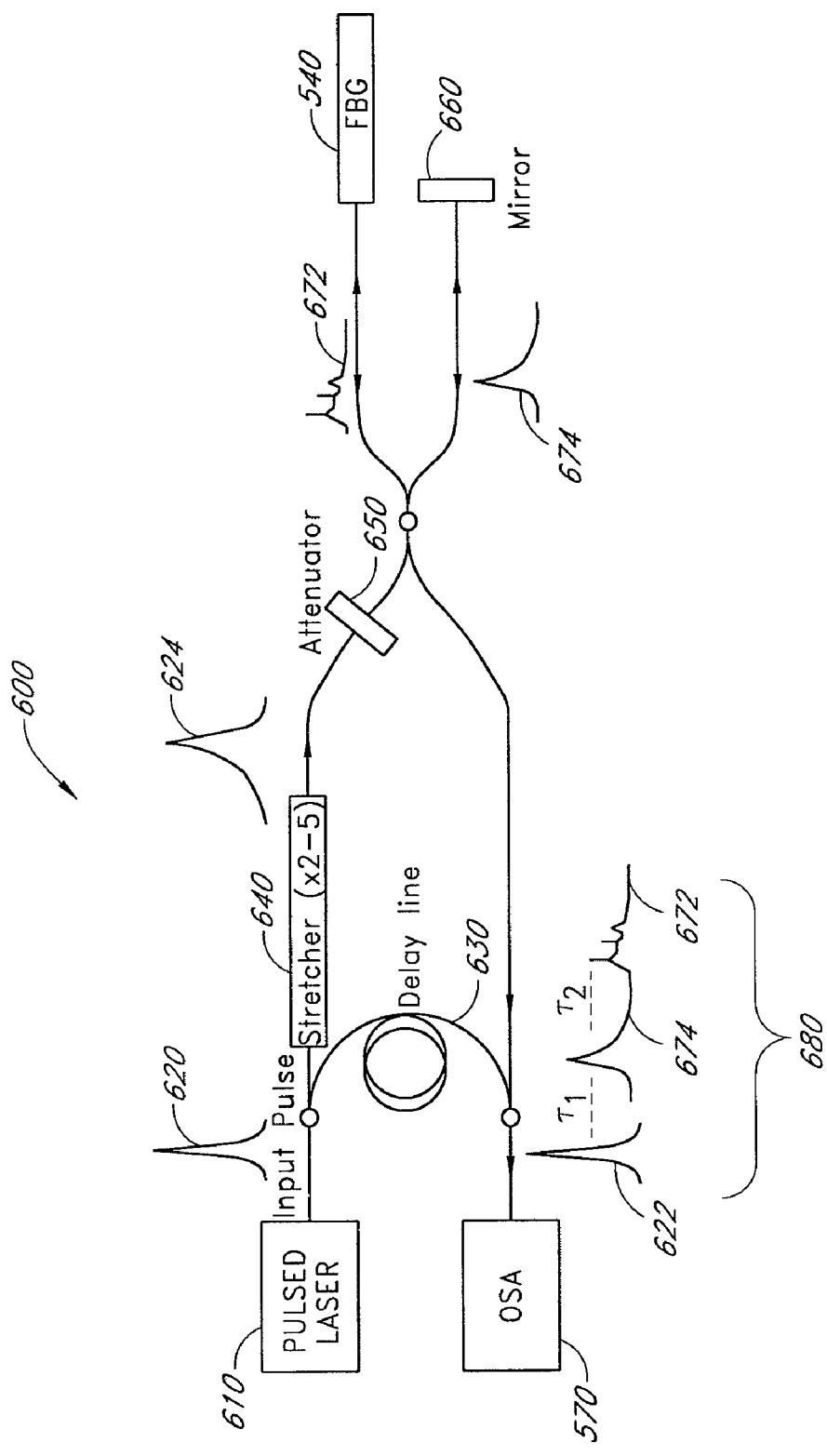
FIG. 8 schematically illustrates another exemplary measurement configuration compatible with certain embodiments described herein.

FIG. 8 schematically illustrates another exemplary measurement configuration 600 compatible with certain embodiments described herein. A pulsed laser source 610 generates an input laser pulse 620 having a temporal width (e.g., 50 picoseconds). The input laser pulse 620 is split into a first laser pulse 622 which is directed to a delay line 630 and a second laser pulse which is directed to a pulse stretcher 640 (e.g., a loop of fiber optic cable). The pulse stretcher 640 broadens the temporal width of the second laser pulse by a predetermined factor (e.g., approximately 2 to 5) to produce a stretched laser pulse 624. The stretched laser pulse 624 is sent through an attenuator 650, and is then split into two weak pulses. One of the weak pulses is directed to the FBG 540 being characterized, while the other weak pulse is reflected from a mirror 660 (e.g., a bare fiber end, a mirrored fiber end, or a mirror placed at the end of the fiber with a collimating lens therebetween). The reflected pulse 672 from the FBG 540 and the reflected pulse 674 from the mirror 660 are temporally combined with the time-delayed version of the first laser pulse 622. The resultant pulse sequence 680 has a dominant pulse at the leading edge followed by two weaker reflected pulses and is received by the OSA 570, which measures the power spectrum. With proper selection of the relative amplitudes of the pulses forming the pulse sequence 680 (e.g., amplitude of the laser pulse 622 is significantly larger than the maximum amplitude of the reflected pulses 672, 674), the pulse sequence 680 approximates a minimum-phase function. In certain such embodiments, the pulse sequence 680 is processed iteratively to recover the reflected pulse 672 from the FBG 540. The processing of the measured FT amplitude from the OSA 570, together with the recovery algorithm described more fully below, are the same as for the measurement configurations 500, 580 of FIGS. 7A and 7B.

Certain embodiments of the measurement configuration 600 schematically illustrated by FIG. 8 provide the same advantages as described above in relation to the measurement configurations 500, 580 of FIGS. 7A and 7B. In certain embodiments, the measurement configuration 600 of FIG. 8 provides other advantages as well. In certain embodiments, the measurement configuration 600 advantageously does not require that the input laser pulse be temporally much narrower than the impulse response of the FBG 540. For example, low-coherence spectral interferometry typically requires laser pulse widths of approximately 1 picosecond to accurately characterize an FBG with an impulse response of approximately 100 picoseconds duration. In contrast, certain embodiments utilizing the measurement configuration 600 advantageously avoid this constraint on the laser pulse width. For example, laser pulse widths of 50 picoseconds could be used to fully characterize the impulse response of the FBG 540.

Mathematically, the reflection impulse response $h_R(t)$ and the transmission impulse response $h_T(t)$ of an FBG are simply the inverse Fourier transforms of the complex reflection spectrum $r(\omega)$ and the complex transmission spectrum $t(\omega)$, respectively. Therefore, knowing the impulse response of an FBG also means knowing the complex spectrum of the FBG. Since the impulse response of an FBG is a complex quantity, measuring the impulse response of an FBG is as equally challenging as measuring the whole complex spectrum of the FBG.

The transmission impulse response, $h_T(t)$, where t is the relative time, of all FBGs belong to the class of minimum-phase functions (MPFs). (See, e.g., L. Poladian, "*Group-Delay Reconstruction for Fiber Bragg Gratings in Reflection and Transmission,*" Optics Letters, 1997, Vol. 22, pp. 1571-1573; J. Skaar, "*Synthesis of Fiber Bragg Gratings for Use in Transmission,*" J. Op. Soc. Am. A, 2001, Vol. 18, pp. 557-564.) An MPF is characterized by having a z-transform with all its poles and zeros on or inside the unit circle. As a result of this property, the FT phase and the logarithm of the FT amplitude of an MPF are the Hilbert transform of one another. Consequently, the FT phase of an MPF can always be recovered from its FT amplitude, and an MPF can always be reconstructed from its FT amplitude alone. This property of MPFs is used in certain embodiments described herein to retrieve the whole complex transmission spectrum t(ω) from only the measured reflection spectrum amplitude |r(ω)| or the measured transmission spectrum amplitude |t(ω)| (since for a lossless grating $|t(\omega)|^2+|r(\omega)|^2=1$). This recovery of the complex reflection spectrum or the complex transmission spectrum can be achieved by either analytical or iterative techniques. (See, e.g., A. Ozcan et al., "*Group Delay Recovery Using Iterative Processing of Amplitude of Transmission Spectra of Fibre Bragg Gratings*," Electronics Letters, 2004, Vol. 40, pp. 1104-1106.) Generally, the reflection impulse response, $h_R(t)$ of an FBG is not an MPF, so the whole complex reflection spectrum r(ω) cannot be uniquely recover from only the amplitude spectrum measurement. However, once the complex reflection spectrum r(ω) has been characterized by some means, the complex transmission spectrum t(ω) is also fully characterized using $|t(\omega)|^2=1-|r(\omega)|^2$, since t(ω) can fully be recovered from only |t(ω)| due to the above mentioned MPF property. Certain embodiments described herein are the first application of the concept of MPFs to the characterization of FBG spectra, either reflection or transmission.

Figure 9:
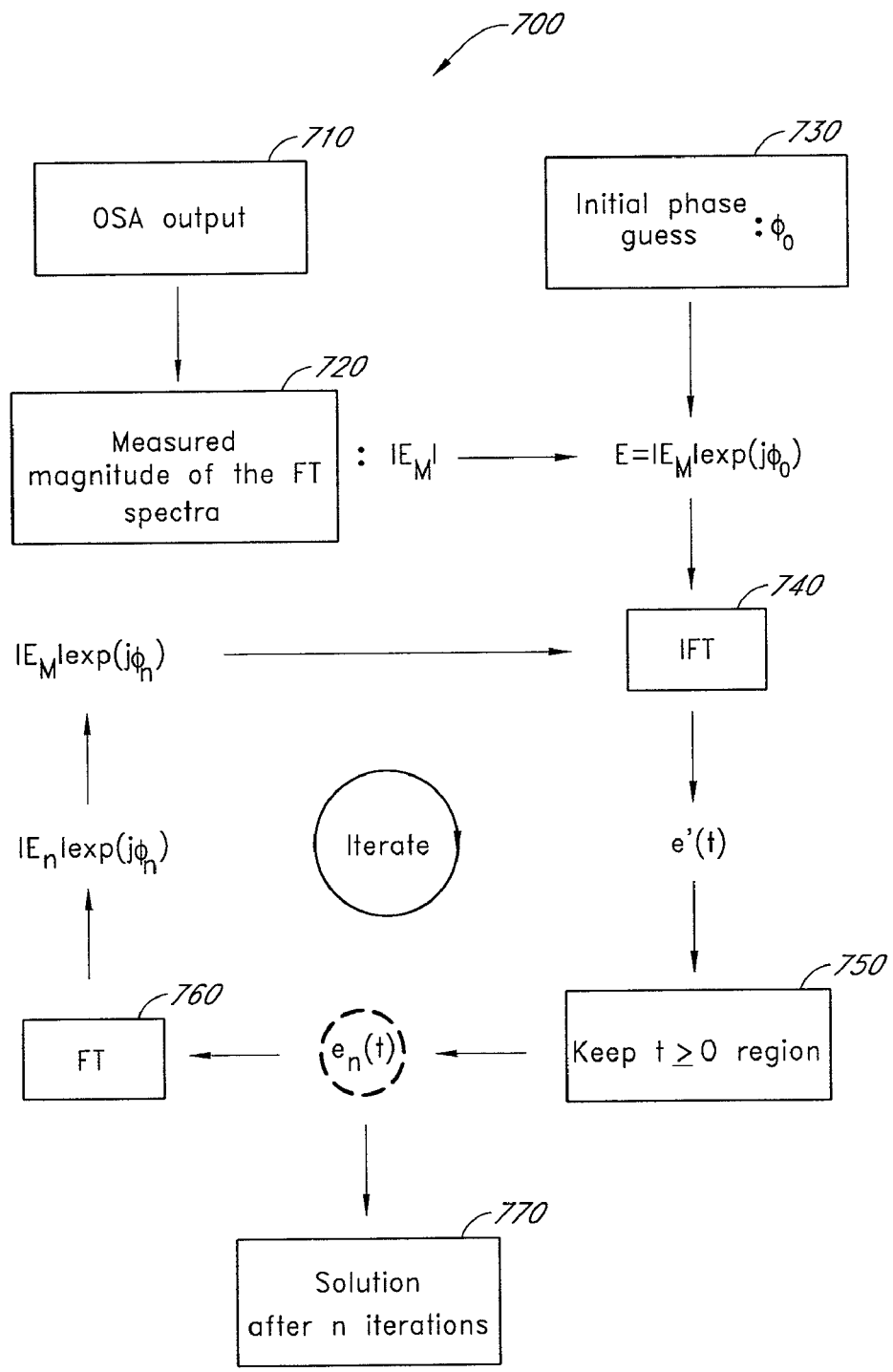
FIG. 9 is a block diagram of a method of characterizing an FBG in accordance with certain embodiments described herein.

FIG. 9 is a block diagram of a method 700 of characterizing an FBG in accordance with certain embodiments described herein. The method 700 includes an iterative error-reduction algorithm which uses the measured FT amplitude $|E_M(f)|$ of an unknown function e(t), together with the known properties of e(t) (e.g., being causal), and iteratively corrects an initial guess for e(t). (See, e.g., J. R. Fienup, "*Reconstruction of an Object from the Modulus of its Fourier Transform*," Optics Letters, 1978, Vol. 3, pp. 27-29; R. W. Gerchberg and W. O. Saxton, "*Practical Algorithm for the Determination of Phase from Image and Diffraction Plane Pictures*," Optik, 1972, Vol. 35, pp. 237-246.)

In certain embodiments, the method 700 recovers the complex electric field envelope e(t) of the impulse response of an FBG. In certain embodiments, the OSA output 710 is used to provide the measured FT amplitude $|E_M(f)|$ of a complex MPF, e(t). As shown by the block 720, e(t) is the only quantity inputted into the method 700. In certain embodiments, the function e(t) is an exact MPF, while in certain other embodiments, the function e(t) only approximates an MPF. (See, e.g., T. F. Quatieri, Jr. and A. V. Oppenheim, "*Iterative Techniques for Minimum Phase Signal Reconstruction from Phase or Magnitude*," IEEE Trans. on Acoustics, Speech, and Signal Processing, 1981, Vol. 29, pp. 1187-1193; M. Hayes et al., "*Signal Reconstruction from Phase or Magnitude*," IEEE Trans. Acoustics, Speech, and Signal Processing, 1980, Vol. 28, pp. 672-680; A. Ozcan et al., "*Iterative Processing of Second-Order Optical Nonlinearity Depth Profiles*," Optics Express, 2004, Vol. 12, pp. 3367-3376.)

Prior to the method 700 being performed, the FT phase spectrum is unknown. Therefore, in certain embodiments, an arbitrary initial guess $\phi_0(f)$ is used for the phase spectrum, as shown by the block 730. Generally, this initial guess of the phase does not significantly affect the accuracy of the result of the method 700. For this reason, in certain embodiments, $\phi_0(f)$ is conveniently chosen to be equal to zero.

Using the measured FT amplitude $|E_M(f)|$ and the initial guess of the phase $\phi_0(f)$, the inverse Fourier transform (IFT) $e'(t)=|E_M(f)|\cdot\exp(j\phi_0)$ is calculated numerically, as shown by the block 740. The method 700 further comprises applying at least one constraint to the IFT, in the operational block 750. For example, in certain embodiments, since all MPFs are causal, only the t≧0 portion of e'(t) is retained, while all values of e'(t) for t<0 are set to zero, as indicated by the block 750 of FIG. 9. In certain embodiments in which e(t) is known to be limited in time (e.g., finite temporal duration of less than 100 picoseconds), in the calculation of block 750, the values of e'(t) for t>100 picoseconds are also set to zero, which speeds up convergence. As described above, various other characteristics of e'(t) may be used as sources for the applied constraint, which include but are not limited to, finite bandwidth of the FBG, uniformity of the FBG, and using only the real portion of e'(t).

In certain embodiments, the result of the calculation of the block 750 is a new function $e_1(t)$, which is the first estimate of the complex MPF e(t). In certain embodiments, the FT of the first estimate $e_1(t)$ is calculated, as indicated by the block 760, thereby providing a new phase $\phi_1(f)$ and a new amplitude $|E_1(f)|$ for the FT of e(t).

Since the amplitude of the FT spectrum must be equal to the measured amplitude $|E_M(f)|$, $|E_1(f)|$ is replaced by $|E_M(f)|$ and the loop is repeated using $|E_M(f)|$ and $\phi_1(f)$ as the new input spectra to the block 740, which provides a second function $e_2(t)$. This loop is repeated n times, until convergence is achieved. In certain embodiments, convergence is achieved once the difference between two consecutive estimates of the function $\int|e_n(t)-e_{n-1}(t)|^2 dt/\int|e_n(t)|^2 dt$ is less than a predetermined value (e.g., 0.1%). At the end of the n-th iteration, $e_n(t)$ is the recovered complex MPF, as indicated by the block 770. Typically, approximately 100 iterations are adequate for achieving convergence, which only takes a few seconds to compute using MATLAB on a 500 MHz computer with $2^{14}$ data points.

Although it has not been proven mathematically, it has been found empirically that the method 700 always converges to the minimum-phase function corresponding to a given FT amplitude. In other words, of the infinite family of FT phase functions that can be associated with the known (measured) FT amplitude, the method 700 converges to the one and only one that has the minimum phase. Since this solution is unique, if the profile to be reconstructed is known a priori to be an MPF or to approximate an MPF, then the solution provided by the error-reduction method 700 is the correct profile.

To understand intuitively which physical functions are likely to be minimum-phase functions, an MPF is denoted by $e_{min}(n)$, where n is an integer that labels sampled values of the function variable, e.g., relative time in the present case of ultra-short pulses. Because all physical MPFs are causal, $e_{min}(n)$ must be equal to zero for n<0. The energy of a minimum-phase function, which is defined as $$\sum_{n=0}^{m-1}|e_{min}(n)|^2$$

for m samples of the function, satisfies the inequality $$\sum_{n=0}^{m-1}|e_{min}(n)|^2 \geq \sum_{n=0}^{m-1}|e(n)|^2$$

for all possible values of m>0. In this inequality, e(n) represents any of the functions that have the same FT amplitude as $e_{min}(n)$. This property suggests that most of the energy of $e_{min}(n)$ is concentrated around n=0. Stated differently, any profile with a dominant peak around n=0 (e.g., close to the origin) will be either a minimum-phase function or close to one, and thus it will work extremely well with the iterative error-reduction method 700 schematically illustrated by FIG. 9. Although there might be other types of MPFs besides functions with a dominant peak, this class of MPFs is advantageously used because they are straightforward to engineer with optical pulses and because they yield exceedingly good results.

In certain embodiments, the method 700 can be used to uniquely characterize the whole complex reflection and hence transmission spectra of any FBG by recovering the reflection impulse response, $h_R(t)$, using a single FT amplitude measurement. Certain embodiments described herein rely on the fact that by increasing the peak amplitude of the leading pulse in a sequence of pulses, the entire pulse sequence (even if the sequence is a complex quantity, such as the electric field envelope) becomes close to an MPF, which makes the recovery of the phase information possible from only the FT amplitude measurements.

Referring to the measurement configurations of FIGS. 7A and 7B, a short laser pulse 524 with a complex electric field envelope of E(t) impinges an FBG 540 being characterized. The reflected pulse spectrum 550 can simply be calculated as $E_{Refl}(\omega)=E(\omega)\cdot r(\omega)$, where $E(\omega)$ is simply the FT of E(t). (See, e.g., L. R. Chen et al., "*Ultrashort Pulse Reflection From Fiber Gratings: A Numerical Investigation*," J. of Lightwave Technology, 1997, Vol. 15, pp. 1503-1512.) For simplicity and convenience, the term $\exp(j\cdot\omega_c)$, where $\omega_c$ corresponds to the center frequency of the input laser 510 has been dropped. In the time domain, the reflected pulse envelope 550 can then be expressed as $E_{Refl}(t)=E(t)*h_R(t)$, where '*' stands for the convolution operation. Therefore, the complex electric field envelope of the reflected pulse 550 is simply a convolution of the reflection impulse response of the FBG 540 with the complex electric field of the input pulse 524. For embodiments in which the input laser pulse 520 is temporally much narrower than the impulse response of the FBG 540, the reflected pulse 550 from the FBG 540 $E_{Refl}(t)$ approximates or equals the reflection impulse response $h_R(t)$. Most commercially available FBGs operate at a wavelength of approximately 1550 nanometers, so the temporal width of the reflection impulse response of such an FBG is approximately 50 picoseconds to approximately 100 picoseconds, or longer. Thus, in certain embodiments, an input laser pulse 520 having a temporal width of a few picoseconds practically acts as a delta function to yield $E_{Refl}(t)=h_R(t)$. However, in terms of measurement complexity, since both $E_{Refl}(t)$ and $h_R(t)$ are complex quantities, to recover these complex quantities, two independent measurements would typically be used, one for the amplitude and the other for the phase.

Referring to the measurement configuration 500 of FIG. 7A, the reflected impulse response $h_R(t)$ of the FBG 540 is combined in the time domain with the second laser pulse 522, denoted by $E_A(t)$, with a time delay of $\tau$ between the two pulses. The resulting pulse sequence 560, expressed as $E_{Seq}(t)=E_A(t)+h_R(t-\tau)$, is then sent to the OSA 570, which yields the optical power spectrum or the square of the FT amplitude of the complex electric field envelope of the pulse sequence 560, expressed as $|E_{Seq}(\omega)|^2$, where $E_{Seq}(\omega)$ is the FT of $E_{Seq}(t)$. Using only the measured FT amplitude square $|E_{Seq}(\omega)|^2$, certain embodiments recover the reflection impulse response $h_R(t)$ based on the properties of MPFs. In certain embodiments, $E_{Seq}(t)$ is selected to approximate a true MPF by increasing the peak amplitude of $E_A(t)$, and recovering its FT phase from only its FT amplitude $|E_{Seq}(\omega)|$. In certain embodiments, the recovery of the FT phase spectrum is achieved by using an analytical Hilbert transformation. However, in certain other embodiments, an iterative error-reduction method, such as the method 700 schematically illustrated in FIG. 9, is preferably used to recover the phase spectrum, due to the simplicity and better noise performance of the method.

Figure 10:
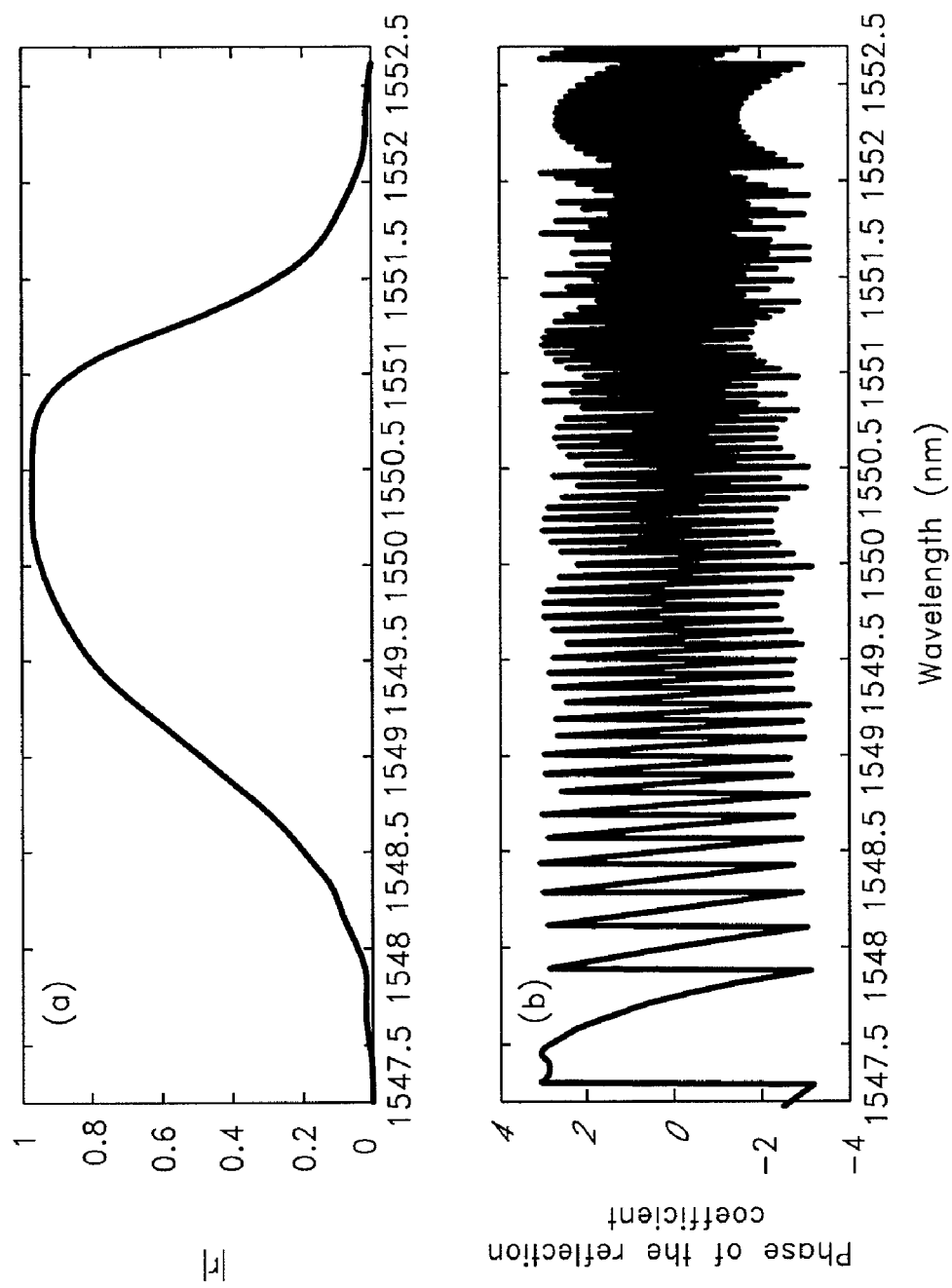
FIGS. 10A and 10B are plots of the theoretical electric field reflection coefficient amplitude and phase, respectively, of an exemplary asymmetric chirped FBG.
Figure 11:
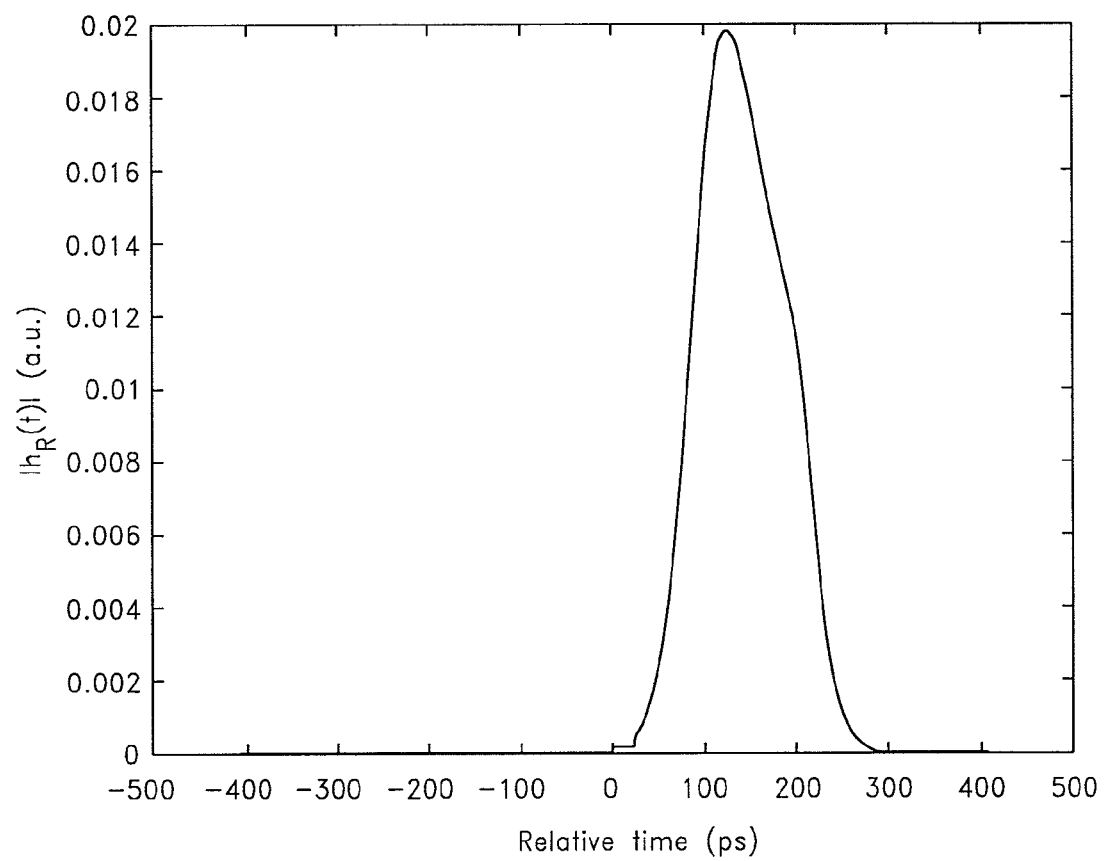
FIG. 11 is a plot of the amplitude of the theoretical reflection impulse response of the FBG of FIGS. 10A and 10B.

A numerical example illustrates the recovery of $E_{Refl}(t)=h_R(t)$ from only the measured quantity, $|E_{Seq}(\omega)|^2$ or $|E_{Seq}(\omega)|$ using the measurement configuration of FIG. 7A and the method 700 of FIG. 9. A strongly chirped asymmetric FBG is used in this numerical example to make the recovery a harder task. The theoretical electric field reflection coefficient amplitude and phase of the chosen chirped FBG, which was calculated using a transfer matrix formalism (see, e.g., T. Erdogan, "*Fiber Grating Spectra*," J. of Lightwave Technology, 1997, Vol. 15, pp. 1277-1294), are shown in FIGS. 10A and 10B, respectively. The reflection band of this FBG is approximately 4 nanometers wide, between approximately 1548 nanometers and approximately 1552 nanometers. The amplitude of the theoretical reflection impulse response of this FBG is shown in FIG. 11. The temporal width of the reflection impulse response is approximately 300 picoseconds. The observed broadened temporal behavior is mostly due to the strong chirp of the reflection coefficient. As expected, the reflection impulse response of the FBG shown in FIG. 11 is causal.

Figure 12:
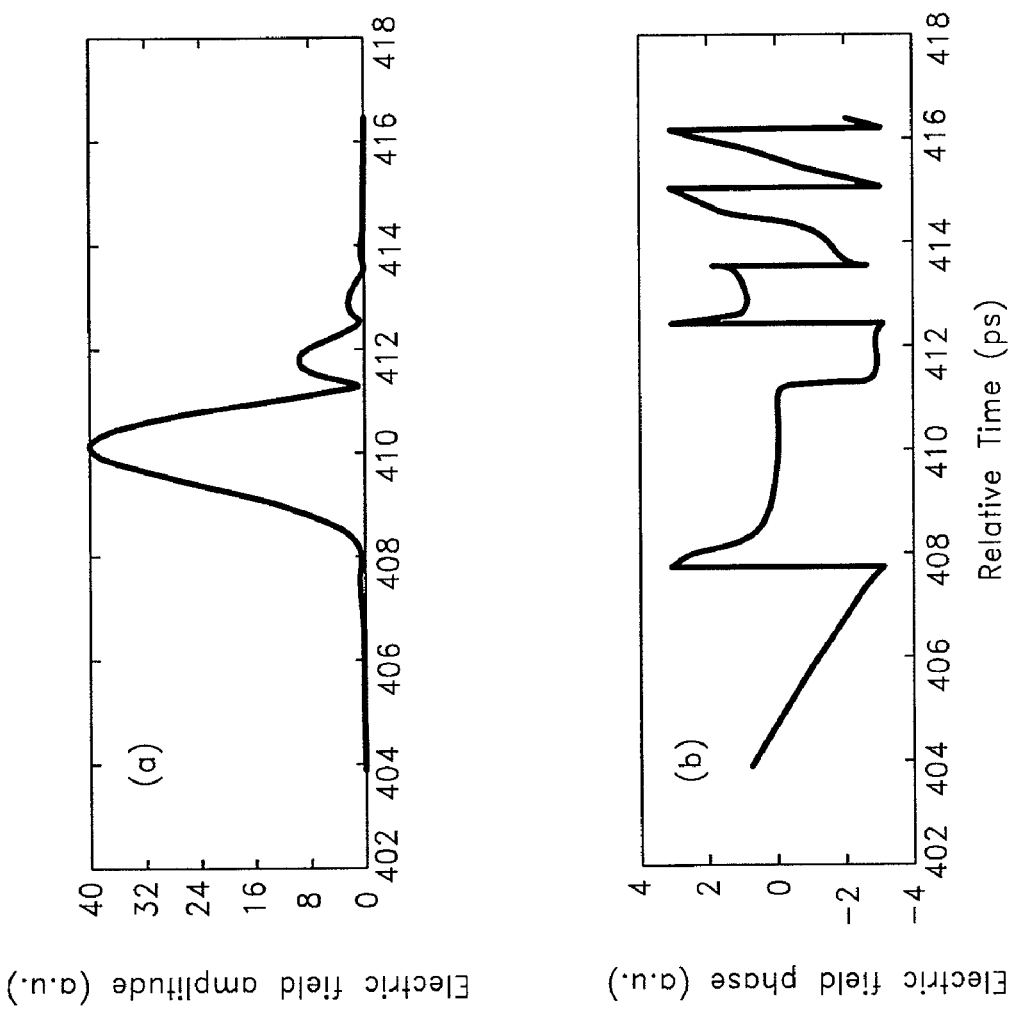
FIGS. 12A and 12B illustrates the amplitude and phase, respectively, of an exemplary temporal profile of the input laser pulse.
Figure 13:
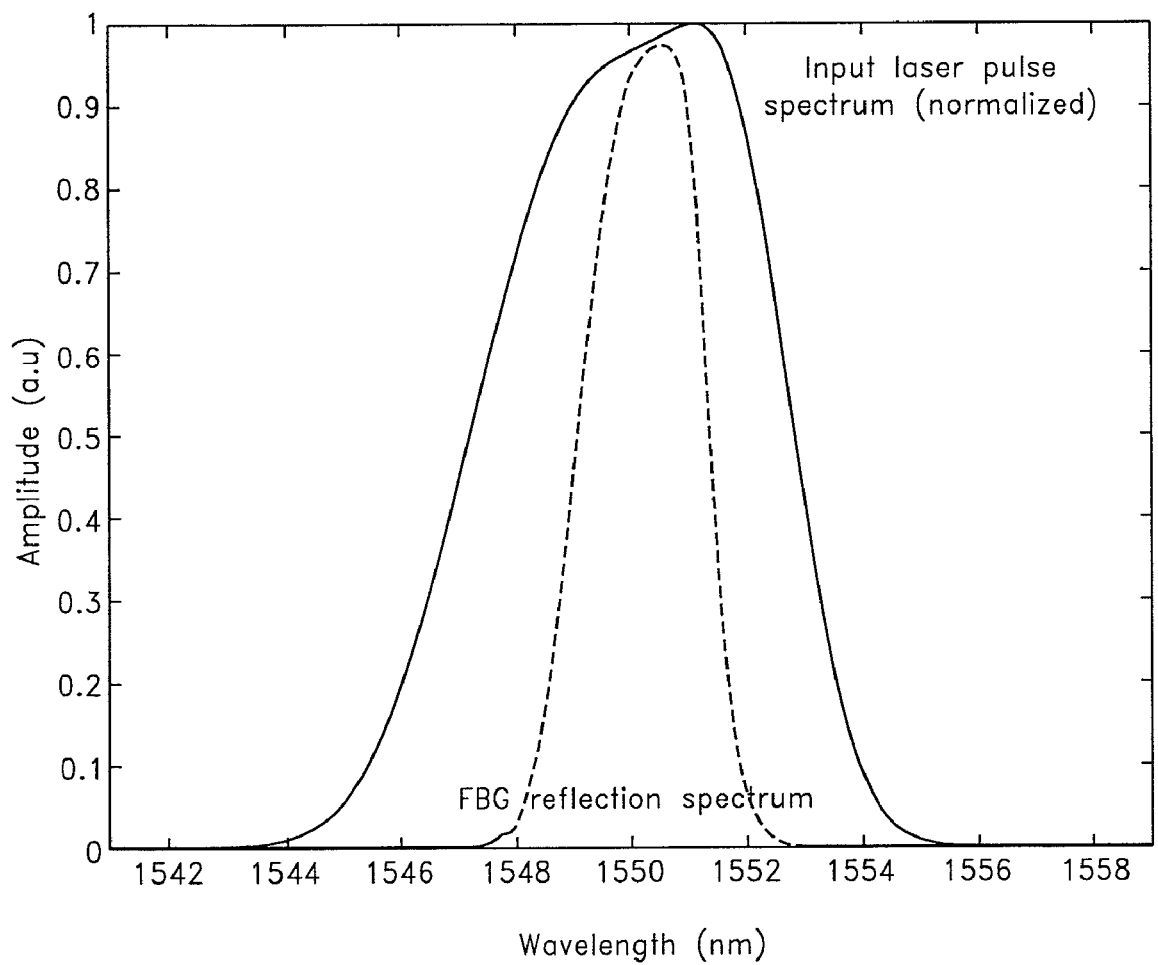
FIG. 13 is a plot of the normalized amplitude of the input laser pulse spectrum together with the reflection spectrum of the exemplary FBG of FIGS. 10A and 10B.

FIGS. 12A and 12B illustrate the amplitude and phase, respectively, of the temporal profile of the input laser pulse used in the exemplary numerical simulation of FIGS. 10A, 10B, and 11. The temporal width of the chosen laser pulse is less than approximately 6 picoseconds, such that the laser pulse approximates as a delta function for the reflection impulse response of FIG. 11. The normalized amplitude of the input laser pulse spectrum together with the reflection spectrum of the exemplary FBG of FIGS. 10A and 10B are also plotted in FIG. 13. In certain embodiments, not only does the input laser pulse have a temporal width much narrower than the impulse response of the FBG, whereby the input laser pulse acts as a delta function, but also the input laser pulse has a power spectrum that covers all the frequencies in the FBG reflection spectrum, as shown in FIG. 13.

Figure 14:
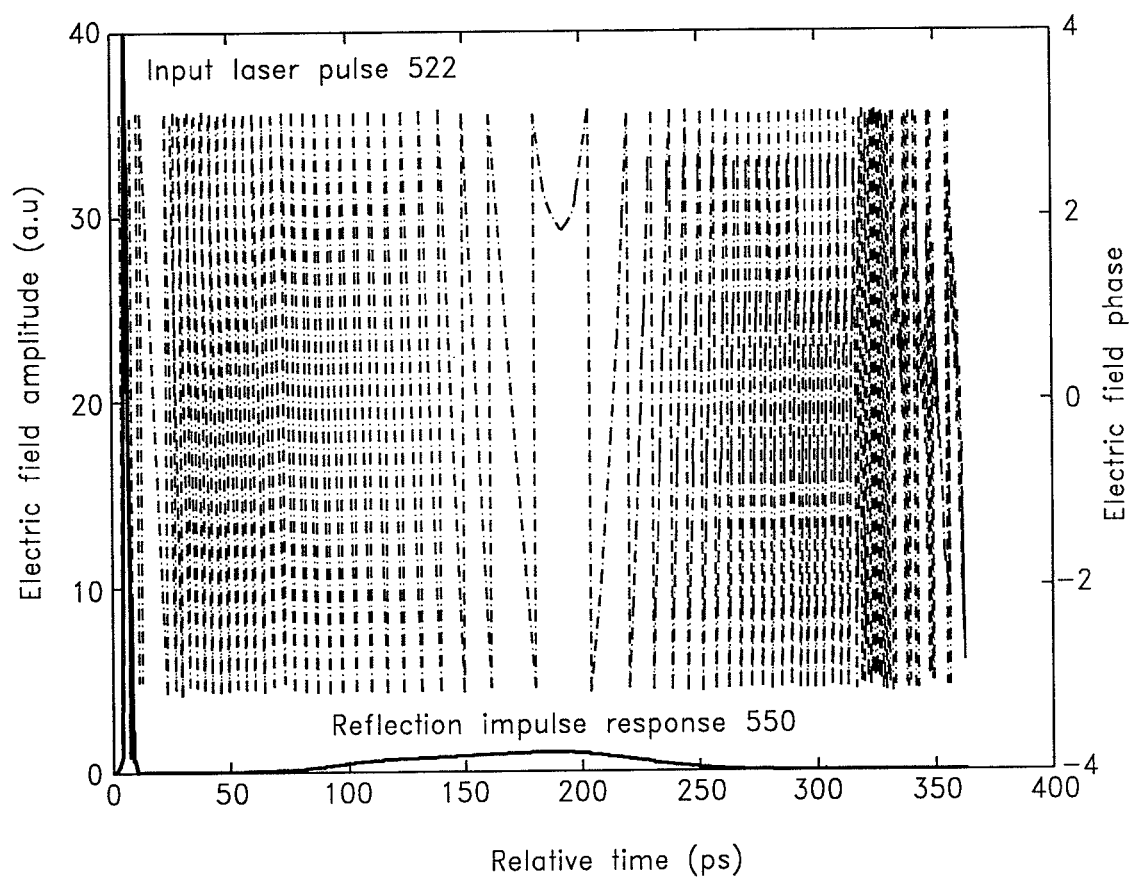
FIG. 14 is a plot of the electric field amplitude (solid line) and phase (dashed line) for a pulse sequence inputted to an optical spectrum analyzer in accordance with certain embodiments described herein.

Using the measurement configuration of FIG. 7A, the amplitude (solid line) and the phase (dashed line) of the pulse sequence 560 is formed, as plotted in FIG. 14. The pulse sequence 560 includes the laser pulse 522 and the weaker reflected pulse 550, which approximates the reflection impulse response of the FBG 540. A splitting ratio of 40 was used between the peak amplitude of the laser pulse 522 and the peak amplitude of the reflection impulse response 550 of the FBG. In certain embodiments, this splitting ratio of 40 ensures that the complex electric field envelope of the pulse sequence is close to an MPF to uniquely recover $h_R(t)$ from only the measurement of the power spectrum of the pulse sequence.

Figure 15:
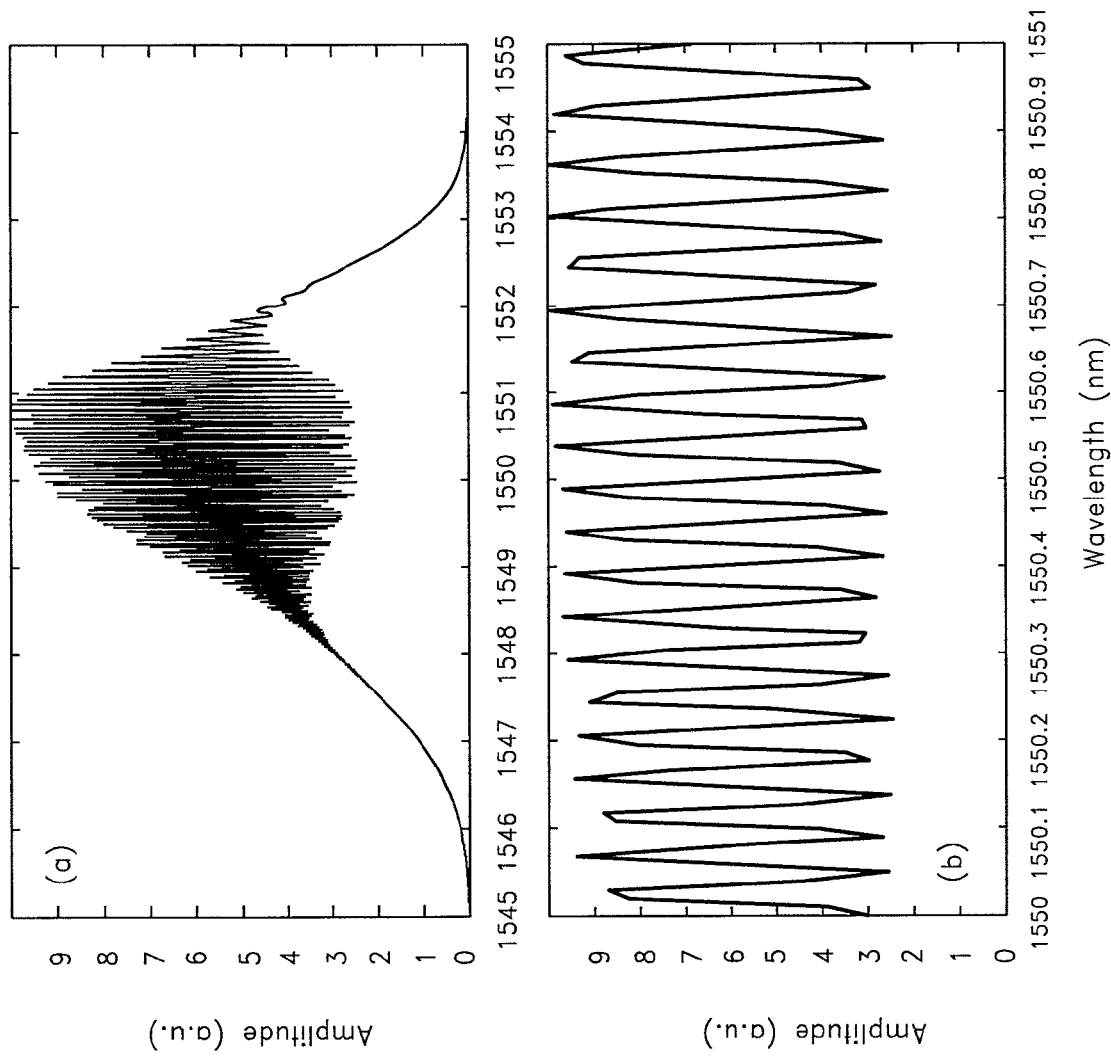
FIG. 15A is a plot of the calculated power spectrum corresponding to the pulse sequence of FIG. 14.
FIG. 15B is a plot of an enlarged view of the same calculated power spectrum of FIG. 15A.

The pulse sequence 560 is then sent to the OSA 570, which records the power spectrum or the square of the FT amplitude of complex electric field envelope of the pulse sequence, as shown in FIG. 14. The calculated power spectrum is plotted in FIGS. 15A and 15B for a splitting ratio of 40. To calculate the power spectra of FIGS. 15A and 15B, the resolution of the OSA 570 was assumed to be limited by approximately 10 picometers, which is a modest resolution for currently available spectrum analyzers. Other OSAs compatible with embodiments described herein have sub-picometer resolution. FIG. 15B shows an enlarged view of the same power spectrum of FIG. 15A in the range of wavelengths between approximately 1550 nanometers and approximately 1551 nanometers. FIG. 15B illustrates that due to the limiting 10 picometer resolution of the OSA 570, some sharp features of the power spectrum curve are actually lost. As discussed more fully below, the whole complex spectrum of the target FBG can still be recovered accurately. The fringe pattern shown in FIGS. 15A and 15B is the result of interference between the input laser pulse spectra and the FBG reflection spectra. This interference is only observed in the frequency band of the reflection spectrum of the FBG, and the overall envelope of the power spectrum in FIGS. 15A and 15B follows the power spectrum of the input laser pulse.

Figure 16:
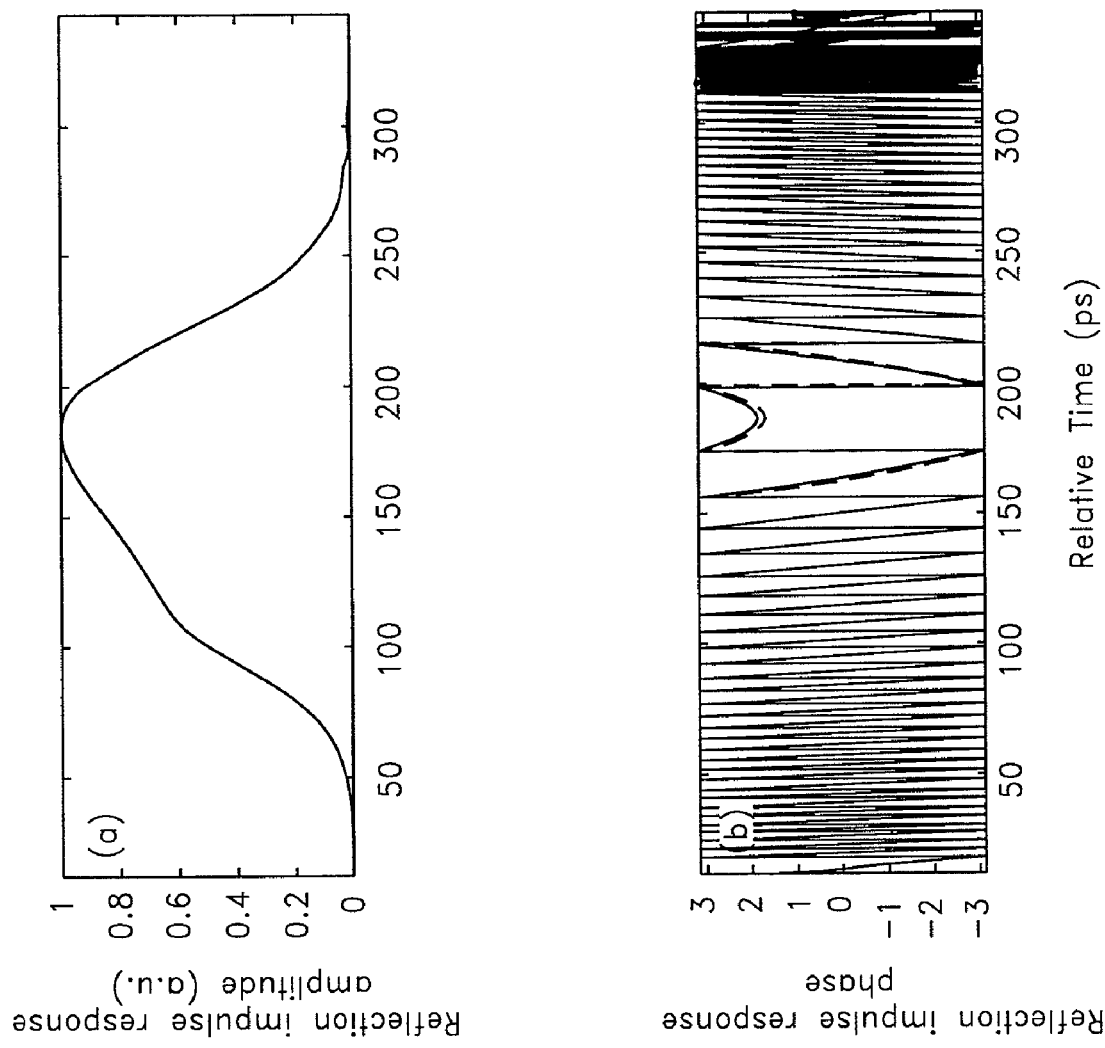
FIGS. 16A and 16B show the amplitude and phase, respectively, the recovered complex reflection impulse response (dashed lines) and the original complex reflection impulse response (solid lines) of the target FBG.

FIGS. 16A and 16B show the amplitude spectrum and phase spectrum, respectively, of the complex reflection impulse response of the target FBG recovered by inputting the output of the OSA 570 into the iterative error-reduction method 700 shown in FIG. 9. The solid and dashed curves of FIG. 16A correspond to the original and recovered amplitudes, respectively, of the impulse response. The solid and dashed curves of FIG. 16B correspond to the original and recovered phases, respectively, of the impulse response. The recovered impulse response is an excellent fit to the original impulse response. In fact, it is difficult to see any difference between the solid and dashed curves of FIG. 16A, and the difference between the solid and dashed curves of FIG. 16B are small.

The time origin information for the recovered reflection impulse response is lost in FIGS. 16A and 16B. In principle, the origin can be redefined by using the causality property of the impulse response, i.e., by choosing the point to the left of which the recovered impulse response is all zero, as the new time origin. Any error in the redefinition of the time origin is, however, inconsequential, since a time shift in the impulse response merely adds a linear phase to its FT phase. The recovered group delay will therefore only have a constant offset, which will be proportional to the error made in the time origin. This constant group delay offset is inconsequential for practical applications and can simply be recovered by noting the value of the group delay away from the FBG reflection spectrum.

FIGS. 16A and 16B do not show the recovery of the leading input pulse electric field since it is not of interest. The input laser pulse simply acts as a dummy pulse for the recovery. The data processing does recover the leading input pulse if FIG. 14 as well, but it does not generally recover it accurately, primarily because the pulse sequence only approximates a true MPF. In other words, in certain embodiments in which the pulse sequence only approximates a true MPF, the recovery of the leading input laser pulse's electric field is affected, but the accuracy of the recovered reflection impulse response of the FBG is not affected. However, any errors in the recovered input laser pulse profile are inconsequential since the input laser pulse profile is not the target of the analysis. In certain embodiments, the temporal profile of the input laser pulse is selected or engineered to result in a pulse sequence which is a more exact approximation of an MPF. Certain such embodiments advantageously increase the speed of convergence of the calculations or allow the application of the Hilbert transformation in the calculations.

Figure 17:
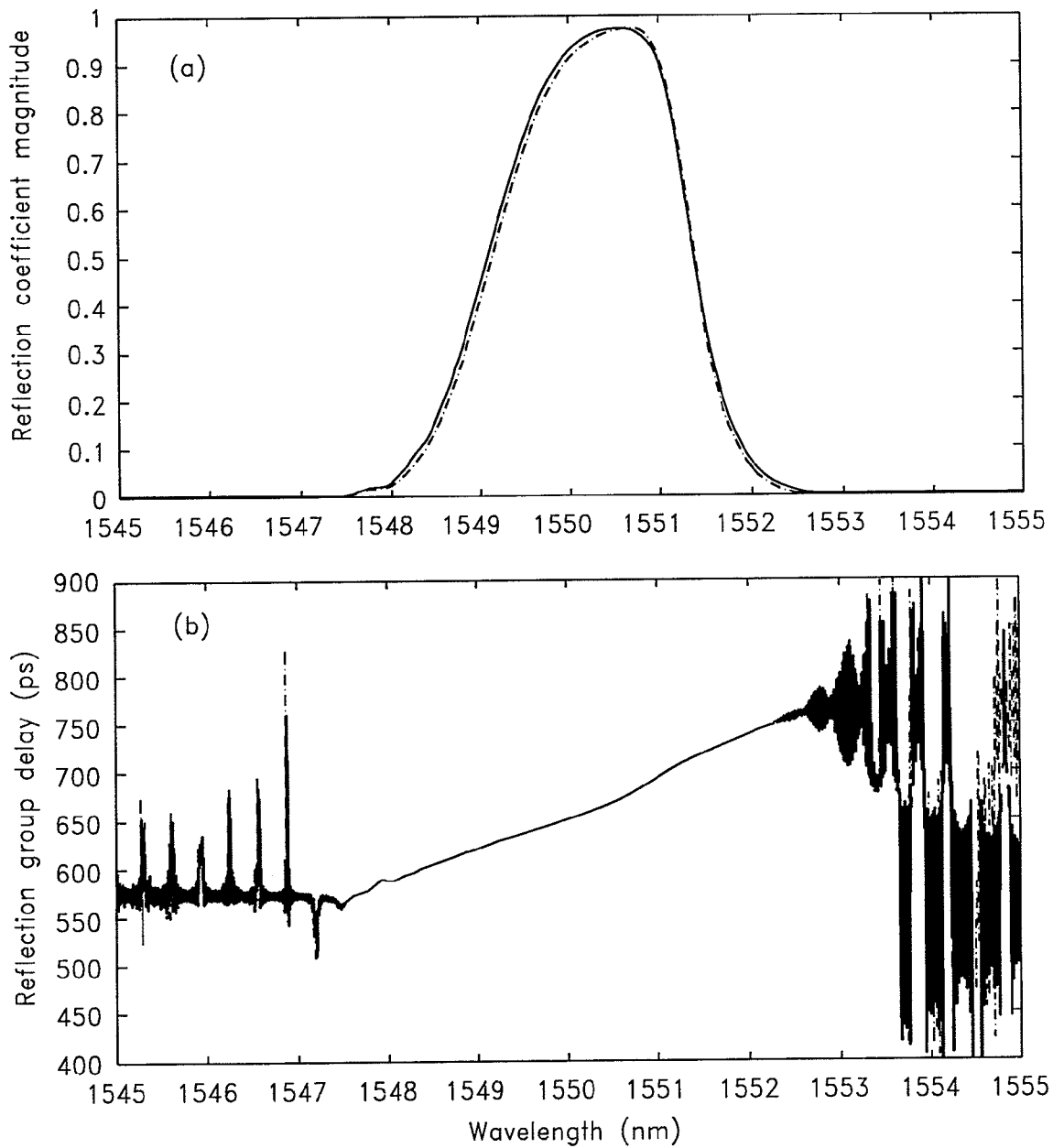
FIGS. 17A and 17B are plots of the reflection coefficient amplitude and the group delay spectra of the FBG calculated from the recovered complex reflection impulse response of FIGS. 16A and 16B.

From the recovered impulse response of the FBG, shown in FIGS. 16A and 16B, the reflection coefficient amplitude and the group delay spectra of the FBG are easily computed by a single FT operation, as shown in FIGS. 17A and 17B. The solid and dashed curves of FIG. 17A correspond to the original and recovered amplitudes, respectively, of the reflection coefficient. The solid and dashed curves of FIG. 17B correspond to the original and recovered group delay spectra, respectively. Even for a strongly chirped FBG, as shown in FIGS. 10A and 10B, the success in the recovery is quite impressive. For this exemplary embodiment, the error in the recovery of $|r(\omega)|$, defined as $$\frac{\int ||r(\omega)| - |\hat{r}(\omega)||^2 d\omega}{\int |r(\omega)|^2 d\omega},$$

where $|r(\omega)|$ and $|\hat{r}(\omega)|$ are the original and the recovered quantities, respectively, is only approximately 0.08%.

Figure 18:
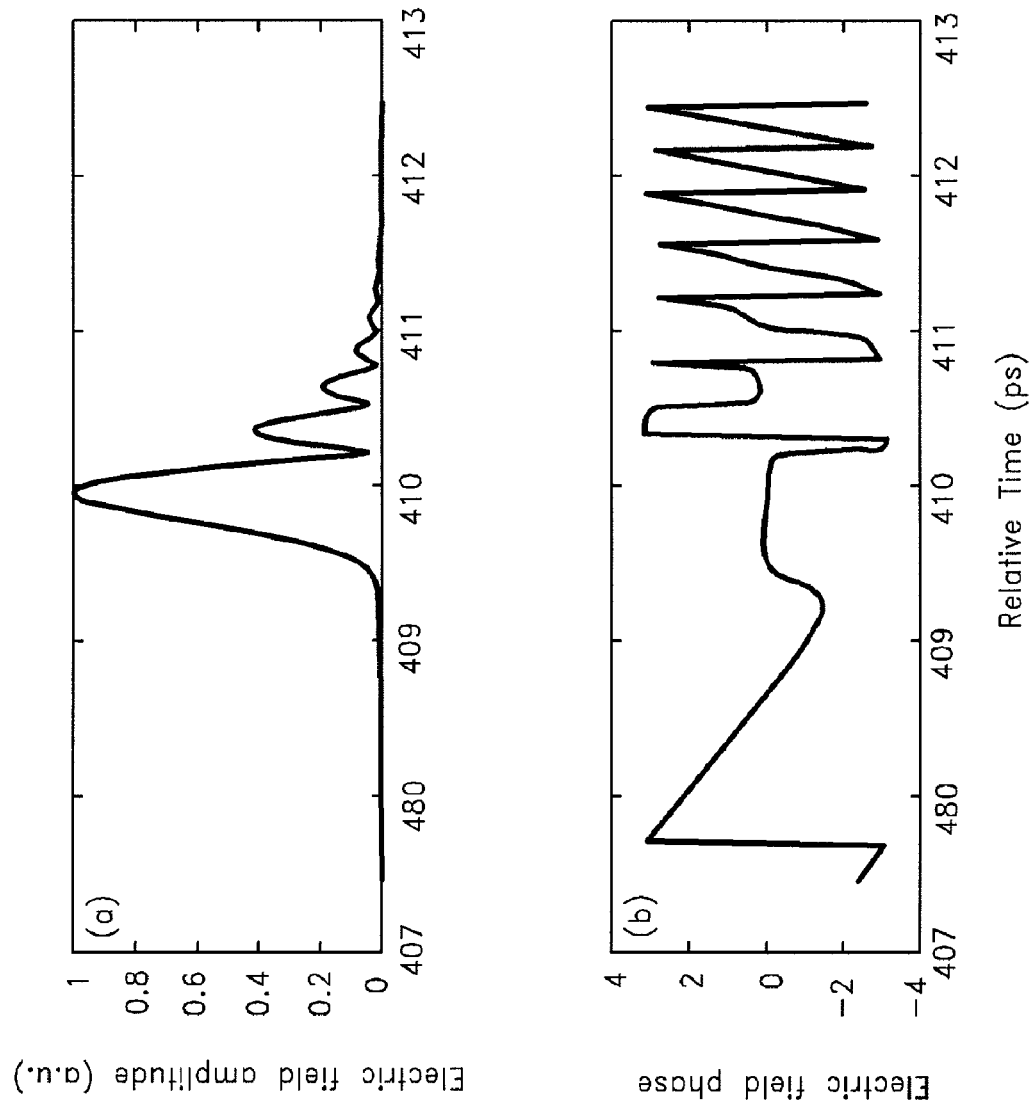
FIGS. 18A and 18B are plots of the amplitude and phase, respectively, of a different input laser pulse.

To evaluate the dependence of the success of the recovery on the temporal profile of the chosen input laser pulse, another exemplary embodiment uses a different input laser pulse having an amplitude and phase as shown in FIGS. 18A and 18B, respectively. The laser pulse of FIGS. 18A and 18B is approximately 3 times narrower than the input laser pulse of the previous exemplary embodiment, as seen by comparing FIGS. 12A and 12B with FIGS. 18A and 18B. For this exemplary embodiment, a splitting ratio of 120 was used between the peak amplitude of the input laser pulse and the peak amplitude of the reflection impulse response of the FBG in FIG. 7A.

Figure 19:
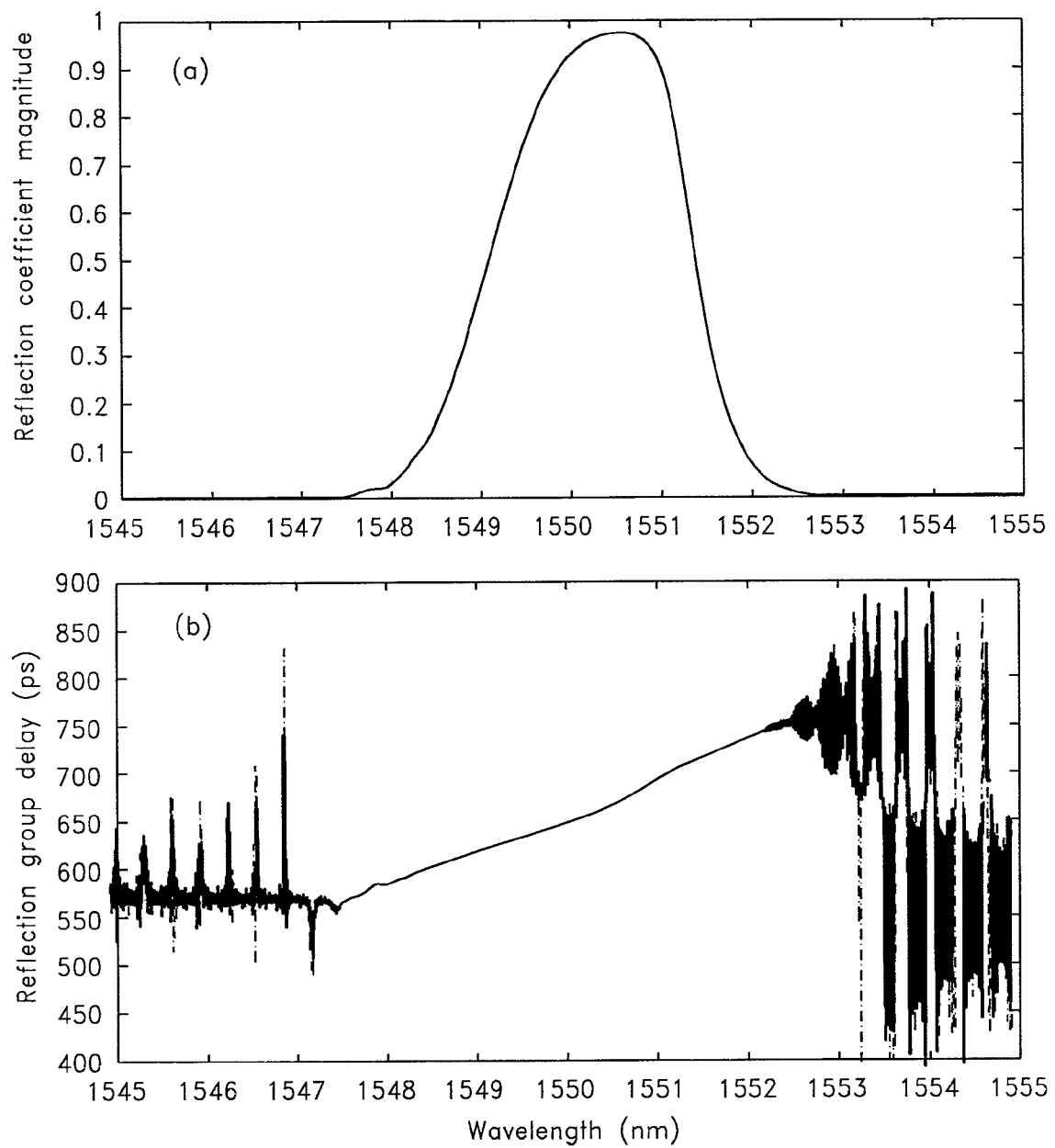
FIGS. 19A and 19B are plots of the amplitude and phase, respectively, for the recovered reflection coefficient amplitude and the group delay spectra of the FBG using the input laser pulse of FIGS. 18A and 18B.

FIGS. 19A and 19B show the amplitude and group delay spectra, respectively, of the reflection coefficient of the FBG. The solid and dashed curves of FIG. 19A are the original and recovered amplitudes, respectively, of the reflection coefficient. The solid and dashed curves of FIG. 19B are the original and recovered group delay spectra, respectively. The error in the recovery of $|r(\omega)|$ in this exemplary embodiment is less than 0.02%, which is reduced by more than a factor of 4 as compared to the error of the previous exemplary embodiment. The improved performance in this exemplary embodiment (0.02% versus 0.08% in the previous example) is primarily due to the narrower input laser pulse, which more closely approximates a true delta function, thereby yielding a more accurate reflected pulse that represents the true reflection impulse response of the FBG.

Figure 20:
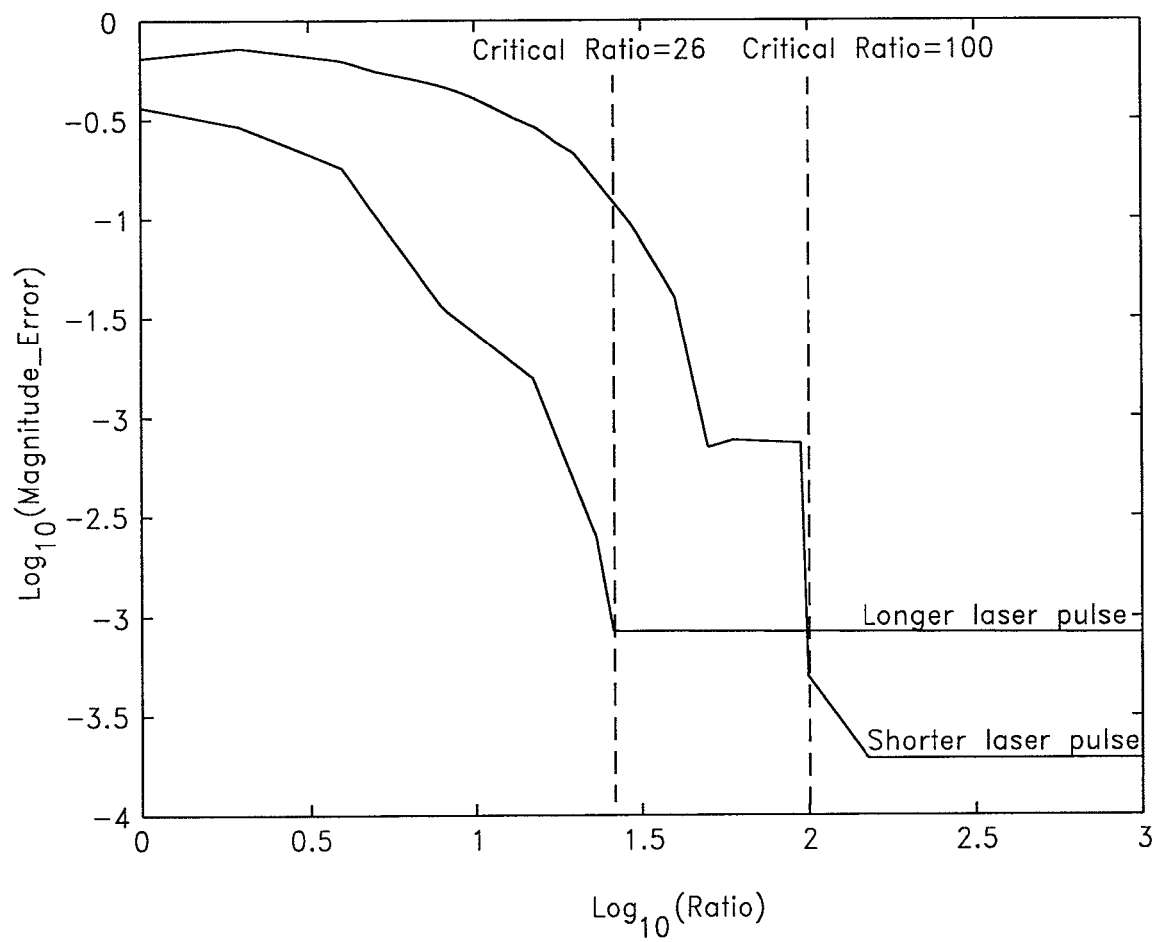
FIG. 20 is a plot of the results from a series of simulations, each with a different splitting ratio between the peak amplitude of the input laser pulse and the peak amplitude of the reflected impulse response.

FIG. 20 is a plot of the results from a series of simulations, each with a different splitting ratio between the peak amplitude of the input laser pulse and the peak amplitude of the reflected impulse response. The two curves of FIG. 20 correspond to the two input laser pulses shown in FIGS. 12A and 12B ("longer laser pulse") and FIGS. 18A and 18B ("shorter laser pulse"). FIG. 20 shows the logarithm of the error in the recovery of $|r(\omega)|$ as a function of the logarithm of the splitting ratio.

As shown by FIG. 20, the error in the recovery generally decreases for increasing splitting ratios between the peak amplitude of the input laser pulse and the peak amplitude of the reflected impulse response of the FBG. For embodiments with splitting ratios below a splitting ratio of approximately 100, the longer laser pulse has a smaller error in the recovery than does the smaller laser pulse. However, for splitting ratios larger than a critical ratio of approximately 100, using a shorter input pulse provides a much better recovery than does using a longer input laser pulse (e.g., recovery improved by a factor of approximately 4). In addition, while the baseline error for the longer laser pulse is achieved at lower splitting ratios (e.g., greater than approximately 26), it is higher than the baseline error achieved using the shorter laser pulse, even though the shorter laser pulse's baseline error is only achieved with higher splitting ratios (e.g., greater than approximately 100).

The reason for this observed lower baseline in error for the shorter laser pulse is that the shorter input laser pulse more closely approximates a true delta function, thereby yielding a more accurate reflected pulse to represent the true reflection impulse response of the FBG and reducing the error in the recovery. However, by narrowing the input laser pulse, the energy of the input laser pulse (proportional to the area under the temporal profile of the laser pulse) is also reduced. Therefore, higher splitting ratios are used to obtain the benefits of the reduced error from a more narrow input laser pulse. In other words, when using a shorter or narrower dummy input pulse, it is advantageous to use a stronger peak amplitude (or a higher critical ratio) for the input pulse. In certain embodiments, as shown by FIG. 20, the error is decreased by a factor of approximately 4 by using an input laser pulse that is temporally approximately 3 times narrower.

In certain embodiments, the ratio of the integral of the normalized laser field of the input laser pulse to the integral of the normalized reflection impulse response of the FBG, i.e., $$\int \frac{|E_{Pulse}(t)|}{\max(|E_{Pulse}(t)|)} dt \bigg/ \int \frac{|h_R(t)|}{\max(|h_R(t)|)} dt$$

is useful to select an optimum temporal width of the input laser pulse and the splitting ratio. For the shorter laser pulse of FIG. 20, this ratio is approximately 0.35%, and for the longer laser pulse, this ratio is approximately 1.4%. In other words, for the shorter laser pulse, the total area under the normalized electric field amplitude of the input laser pulse is only 0.35% of the total area under the normalized amplitude of the reflection impulse response of the target FBG. This low ratio is expected since the input laser pulse approximates a delta function. However, this ratio increases to 1.4% for the longer pulse (e.g., by approximately a factor of 4), while the critical splitting ratio drops by a factor of approximately 4 as well (e.g., from 100 to 26). Thus, for broader impulse response FBGs (such as strongly chirped FBGs), a generally larger critical ratio is advantageously used to achieve convergence. This behavior can also be related to the property of MPFs that most of the energy of an MPF is concentrated in proximity to the origin, as discussed above. In certain embodiments, for a broader reflection impulse response of the FBG, a higher peak amplitude of the leading dummy pulse is advantageously used to satisfy this property of MPFs for the input pulse sequence.

Figure 21:
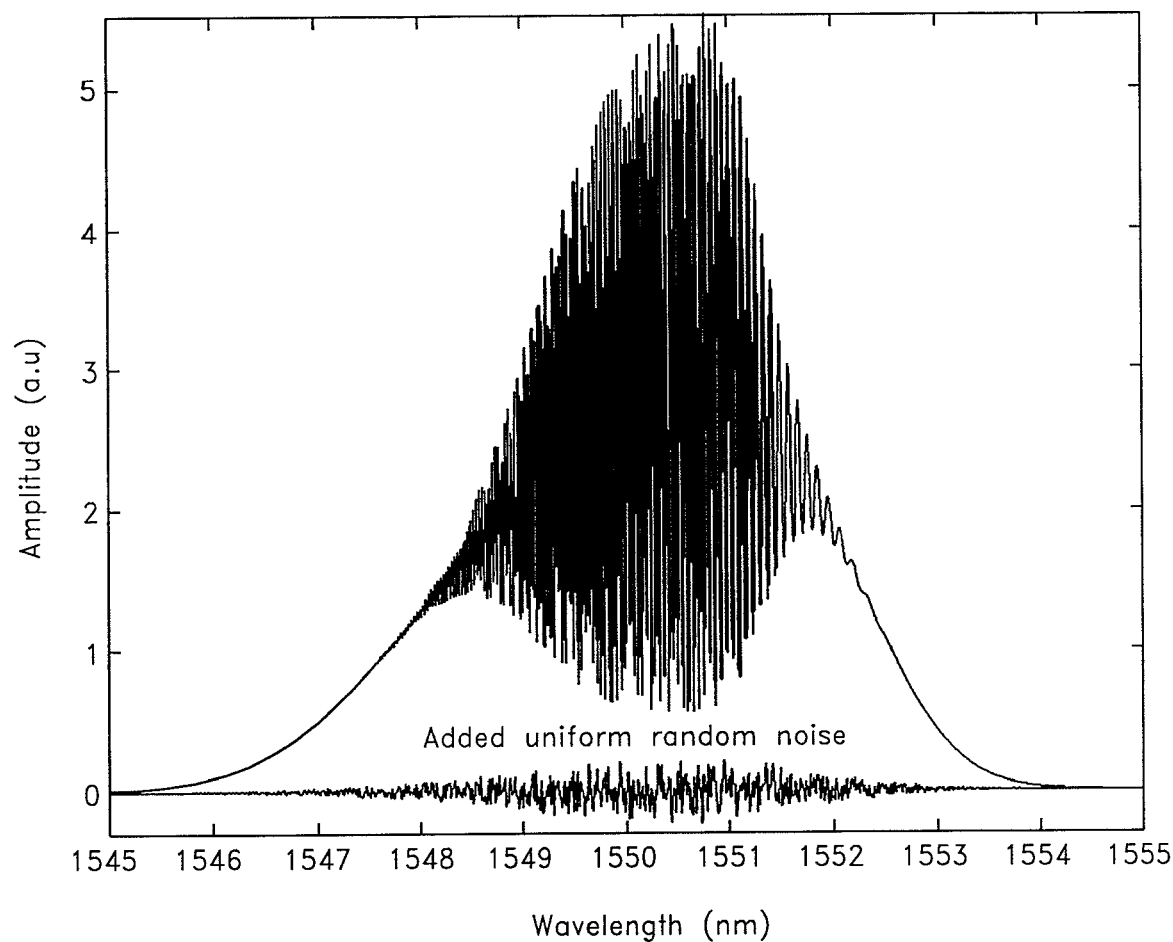
FIG. 21 is a plot of a simulated noisy power spectrum.

FIG. 21 is a plot of a simulated noisy power spectrum used to illustrate how measurement errors in the power spectrum affect the accuracy of the recovery results. The power spectrum of FIG. 21 was produced by multiplying the theoretical FT amplitude square of an input pulse sequence by a uniform random noise (e.g., 10% peak-to-peak amplitude with an average of unity). The error-reduction method 700 of FIG. 9 was applied to the simulated noisy power spectrum of FIG. 21 to recover the reflection impulse response of the target FBG. In this exemplary embodiment, the resolution of the OSA was assumed to be approximately 10 picometers and a splitting ratio of 27 between the optical fields was used (corresponding to a splitting ratio of $27^2$ of the optical powers).

Figure 22:
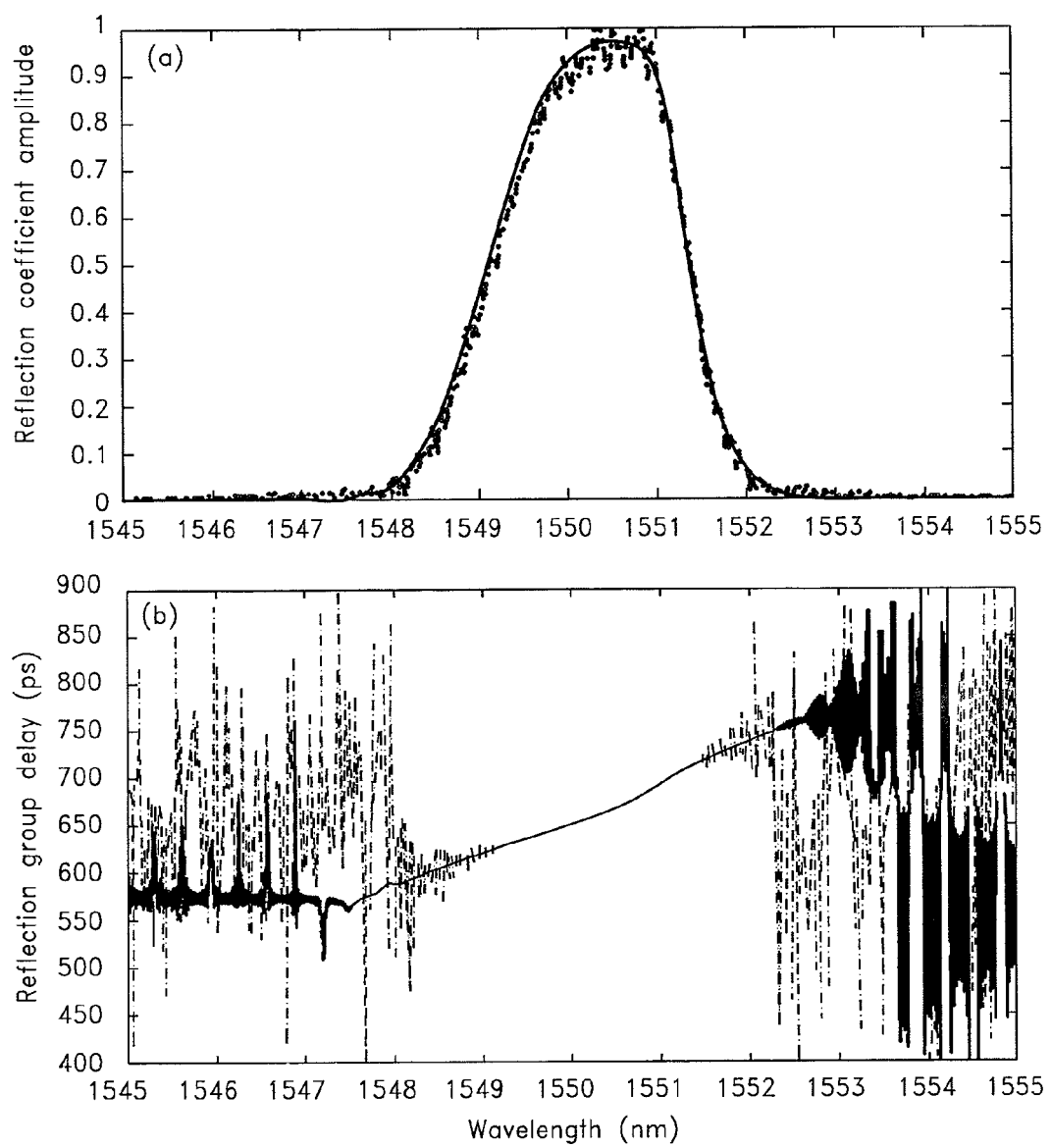
FIGS. 22A and 22B are plots of the amplitude and group delay spectra, respectively, of the reflection coefficient of the FBG calculated using the simulated noisy power spectrum of FIG. 21.

The calculated reflection coefficient amplitude and the group delay spectra of the target FBG, computed from the measured power spectrum of FIG. 21, are shown in FIGS. 22A and 22B. The recovery is still quite good despite the strong noise added to the power spectrum used in the calculation. The large oscillations observed in the recovered group delay spectrum, especially towards the edges of the spectral window of FIG. 22B, are due to the significant drop of the intensity of the reflection coefficient amplitude at those wavelengths, which makes the recovery of spectral phase more difficult. In the limiting case where the intensity goes to zero, the definition of phase has less meaning. However, this behavior is inconsequential, since the group delay in the more important range of wavelengths (e.g., between approximately 1548 nanometers and approximately 1552 nanometers, for the target FBG is recovered quite well. The results of FIGS. 22A and 22B show that certain embodiments described herein work well even with fairly noisy measurements of the power spectrum.

The noise sensitivity of certain embodiments described herein is also affected by the ratio of the dummy input laser pulse to reflection impulse response amplitudes. In certain embodiments in which the main source of noise in the OSA measurement system is proportional to the input intensity, a larger dummy pulse results in a larger noise intensity in the measured spectrum, and thus a larger error in the recovered FBG spectra. To maximize the accuracy of the recovery with noisy measurements, certain embodiments advantageously select an amplitude ratio close to the critical ratio. For example, for the power spectrum shown in FIG. 21, an amplitude ratio of 27 was used, which is close to the critical ratio of 26 for the longer laser pulse, as shown in FIG. 20. In certain embodiments, this choice of the amplitude ratio ensures both accurate convergence of the iterative error-reduction method and reduced sensitivity to measurement noise. In certain embodiments, the critical ratio that ensures convergence is traced by choosing two different ratio values and comparing the difference between the recovery results. If the difference is small, then convergence is achieved and the chosen ratio values are somewhere on the lower baseline of the curve in FIG. 20.

Certain embodiments described herein are conveniently used to characterize any FBG spectra uniquely. Certain embodiments also have advantages with respect to currently existing techniques, e.g., low-coherence spectral interferometry. Certain embodiments described herein provide better resolution (e.g., by a factor of two) than does low-coherence spectral interferometry using the same measurement configuration. In low-coherence spectral interferometry, by filtering in the inverse FT domain, the convolution of the impulse response with the autocorrelation function of the input laser pulse is recovered. However, in certain embodiments described herein, the convolution of the same impulse response with the input laser pulse itself is recovered, which constitutes an improved resolution by approximately a factor of 2.

In certain embodiments described herein, the time delay between the input laser pulse and the reflection impulse response of the FBG is made as small as possible, as long as there is no temporal overlap between the two pulses. However, low-coherence spectral interferometry requires a certain minimum delay between these two pulses to ensure individual filtering of the above-mentioned convolution term in the IFT domain. In certain embodiments in which the OSA has low resolution, the large time delay needed by low-coherence spectral interferometry can result in rapid fringes in the power spectrum that the OSA cannot resolve, which can potentially cause severe recovery errors.

Certain embodiments described herein are used to characterize multiple FBGs concurrently using a single OSA measurement. In certain such embodiments, the measurement configurations of either FIGS. 7A and 7B are used, with the additional FBGs to be characterized added in a parallel fashion next to the first FBG. FIG. 7C schematically illustrates an exemplary embodiment in which multiple FBGs 540a, 540b, 540c, . . . are coupled to a 1×N coupler 590 where N is two or more. Each of the FBGs 540a, 540b, 540c, ... are coupled to the coupler by a corresponding optical path 592a, 592b, 592c, ... each having a different optical pathlength. In certain embodiments, the optical pathlengths of the optical paths 592a, 592b, 592c, ... are selected to avoid having the reflected pulses from the FBGs 540a, 540b, 540c, ... overlapping temporally when they arrive at the OSA 570.

As described above for the measurement configuration for a single FBG 540, the reflection impulse responses of all the FBGs 540a, 540b, 540c, ... are time-delayed with respect to the stronger dummy laser pulse. The pulse sequence of such embodiments consists of more than 2 pulses, and the pulse sequence is sent to the OSA for the power spectrum measurement. The processing of the measured power spectrum in certain such embodiments is done in the same manner as described above (e.g., using the iterative error-reduction method 700 of FIG. 9). The configuration of multiple FBGs schematically illustrated in FIG. 7C is also used in certain embodiments with the measurement configuration of FIG. 8 to characterize multiple FBGs concurrently.

Figure 23:
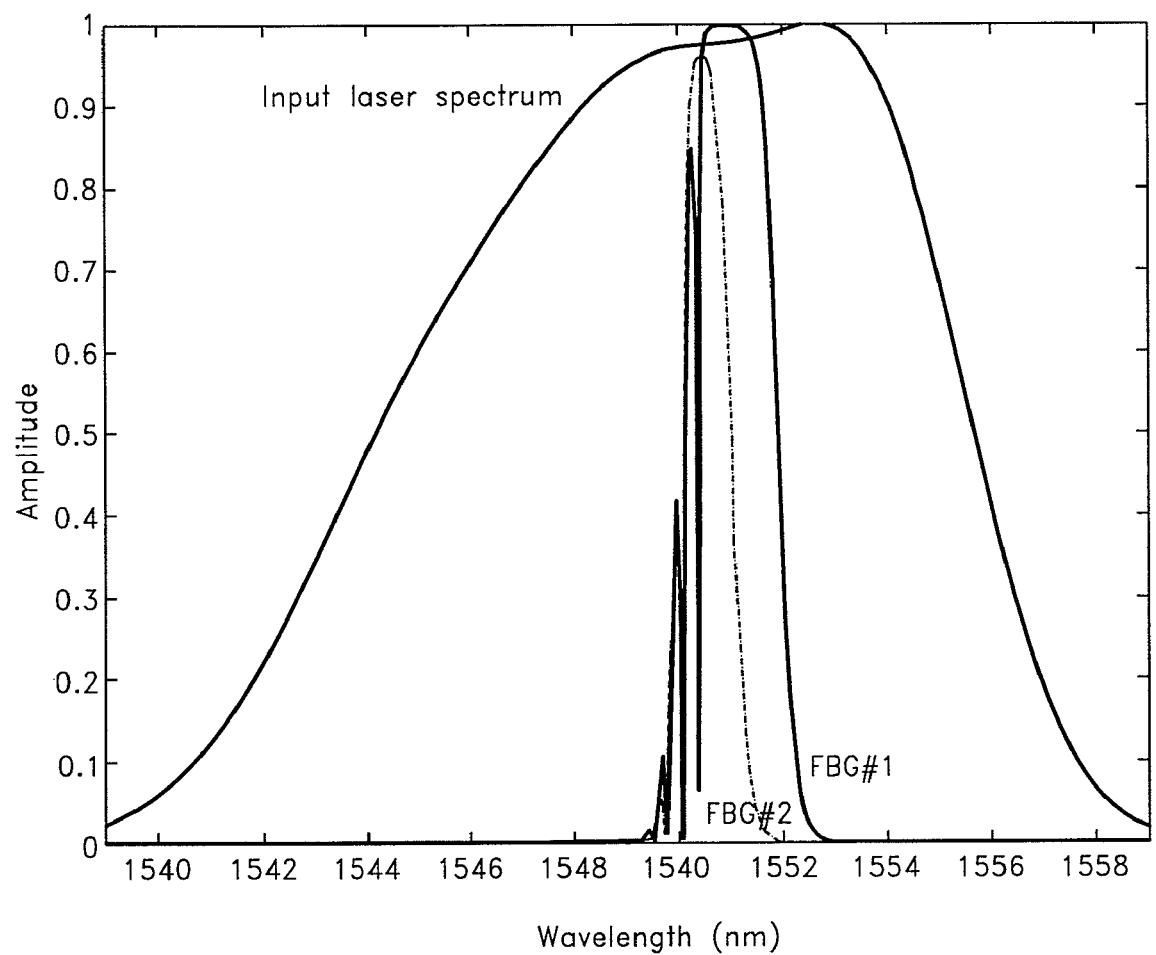
FIG. 23 is a plot of the normalized input laser pulse spectrum and the reflection spectra of two different Gaussian apodized FBGs which are characterized together in an exemplary embodiment.
Figure 24:
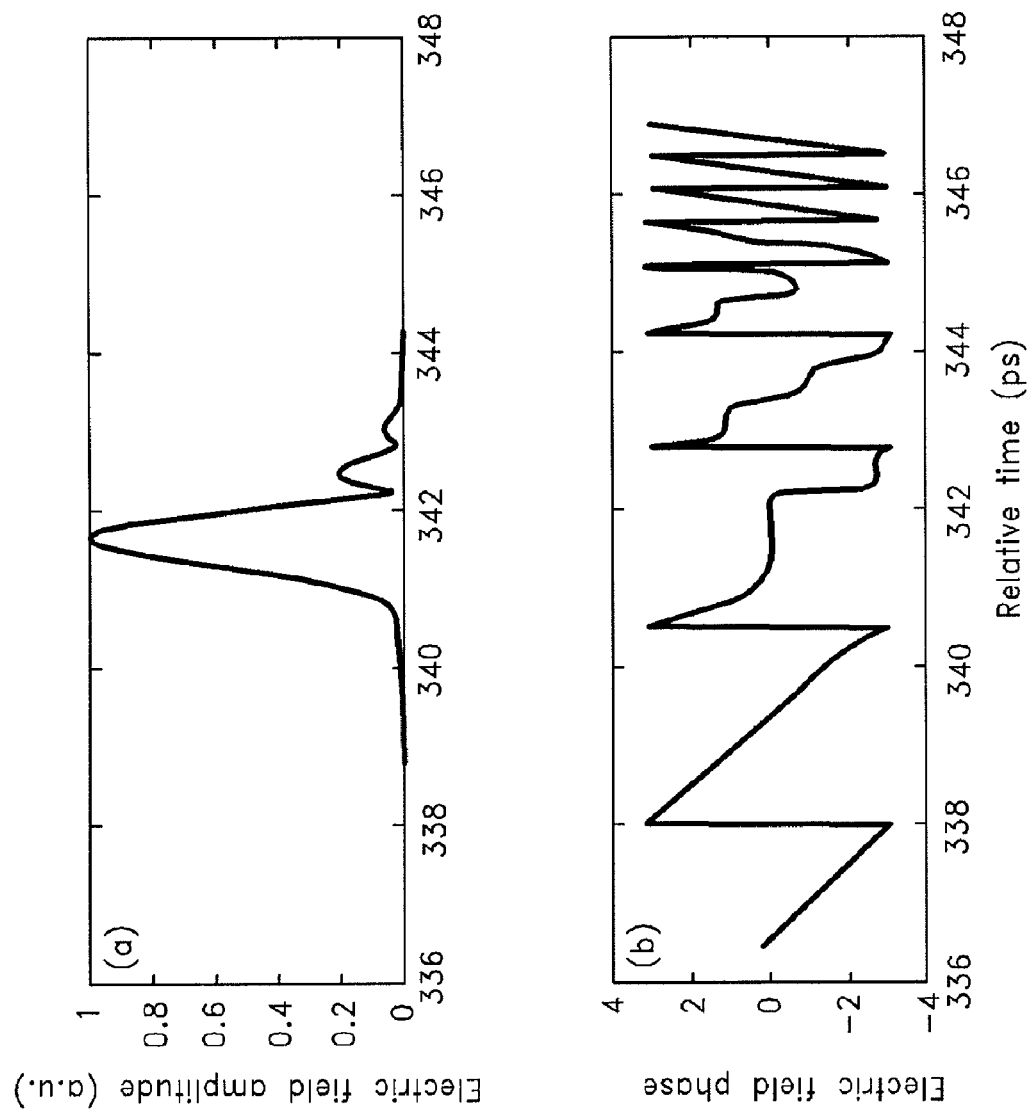
FIGS. 24A and 24B are plots of the amplitude and phase of the temporal electric field profile of the input laser pulse, respectively.
Figure 25:
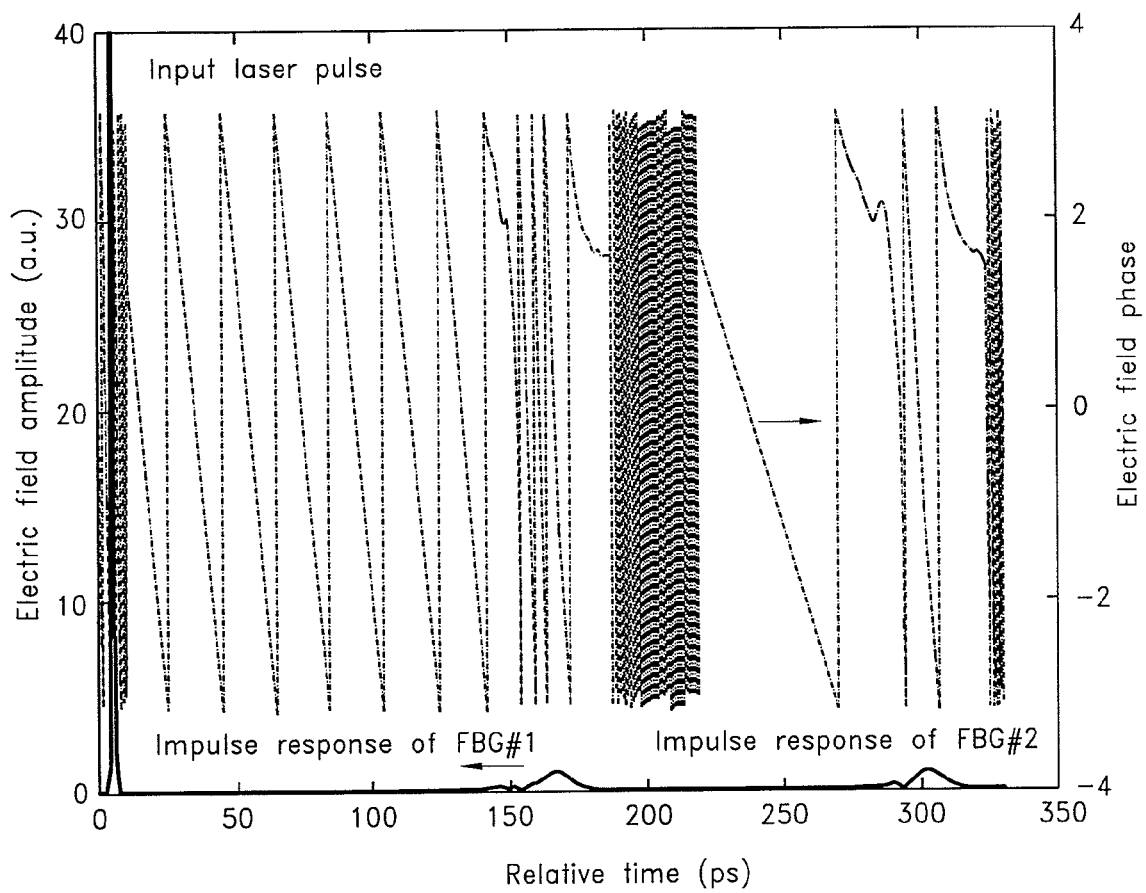
FIG. 25 is a plot of the amplitude and the phase of a pulse sequence formed by time-delaying the two reflected pulses from the two FBGs of FIG. 23, with respect to the leading dummy input laser pulse with a splitting ratio of 40.

FIG. 23 is a plot of the normalized input laser pulse spectrum and the reflection spectra of two different Gaussian apodized FBGs (FBG#1 and FBG#2) which are characterized together in an exemplary embodiment. The amplitude and phase of the temporal electric field profile of the input laser pulse are shown in FIGS. 24A and 24B, respectively. FIG. 25 shows the amplitude spectrum and the phase spectrum of the pulse sequence formed by time-delaying the two reflected pulses from the FBG#1 and FBG#2, with respect to the leading dummy input laser pulse with a splitting ratio of 40.

Figure 26:
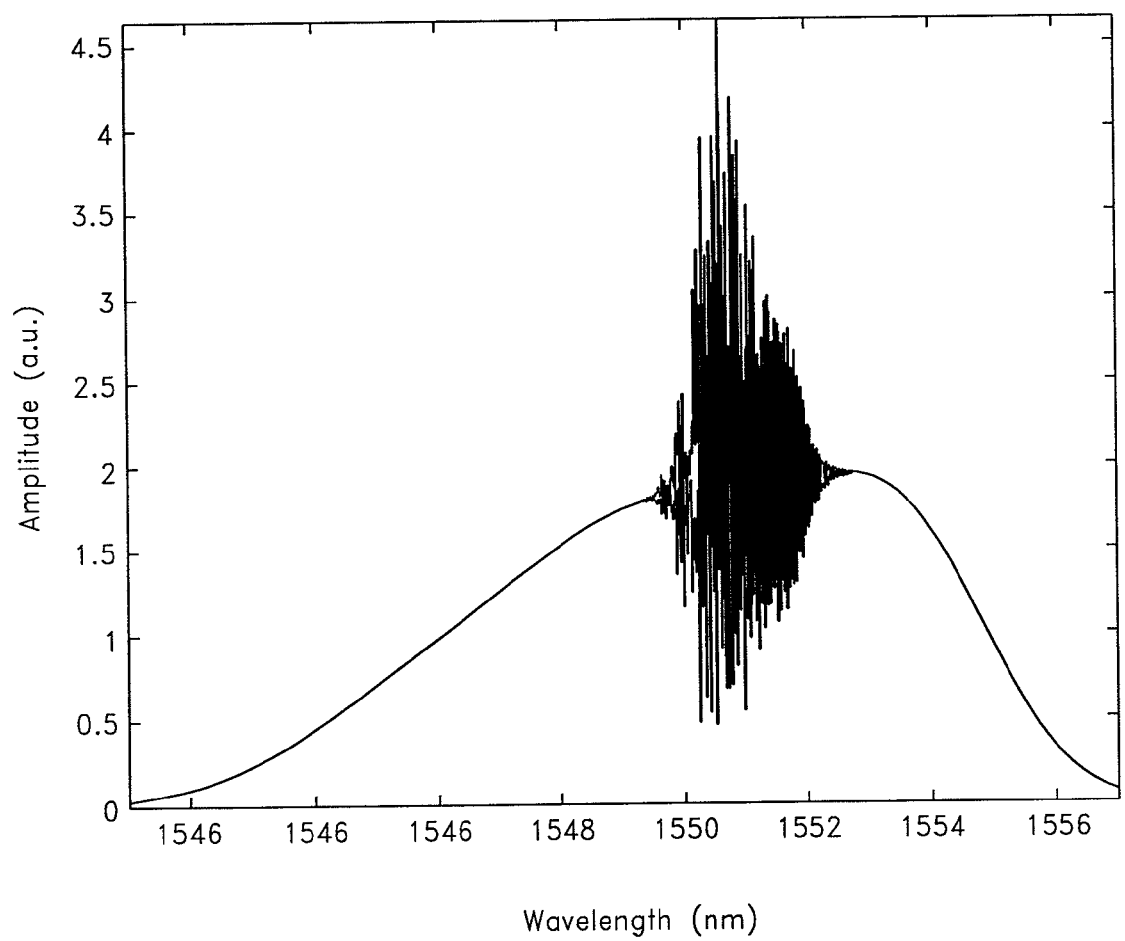
FIG. 26 is a plot of the power spectrum for the pulse sequence of the leading dummy input laser pulse with the two reflected pulses of FIG. 25.
Figure 27:
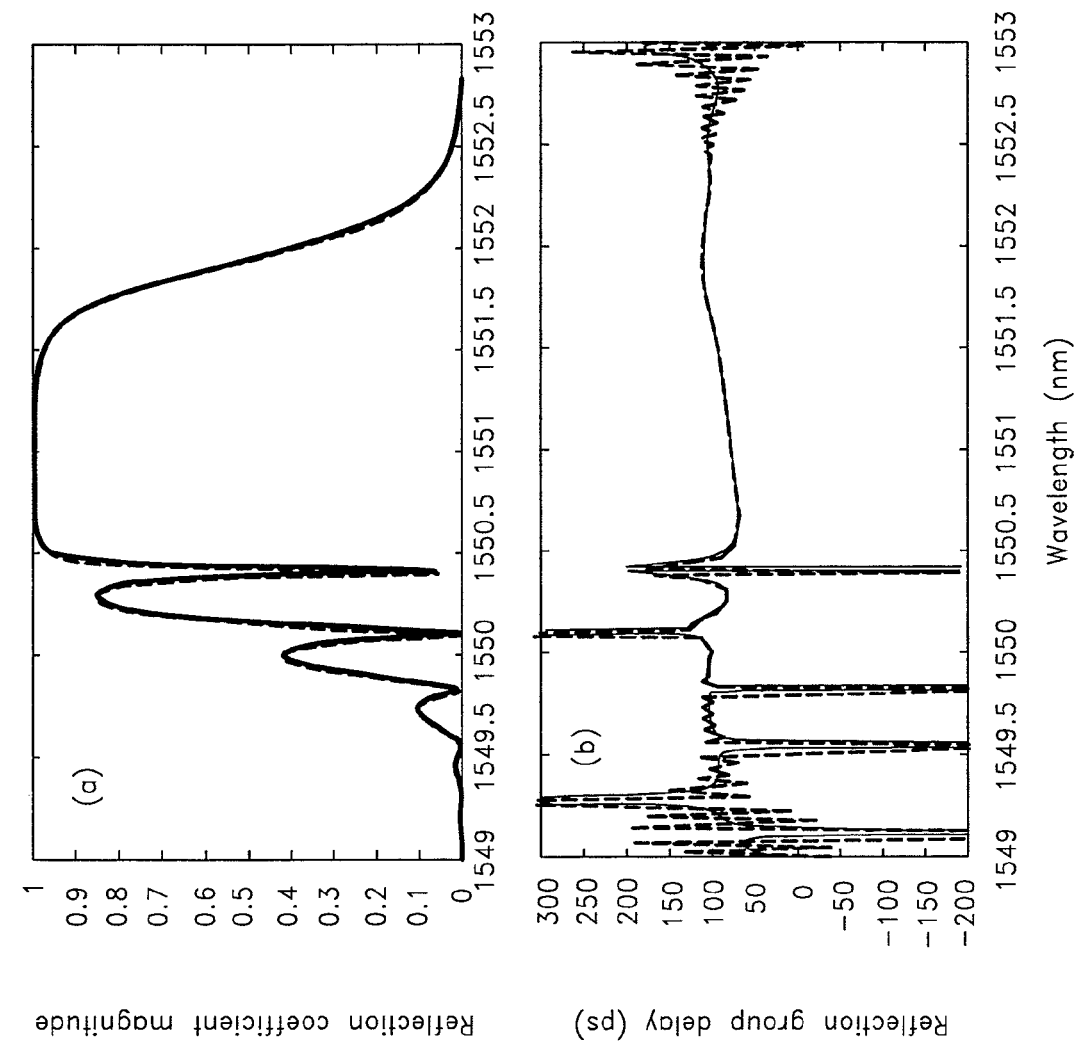
FIG. 27A is a plot of the original (solid line) and recovered (dashed line) amplitude of the reflection coefficient of the first FBG of FIG. 23.
FIG. 27B is a plot of the original (solid line) and recovered (dashed line) group delay spectra of the reflection coefficient of the first FBG of FIG. 23.
Figure 28:
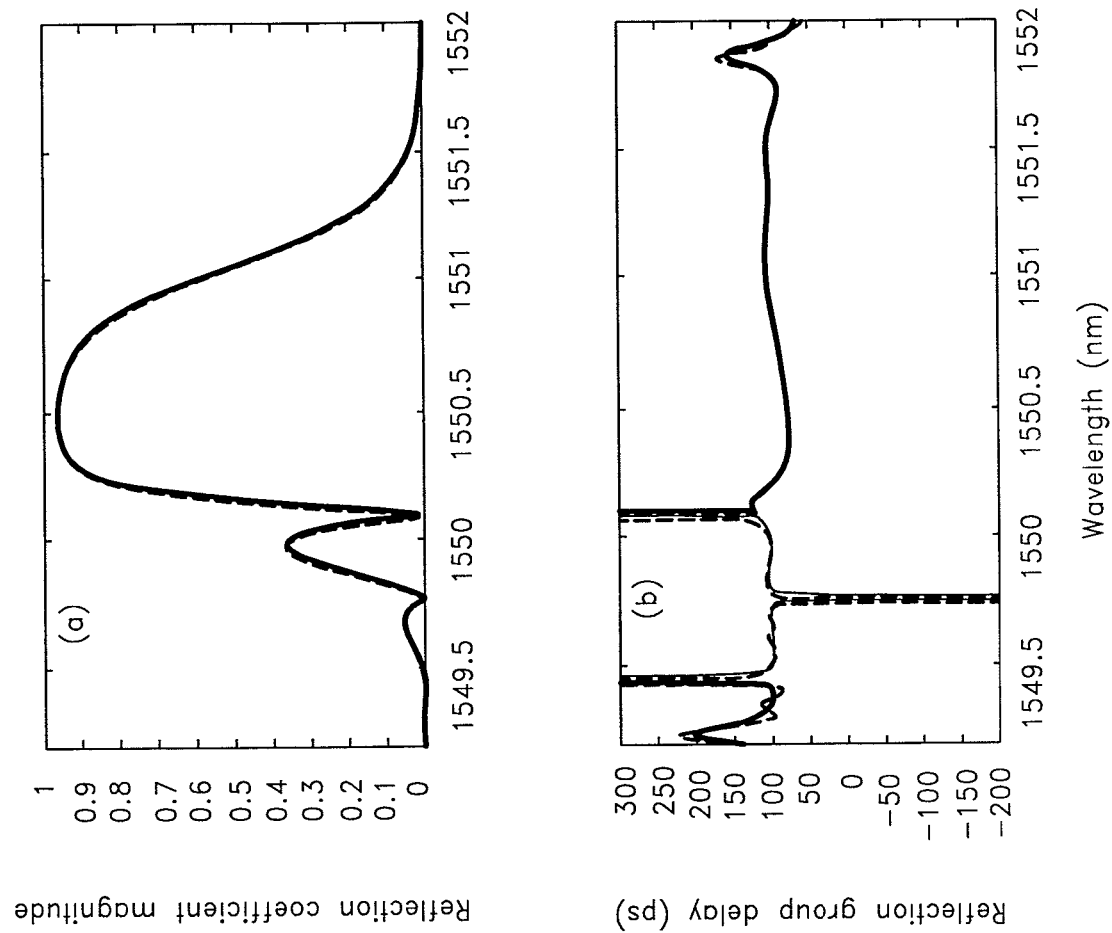
FIG. 28A is a plot of the original (solid line) and recovered (dashed line) amplitude of the reflection coefficient of the second FBG of FIG. 23.
FIG. 28B is a plot of the original (solid line) and recovered (dashed line) group delay spectra of the reflection coefficient of the second FBG of FIG. 23.

FIG. 26 is a plot of the power spectrum for this pulse sequence of three pulses, as would be measured by an OSA. In this exemplary embodiment, the resolution of the OSA was assumed to a modest number, e.g., approximately 10 picometers. Using only the power spectrum measurement shown in FIG. 26, the simultaneous recovery of the reflection coefficient amplitude and group delay spectra for these two FBGs is achieved. FIG. 27A is a plot of the original (solid line) and recovered (dashed line) amplitude of the reflection coefficient of FBG#1. FIG. 27B is a plot of the original (solid line) and recovered (dashed line) group delay spectra of the reflection coefficient of FBG#1. FIG. 28A is a plot of the original (solid line) and recovered (dashed line) amplitude of the reflection coefficient of FBG#2. FIG. 28B is a plot of the original (solid line) and recovered (dashed line) group delay spectra of the reflection coefficient of FBG#2.

As in the exemplary embodiments previously described, the recovery for this exemplary multiple-FBG embodiment is very good, showing that certain embodiments can quite conveniently characterize more than one FBG all at the same time using a single power spectrum measurement. The large-scale oscillations observed in the recovered group delay spectrum, especially towards the edges of the spectral window shown in FIG. 27B are due to the significant drop of the intensity of the reflection coefficient amplitude at those wavelength, which makes the recovery of spectral phase more difficult. However, this is inconsequential, as discussed above in relation to FIG. 22B.

Certain embodiments described herein work well if any of the electric field envelopes in the pulse sequence are time-reversed. Stated differently, certain embodiments described herein can advantageously differentiate between a pulse and its time-reversed replica.

Certain embodiments which utilize the measurement configuration 600 schematically illustrated in FIG. 8 share all the attributes described above in relation to the measurement configurations 500, 580 of FIGS. 7A and 7B. Certain embodiments utilizing the measurement configuration 600 advantageously provide additional desirable features over existing techniques as well. In certain such embodiments, the dummy input laser pulse does not need to be temporally much narrower than the reflection impulse response of the target FBG. As described above, the measurement configurations 500, 580 shown in FIGS. 7A and 7B advantageously provide better resolution (e.g., by a factor of two) with respect to low-coherence spectral interferometry, which uses an input dummy laser pulse that is narrower than the reflection impulse response of the target FBG by approximately 50 times or more. However, in certain embodiments utilizing the measurement configuration 600 of FIG. 8, the same FBG can be characterized with an input laser pulse that is only approximately 2 to 5 times narrower than the reflection impulse response of the FBG. Certain such embodiments advantageously eliminate the requirement for an ultra-short input laser pulse, which are generally more costly and more difficult to generate than longer laser pulses.

Figure 29:
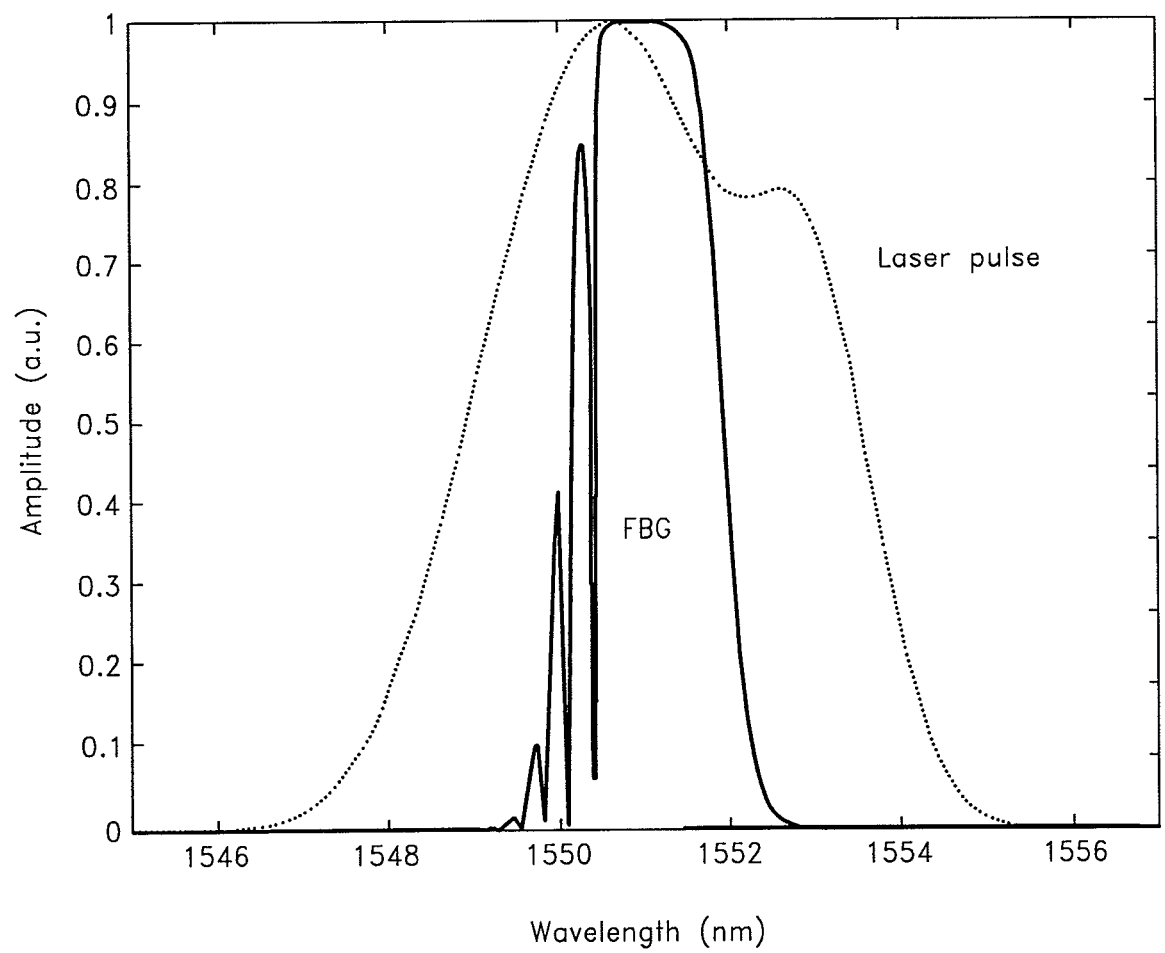
FIG. 29 is a plot of an FBG reflection spectrum (solid line) and the normalized input laser pulse amplitude (dotted line) in an exemplary embodiment.
Figure 30:
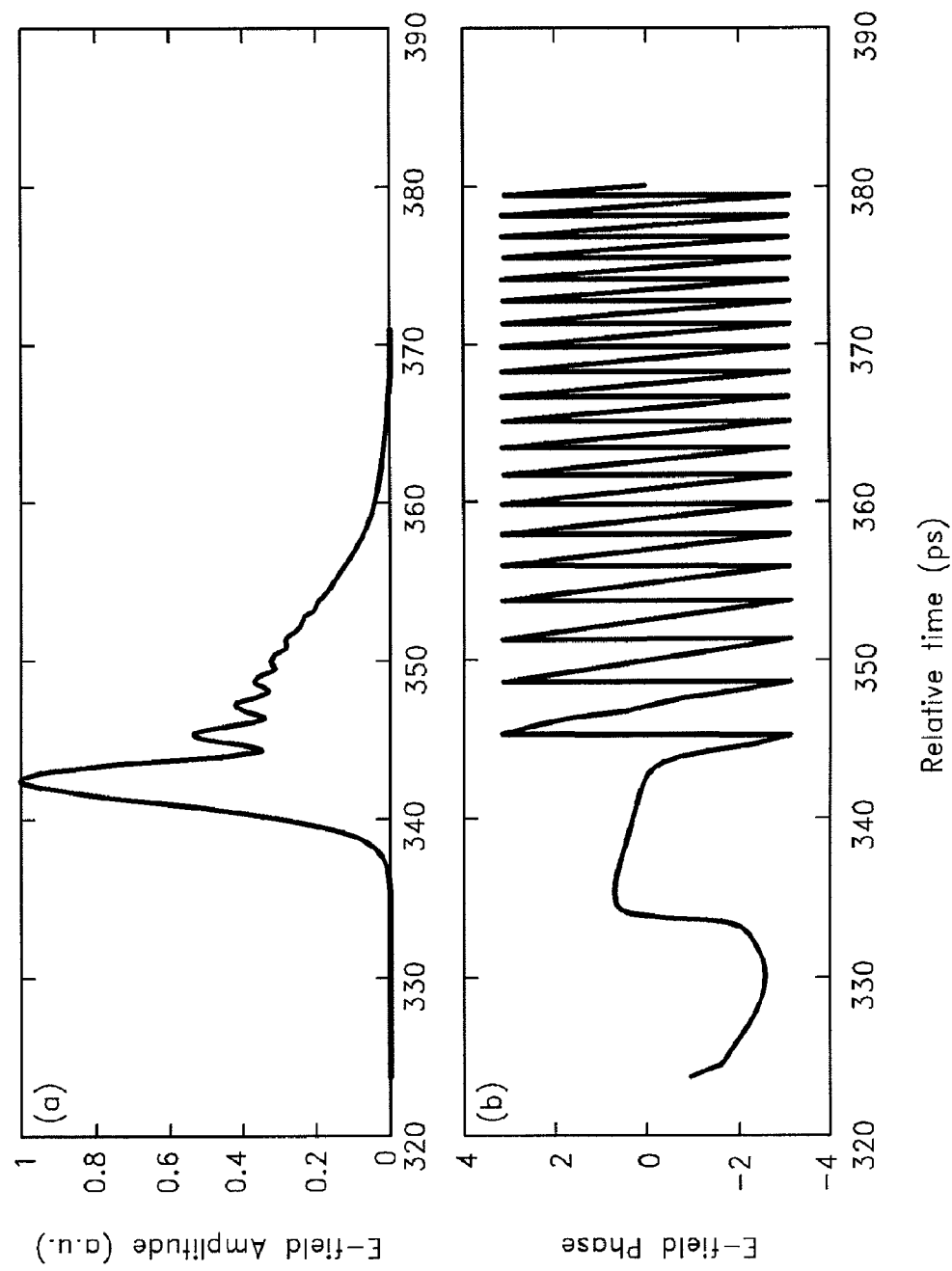
FIGS. 30A and 30B are plots of the amplitude and phase, respectively, of the temporal profile of the input laser pulse.
Figure 31:
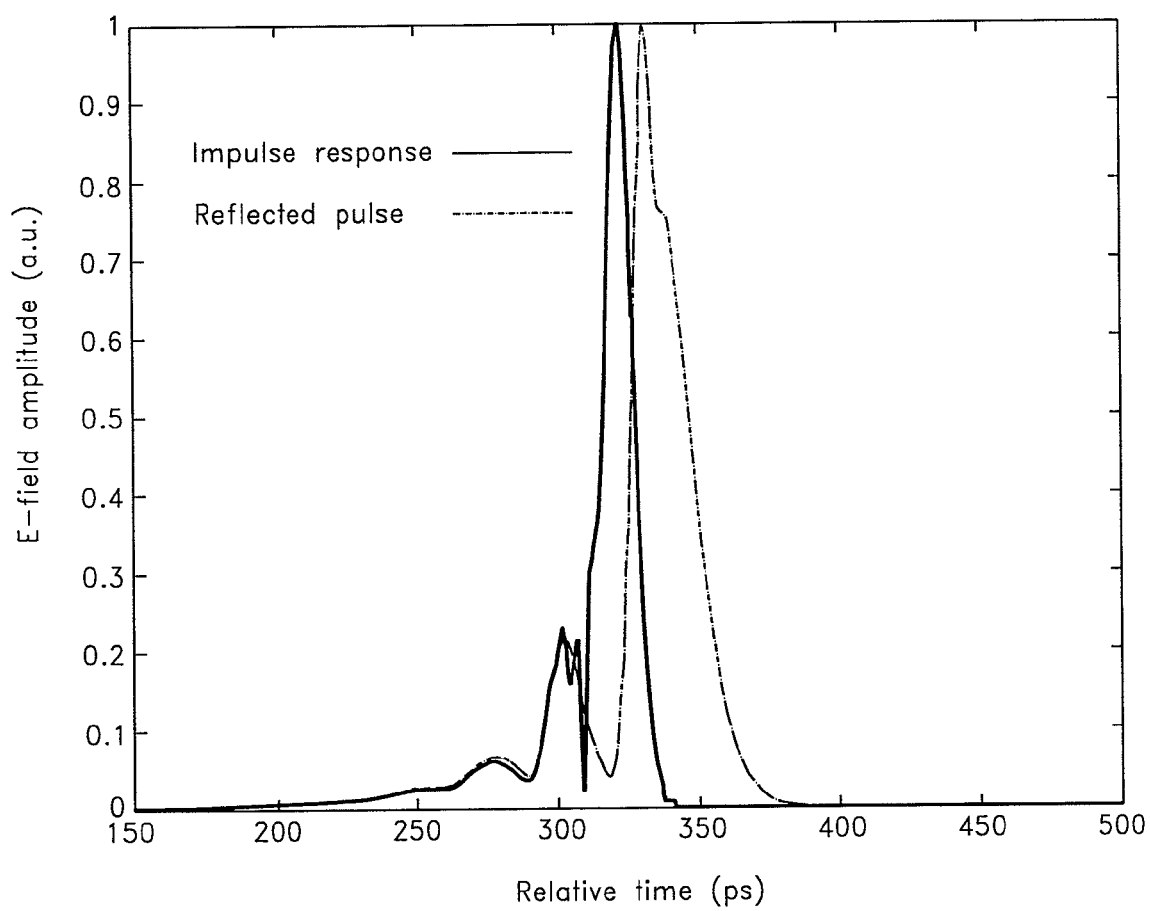
FIG. 31 is a plot of amplitude of the impulse response (solid line) of the FBG and the amplitude of the reflected pulse (dashed line).

FIG. 29 is a plot of an FBG reflection spectrum (solid line) and the normalized input laser pulse amplitude (dotted line) in an exemplary embodiment. The amplitude and phase of the temporal profile of the input laser pulse shown in FIGS. 30A and 30B, respectively, shows that the width of the laser pulse is approximately 18 picoseconds, where the temporal width is defined as the full width at which the field reduces to 10% of its maximum value. The temporal width of the reflection impulse response of the same FBG shown in FIG. 29 is wider than the input laser pulse by only a factor of approximately 2. As shown by FIG. 31, the temporal width of the reflection impulse response is approximately 37 picoseconds, while the reflected pulse width is approximately 56 picoseconds.

Figure 32:
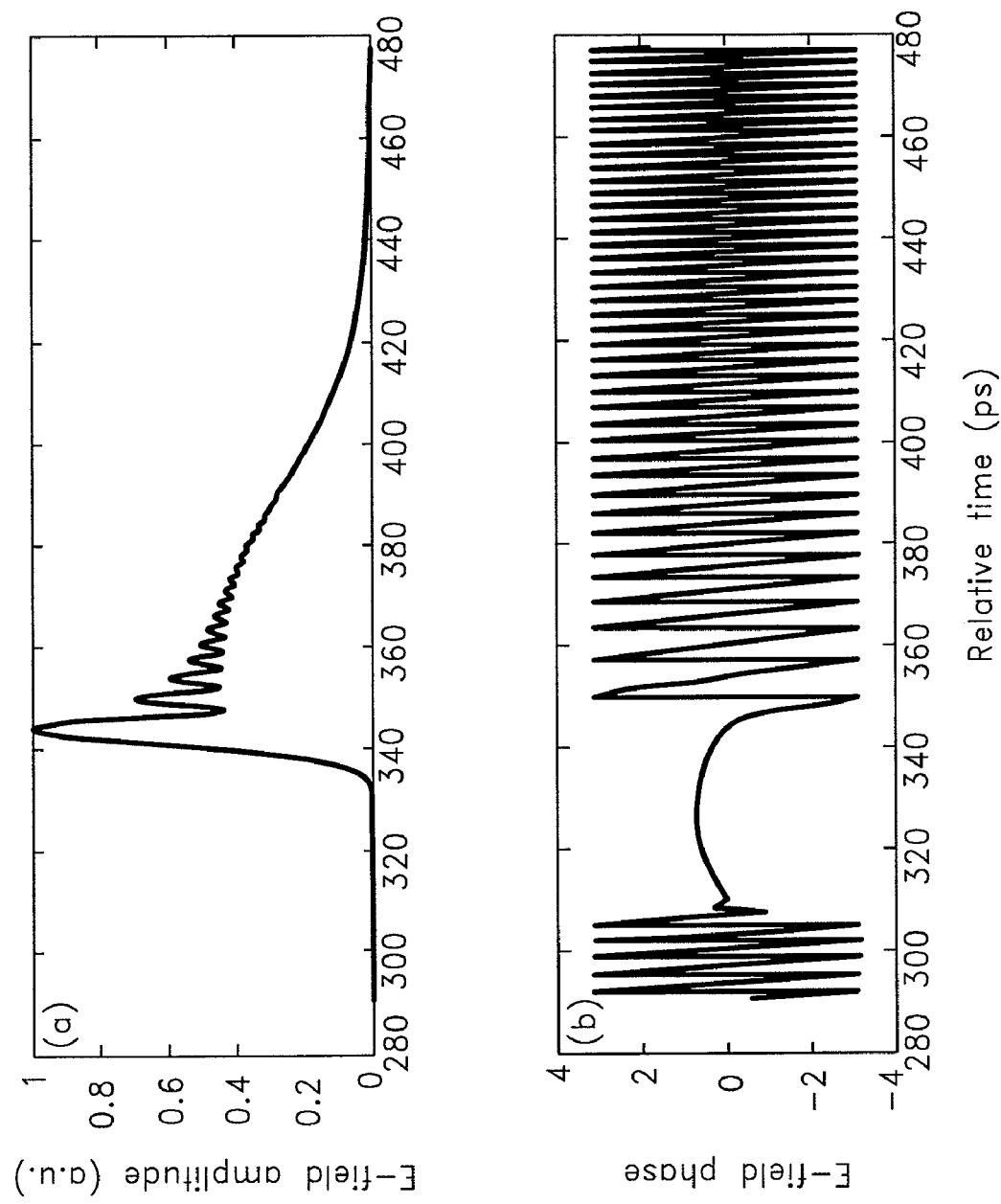
FIGS. 32A and 32B are plots of the amplitude and phase, respectively, of the normalized electric field envelope of the time-stretched laser pulse in an exemplary embodiment.

Referring to the measurement configuration 600 of FIG. 8, the 18-picosecond-wide input dummy laser pulse 620 is first split into two pulses. The first pulse 622 is sent to a delay line 630. The second pulse is sent to a pulse stretcher 640, which broadens the temporal width of the laser pulse to produce a time-stretched laser pulse 624 which is broadened by a factor of at least approximately 2 to 5 as compared to the second pulse before being stretched. The pulse stretcher 640 of certain embodiments is a loop of single-mode fiber optic cable that broadens the width of a laser pulse through dispersion. In this exemplary embodiment, the input laser pulse 620 has an initial width of approximately 18 picoseconds, and the time-stretched laser pulse 624 is stretched in time by a factor of approximately 4, such that the width of the time-stretched pulse 624 is approximately 76 picoseconds, as shown in the plot of FIG. 32. The temporal electric field profile of the time-stretched pulse 624, i.e., $E_s(t)$, is chosen in certain embodiments to be wider than the dummy input laser pulse profile by a factor of at least approximately 2 to 5.

Figure 33:
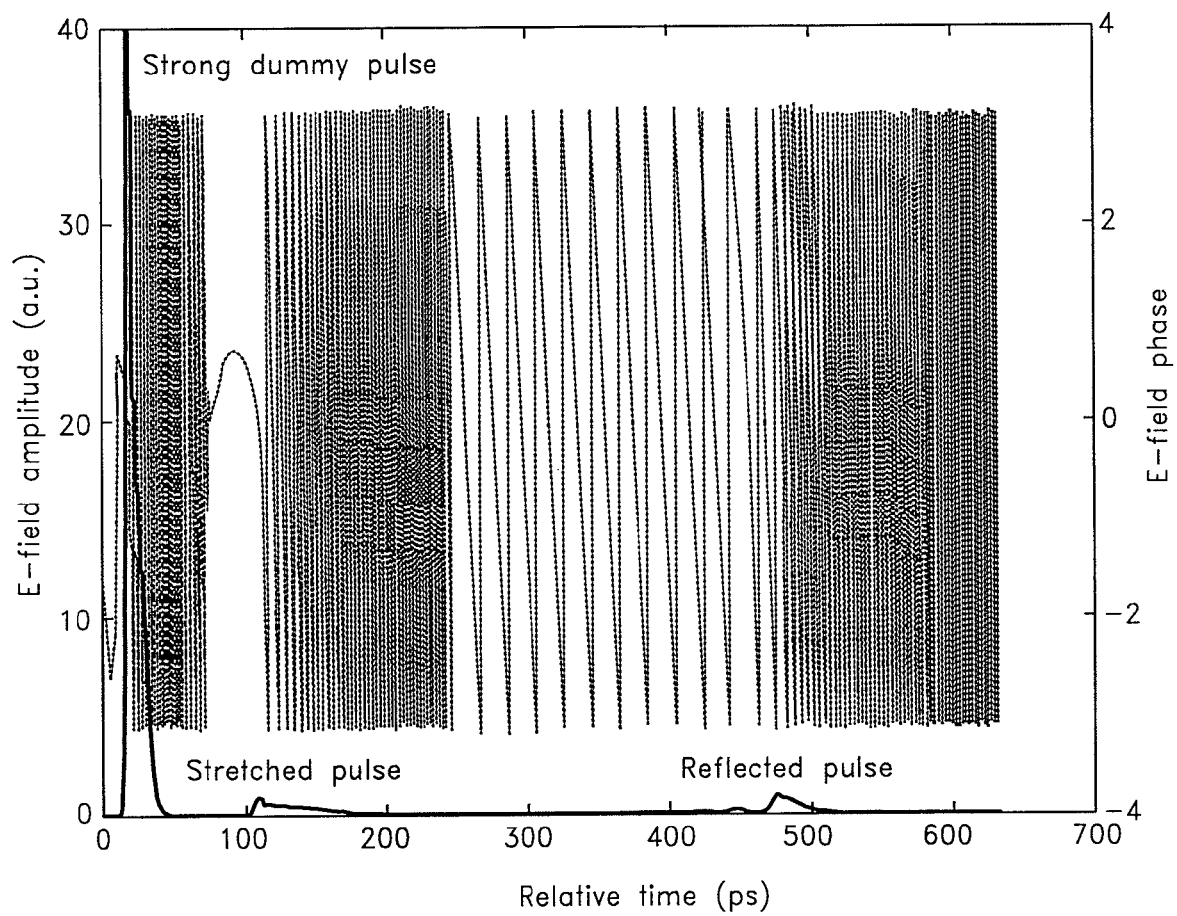
FIG. 33 is a plot of the pulse sequence of a dominant peak pulse at the leading edge followed by two weaker reflected pulses with a splitting ratio of 40 in an exemplary embodiment.
Figure 34:
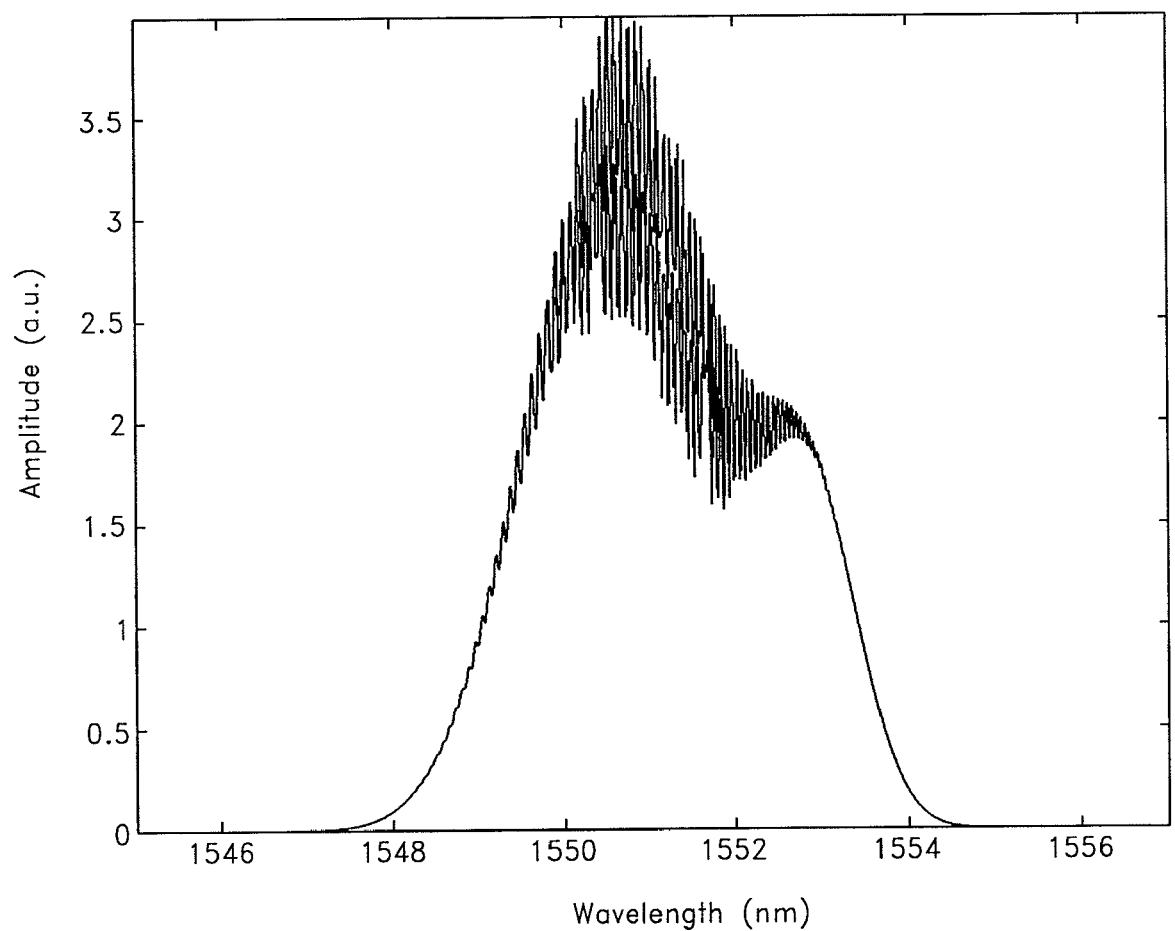
FIG. 34 is a plot of the output of an optical spectrum analyzer for the pulse sequence of FIG. 33 in an exemplary embodiment.

The time-stretched pulse 624 is sent through an attenuator 650, and is then split into two weak pulses, as shown in FIG. 8. In certain embodiments, the attenuator 650 is approximately 32 dB (in power), while in other embodiments, the attenuator 650 has other values (e.g., greater than approximately 20 dB). The reflected weak pulse 672 from the target FBG 540 is no longer the reflection impulse response of the FBG 540, since the incident pulse is much broader than the impulse response of the FBG 540, as shown in FIG. 31. The reflected pulse 672 is the convolution of the impulse response of the FBG 540 with the temporal profile of the time-stretched pulse 624, i.e., $h_R(t) * E_s(t)$. The back reflections from the FBG 540 and from the mirror 660 (e.g., a bare fiber end) are then temporally combined with the time-delayed version of the unattenuated initial dummy laser pulse 622, as shown in FIG. 8. This pulse sequence 680 has a dominant peak pulse at the leading edge followed by two weaker reflected pulses, as shown in FIG. 33. The pulse sequence 680 is then sent to the OSA 570, which measures its power spectrum. Assuming a typical OSA 570, with a resolution of approximately 10 picometers, the theoretical power spectrum of the pulse sequence of FIG. 33 is shown in FIG. 34.

As discussed above, the error-reduction method 600 of FIG. 9 is used in certain embodiments to process the measured output of the OSA. Because the input pulse sequence is close to an MPF, both $E_s(t)$ and $h_R(t)*E_s(t)$ can simultaneously be recovered using only the OSA output. The reflection spectrum of the target FBG is computed in certain embodiments by taking the FTs of both $E_s(t)$ and $h_R(t)*E_s(t)$, i.e., $$r(\omega) = \frac{FT\{h_R(t)*E_s(t)\}}{FT\{E_s(t)\}}.$$

Figure 35:
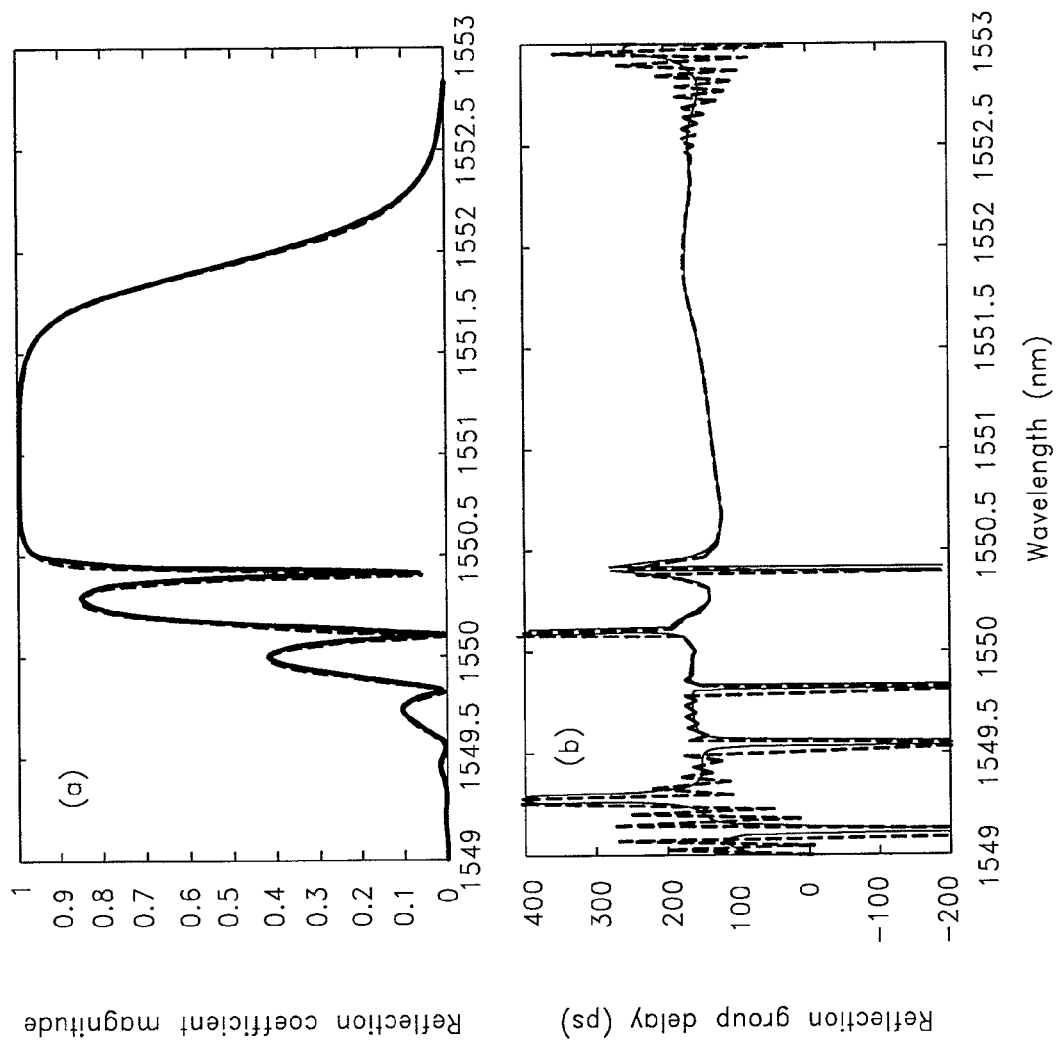
FIG. 35A is a plot of the original (solid curve) and the recovered (dashed curve) of the amplitude of the reflection coefficient of the FBG of FIG. 29.
FIG. 35B is a plot of the original (solid curve) and the recovered (dashed curve) of the group delay spectra of the reflection coefficient of the FBG of FIG. 29.

In certain embodiments, the power spectrum of the input laser pulse covers the frequency band of the target FBG, as shown in FIG. 29. The result of this exemplary embodiment is shown in FIGS. 35A and 35B. Once again the recovery is very good. In this exemplary embodiment, a Gaussian apodized FBG with an impulse response temporal width of approximately 37 picoseconds has been fully characterized using a dummy laser pulse that has a temporal width of approximately 18 picoseconds by using only a single OSA measurement. The whole computation involved in the exemplary embodiment took only a few seconds to run using MATLAB 5 on a 500-MHz computer.

In certain embodiments, various ultrashort pulse-shaping techniques (see, e.g., M. M. Wefers and K. A. Nelson, "*Analysis of Programmable Ultrashort Waveform Generation Using Liquid-Crystal Spatial Light Modulators*," J. Opt. Soc. Am. B, 1995, Vol. 12, pp. 1343-1362; A. Rundquist et al., "*Pulse Shaping with the Gerchberg-Saxton Algorithm*," J. Opt. Soc. Am. B, 2002, Vol. 19, pp. 2468-2478) are used to modify the temporal profile of the dummy pulse in order to achieve a true MPF for the electric field of the pulse sequence, which can potentially improve the recovery speed of certain such embodiments dramatically. By using a true MPF, certain embodiments can converge in less than 5 iterations, thus cutting down the computation time to a fraction of a second, even when using a relatively slow programming environment such as MATLAB 5.1.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. An apparatus for characterizing at least one fiber Bragg grating, the apparatus comprising:
    a first optical path configured to be optically coupled to a light source and to receive at least one input light pulse from the light source, the first optical path comprising a pulse stretcher and an attenuator, wherein a first portion of the input light pulse is stretched by the pulse stretcher and is attenuated by the attenuator;
    a second optical path optically coupled to the first optical path and comprising a reflective element, wherein a first portion of the stretched and attenuated light pulse from the first optical path is reflected from the reflected element;
    a third optical path optically coupled to the first optical path and configured to be optically coupled to at least one fiber Bragg grating such that a second portion of the stretched and attenuated light pulse from the first optical path is reflected from the at least one fiber Bragg grating;
    a fourth optical path optically coupled to the second optical path and the third optical path, the fourth optical path configured to be optically coupled to an optical spectrum analyzer and to transmit the reflected pulse from the reflective element and the reflected pulse from the at least one fiber Bragg grating to the optical spectrum analyzer; and
    a fifth optical path comprising a delay line, wherein the fifth optical path is configured to be optically coupled to the light source and to the optical spectrum analyzer such that a second portion of the input light pulse propagates from the light source along the fifth optical path to the optical spectrum analyzer.

2. The apparatus of claim 1, wherein the third optical path is configured to be optically coupled to a first fiber Bragg grating, the apparatus further comprising a sixth optical path optically coupled to the first optical path and to the fourth optical path, the sixth optical path comprising a second fiber Bragg grating, wherein a third portion of the stretched and attenuated light pulse from the first optical path is reflected from the second fiber Bragg grating, the reflected pulse from the second fiber Bragg grating propagating to the optical spectrum analyzer.

3. The apparatus of claim 1, wherein the light source comprises a mode-locked laser and the at least one light pulse has a temporal width between approximately 2 picoseconds and approximately 4 picoseconds.

4. The apparatus of claim 1, wherein the optical spectrum analyzer has a resolution less than or equal to 10 picometers.

5. The apparatus of claim 1, wherein the pulse stretcher comprises a single-mode fiber optic cable which broadens the temporal width of a pulse propagating therethrough.

6. The apparatus of claim 1, wherein the pulse stretcher broadens the temporal width of a pulse propagating therethrough by at least a factor of approximately 2.

7. The apparatus of claim 1, wherein the pulse stretcher broadens the temporal width of a pulse propagating therethrough by at least a factor of approximately 5.

8. The apparatus of claim 1, wherein the attenuator is greater than approximately 20 dB.

9. The apparatus of claim 1, wherein the reflective element comprises a bare fiber end.

10. The apparatus of claim 1, wherein the reflective element comprises a mirrored fiber end.

11. The apparatus of claim 1, wherein the reflective element comprises a minor, a fiber end, and a collimating lens between the minor and the fiber end.

12. The apparatus of claim 1, wherein the at least one fiber Bragg grating comprises a plurality of fiber Bragg gratings.

13. An apparatus for characterizing at least one fiber grating, the apparatus comprising:
    a first optical path comprising a pulse stretcher and an attenuator, wherein a first portion of an input light pulse from a light source is stretched by the pulse stretcher and is attenuated by the attenuator;
    a second optical path optically coupled to the first optical path and comprising a reflective element, wherein a first portion of the stretched and attenuated light pulse from the first optical path is reflected from the reflected element;

a third optical path optically coupled to the first optical path and configured to be optically coupled to at least one fiber grating such that a second portion of the stretched and attenuated light pulse from the first optical path is reflected from the at least one fiber grating;

a fourth optical path optically coupled to the second optical path and the third optical path such that the reflected pulse from the reflective element and the reflected pulse from the at least one fiber grating propagate along the fourth optical path; and a fifth optical path comprising a delay line, wherein a second portion of the input light pulse from the light source propagates along the fifth optical path to an analyzer.

14. The apparatus of claim 13, wherein the pulse stretcher comprises a single-mode fiber optic cable which broadens the temporal width of a pulse propagating therethrough.

15. The apparatus of claim 13, wherein the pulse stretcher broadens the temporal width of a pulse propagating therethrough by at least a factor of approximately 2.

* * * * *

UNITED STATES PATENT AND TRADEMARK OFFICE
CERTIFICATE OF CORRECTION

PATENT NO. : 7,746,480 B2  
APPLICATION NO. : 12/343449  
DATED : June 29, 2010  
INVENTOR(S) : Ozcan et al.

Page 1 of 1

It is certified that error appears in the above-identified patent and that said Letters Patent is hereby corrected as shown below:

At sheet 21 of 38 (X axis) (FIG. 18), line 7 (Approx.), change "480" to -- 408 --.

At sheet 21 of 38 (X axis) (FIG. 18), line 13 (Approx.), change "480" to -- 408 --.

At sheet 23 of 38 (Y axis) (FIG. 20), line 5 (Approx.), change "-3" to -- -2 --.

At sheet 26 of 38 (X axis) (FIG. 23), line 11 (Approx.), before "1552" change "1540" to -- 1550 --.

At column 8, line 43, change "$R(\omega)=|r(\omega)^2$" to -- $R(\omega)=|r(\omega)|^2$ --.

At column 15, line 25, change "5.70" to -- 570. --.

At column 27, line 18 (Approx.), change " $\dfrac{FT\{h_R(t)*E_s(t)\}}{FT\{E_s(t)\}}\cdot$ " to -- $\dfrac{FT\{h_R(t)*E_s(t)\}}{FT\{E_s(t)\}}\cdot$ --.

At column 28, line 55 (Approx.), in Claim 11, change "minor" to -- mirror --.

At column 28, line 56 (Approx.), in Claim 11, change "minor" to -- mirror --.

Signed and Sealed this
Seventeenth Day of April, 2012

David J. Kappos
*Director of the United States Patent and Trademark Office*